(12) United States Patent
Jin

(10) Patent No.: US 8,146,361 B2
(45) Date of Patent: Apr. 3, 2012

(54) POWER GENERATING APPARATUS

(75) Inventor: Jifan Jin, Lanzhou (CN)

(73) Assignees: Lanzhou Jinfule Biotechnology Co., Ltd., Lanzhou (CN); Kin Star International Limited, Road Town (VG); Spring Power Limited, Road Town (VG); Jin Jin Pacifique Compagnie, Antony (FR)

( * ) Notice: Subject to any disclaimer, the term of this patent is extended or adjusted under 35 U.S.C. 154(b) by 449 days.

(21) Appl. No.: 12/395,454

(22) Filed: Feb. 27, 2009

(65) Prior Publication Data

US 2009/0236856 A1 Sep. 24, 2009

Related U.S. Application Data

(63) Continuation-in-part of application No. PCT/CN2007/002622, filed on Aug. 31, 2007, and a continuation-in-part of application No. PCT/CN2006/002239, filed on Aug. 31, 2006.

(51) Int. Cl.
*F03B 7/00* (2006.01)
*F03B 17/06* (2006.01)
*F03G 3/04* (2006.01)
*F02B 63/04* (2006.01)
*H02K 7/18* (2006.01)

(52) U.S. Cl. ............... 60/639; 60/640; 290/1 R; 417/329

(58) Field of Classification Search .................... 60/639, 60/640, 495, 496, 675; 290/1 R, 43, 54; 417/329
See application file for complete search history.

(56) References Cited

U.S. PATENT DOCUMENTS

| 459,280 | A | * | 9/1891 | Garrett, Jr. | 417/329 |
|---|---|---|---|---|---|
| 547,318 | A | * | 10/1895 | Baily | 60/639 |
| 2,129,292 | A | * | 9/1938 | Vinson | 417/329 |
| 2,499,715 | A | * | 3/1950 | Blevins | 60/640 |
| 4,163,905 | A | * | 8/1979 | Davison | 290/54 |
| 4,391,100 | A | * | 7/1983 | Smith | 60/641.11 |
| 4,583,368 | A | * | 4/1986 | Neuenschwander | 60/639 |
| 4,720,976 | A | * | 1/1988 | Kim et al. | 60/495 |
| 5,488,828 | A | * | 2/1996 | Brossard | 60/675 |
| 6,445,078 | B1 | * | 9/2002 | Cieslak, Jr. | 290/1 R |
| 6,534,881 | B1 | * | 3/2003 | Slavchev | 290/54 |
| 6,734,574 | B2 | | 5/2004 | Shin | |

(Continued)

FOREIGN PATENT DOCUMENTS

CN 2191293 3/1995

(Continued)

*Primary Examiner* — Thomas Denion
*Assistant Examiner* — Christopher Jetton
(74) *Attorney, Agent, or Firm* — Workman Nydegger

(57) ABSTRACT

A power-generating apparatus including an autocontrol electronic mechanical unit, a power-generating unit, a power transportation device, a liquid supply device, a shift device, and a discharge device. The power-generating unit includes a pair of interactive and coupled reverse-linked, hollow movement bodies. The relationship between the two movement bodies can be changed through filling liquid to one movement body or discharging liquid from the other. The movement body filled with liquid goes down and brings the other movement body without liquid up to generate power in cycle continuously utilizing lifting and drop movements of the two movement bodies. The power-generating apparatus can utilize objects' gravitational potential energy to generate power in cycle uninterruptedly so as to ensure the continuity and stability of power generation. The power-generating apparatus completely uses the ambient natural energy during its entire power generation process.

27 Claims, 28 Drawing Sheets

U.S. PATENT DOCUMENTS 6,930,406 B2　8/2005　Montgomery

FOREIGN PATENT DOCUMENTS

| | | | |
|---|---|---|---|
| CN | 1395036 A | | 2/2003 |
| CN | 1609446 A | | 4/2005 |
| CN | 1676926 A | | 10/2005 |
| GB | 2 090 939 A | | 7/1982 |
| GB | 2090939 A | * | 7/1982 |
| GB | 2 224 807 A | | 5/1990 |
| JP | 63001768 A | * | 1/1988 |
| JP | 2002-122067 A | | 4/2002 |
| WO | 95/18301 | | 7/1995 |

* cited by examiner

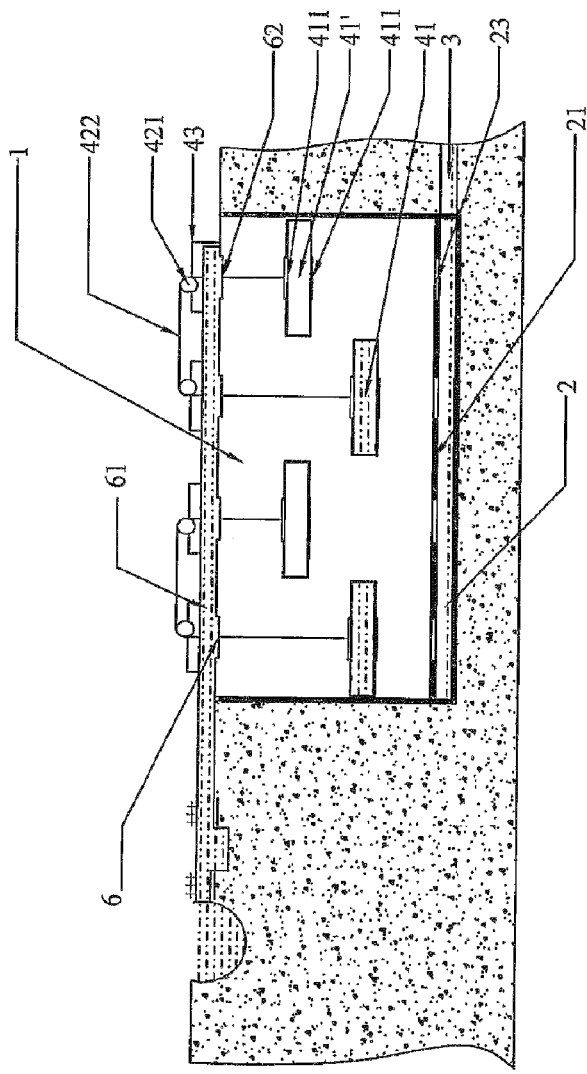
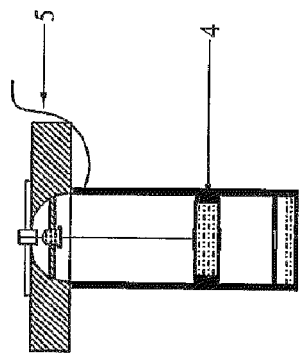
Fig. 1a
Fig. 1b

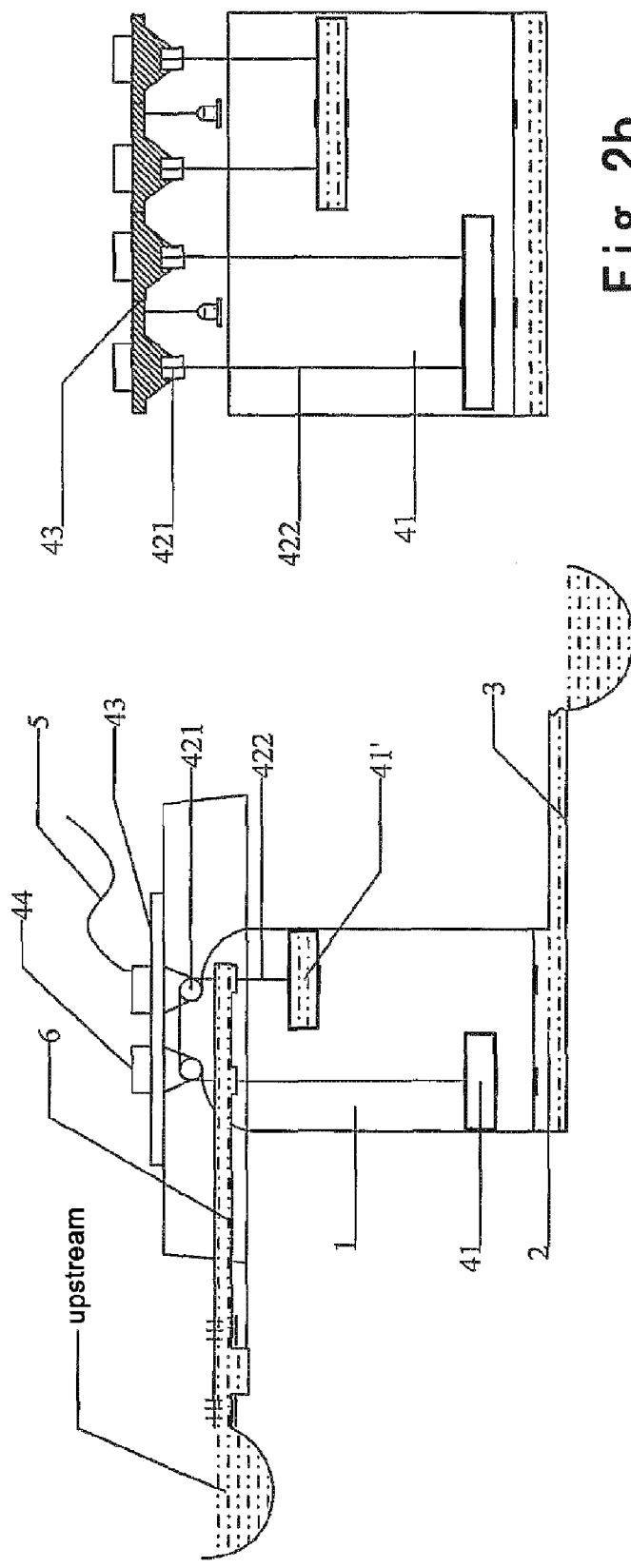

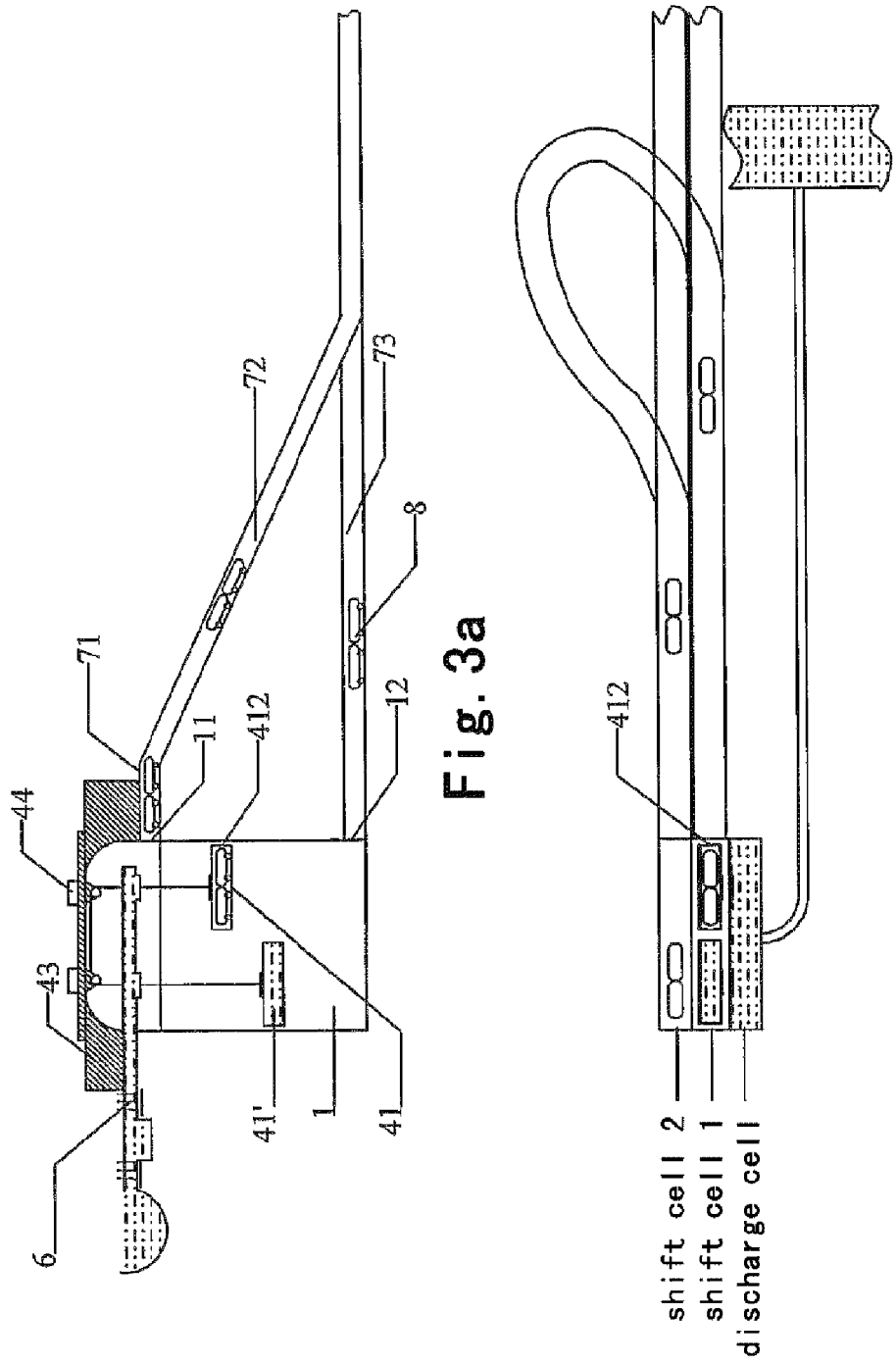

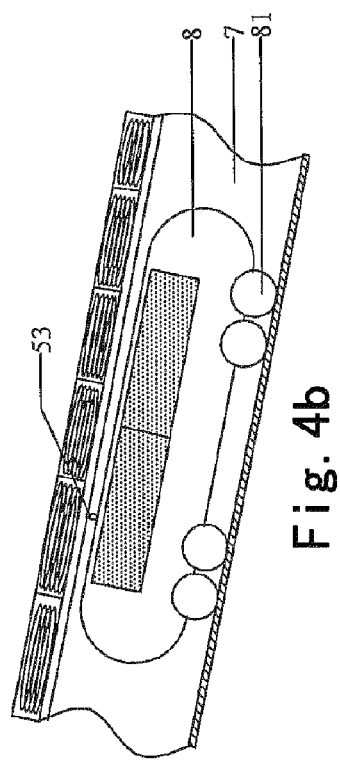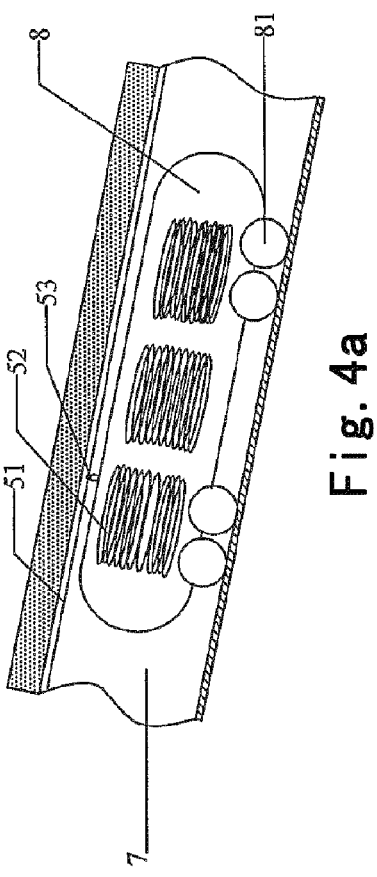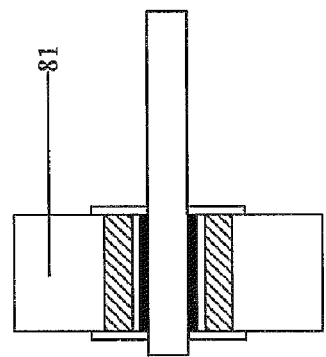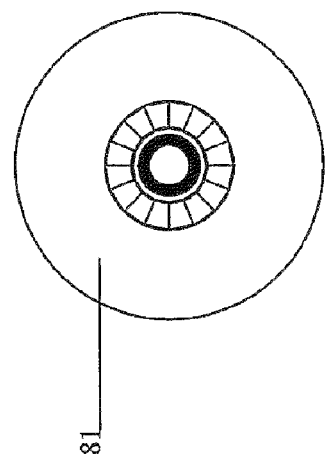
Fig. 4b
Fig. 4d
Fig. 4a
Fig. 4c

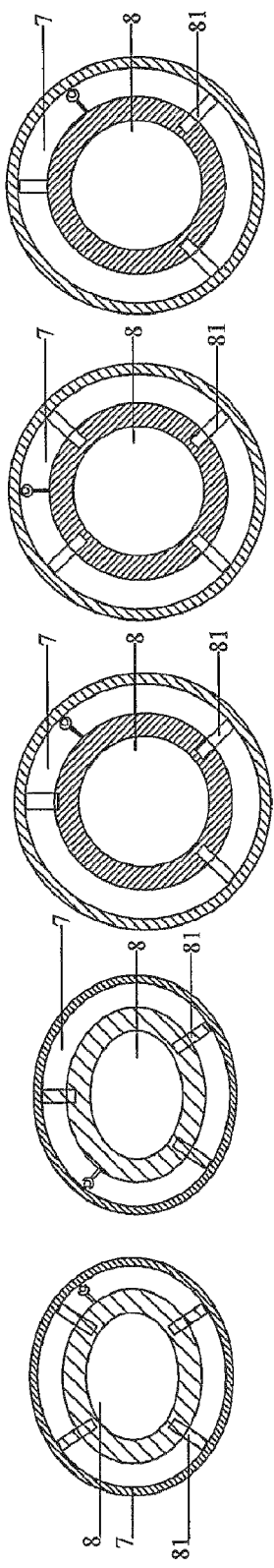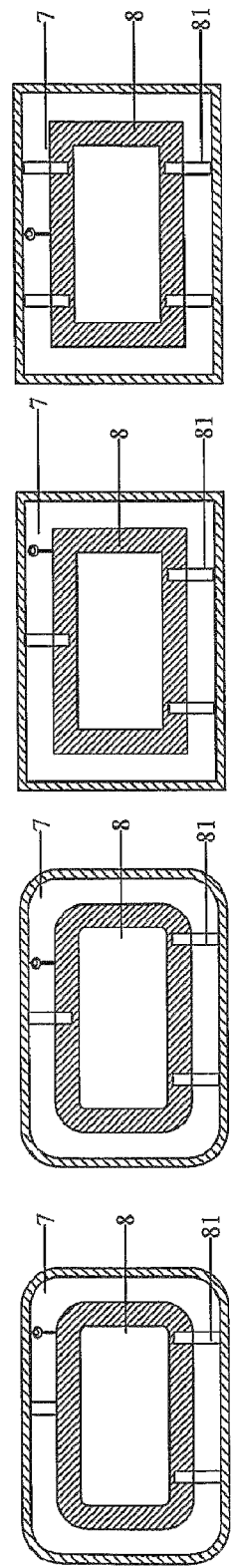

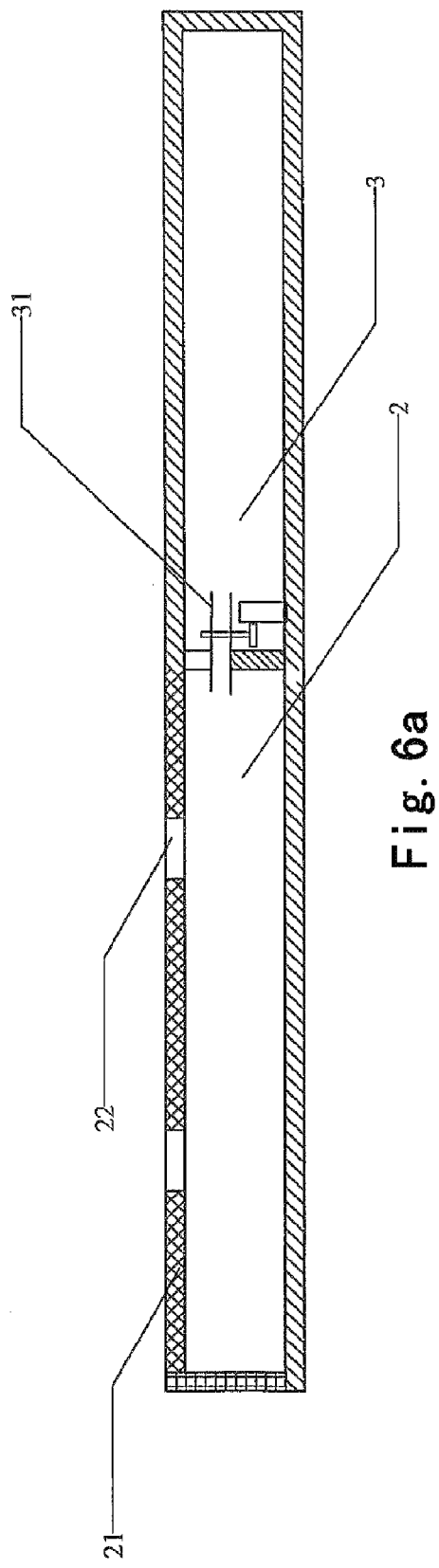
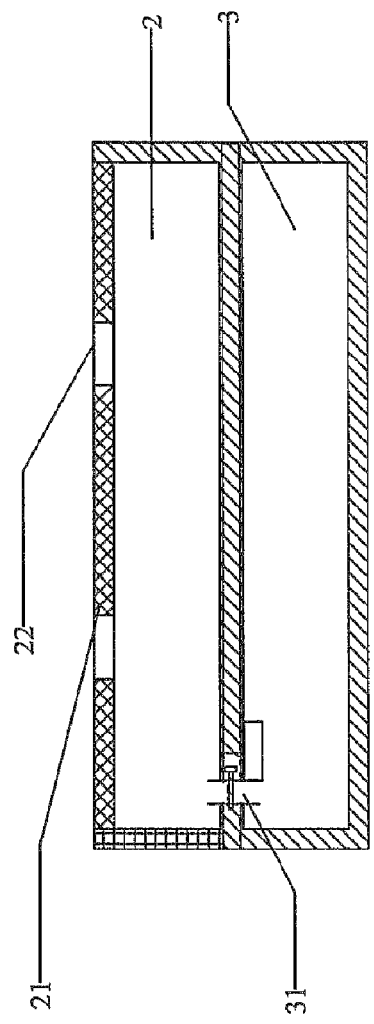
Fig. 6a
Fig. 6b

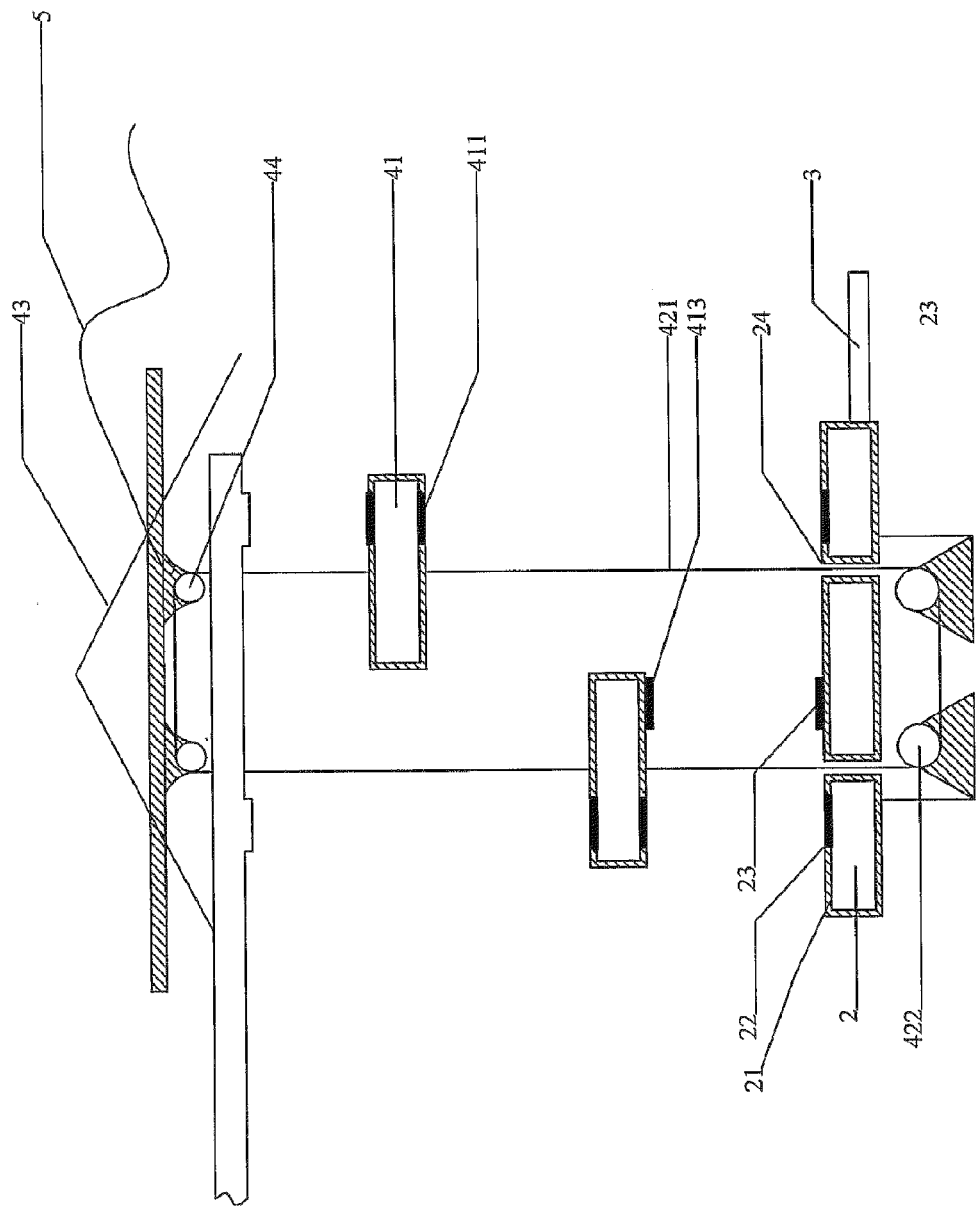

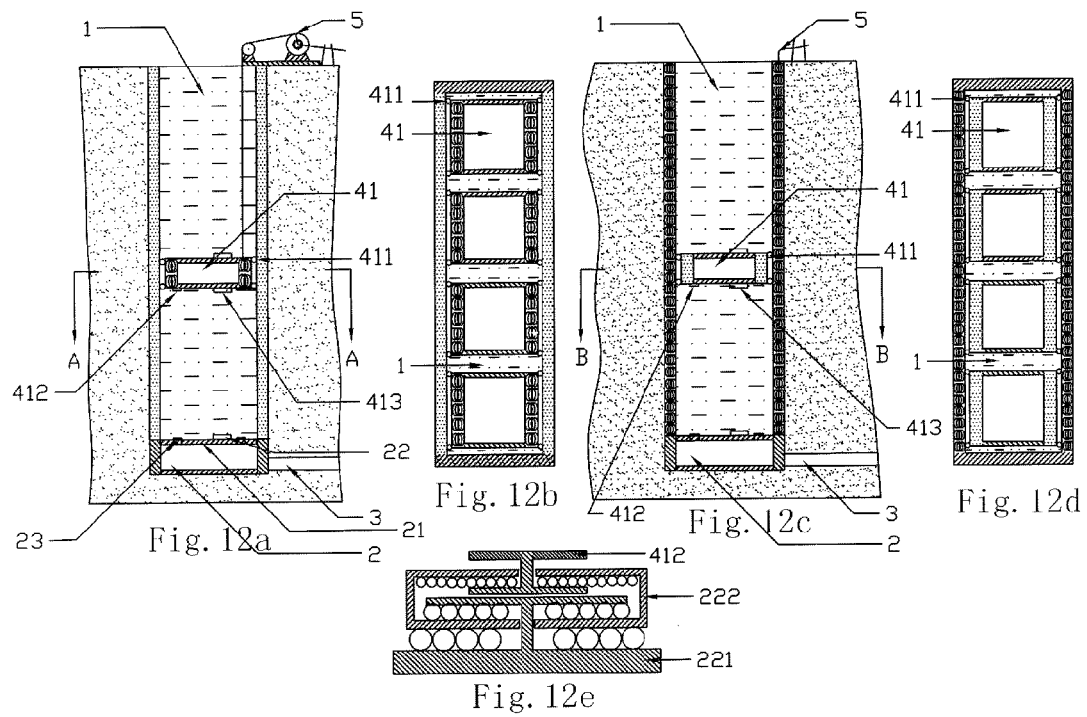
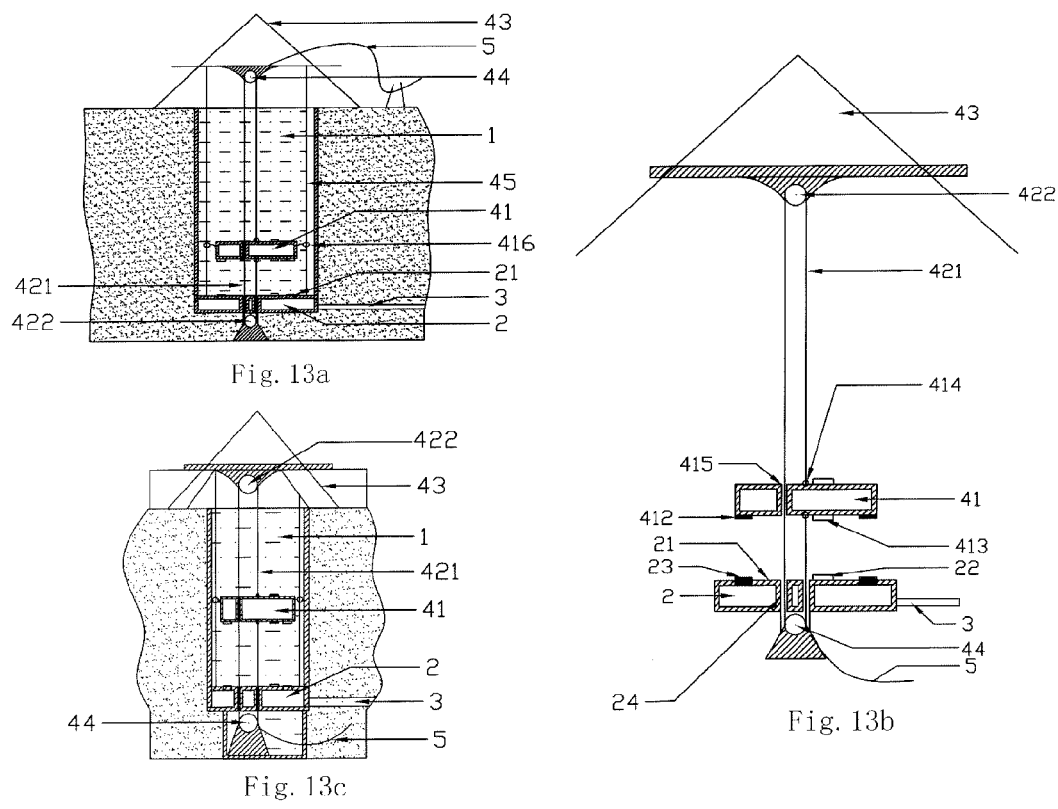

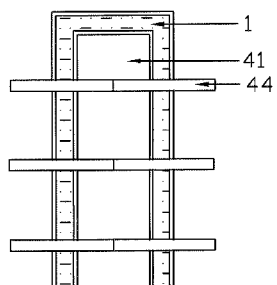
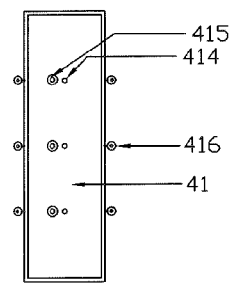
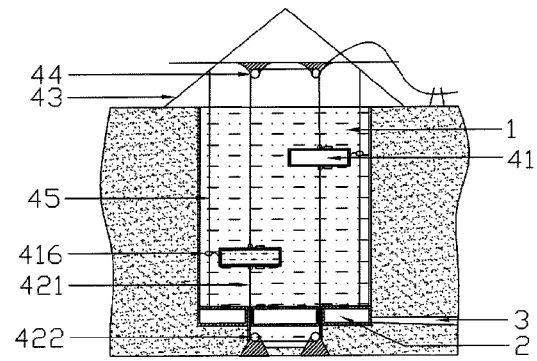
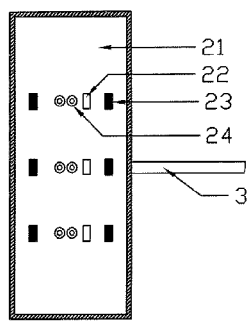
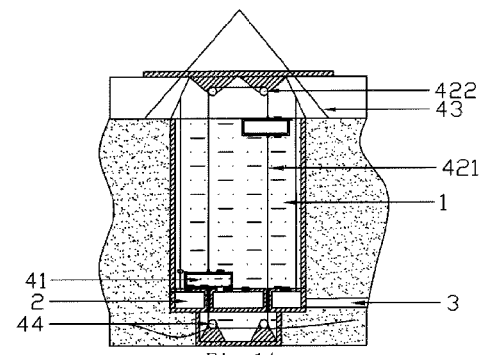
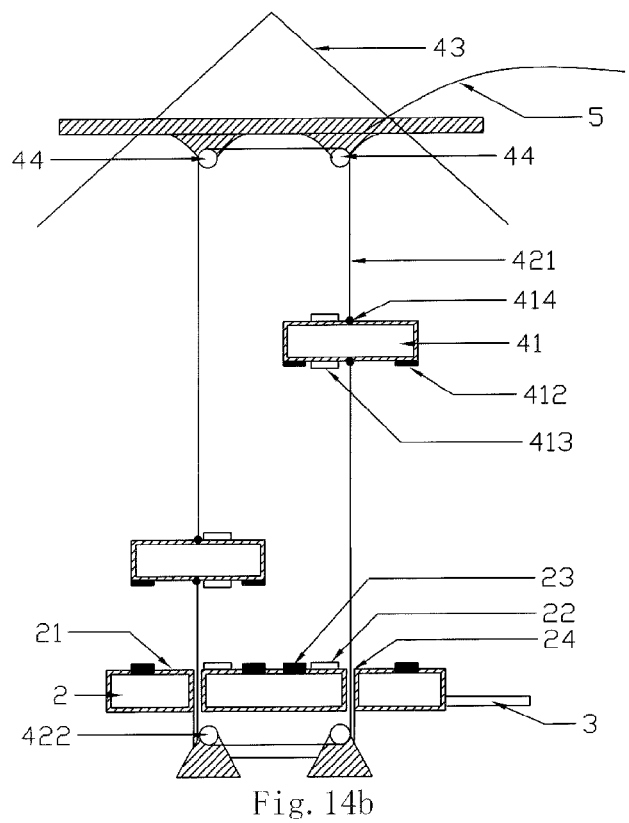
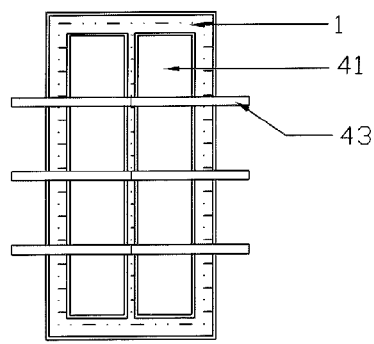
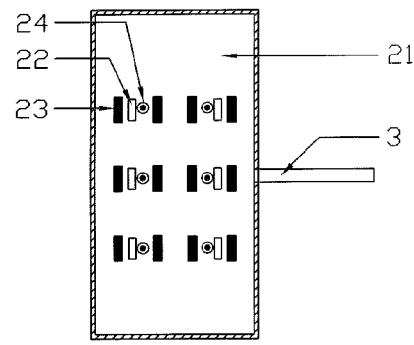

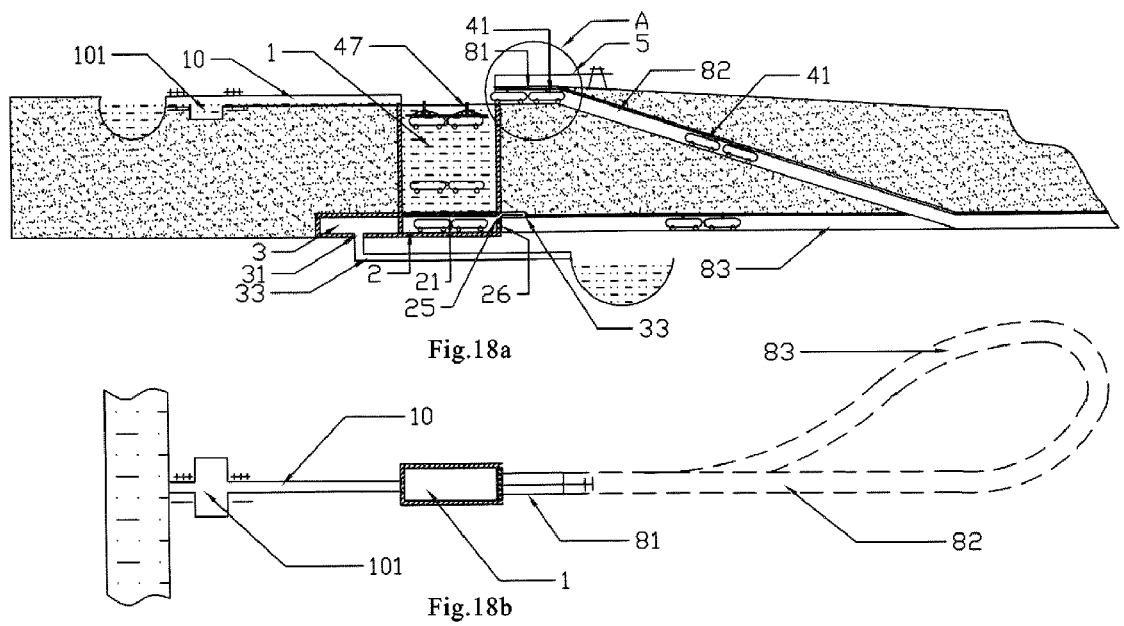
Fig.18a
Fig.18b
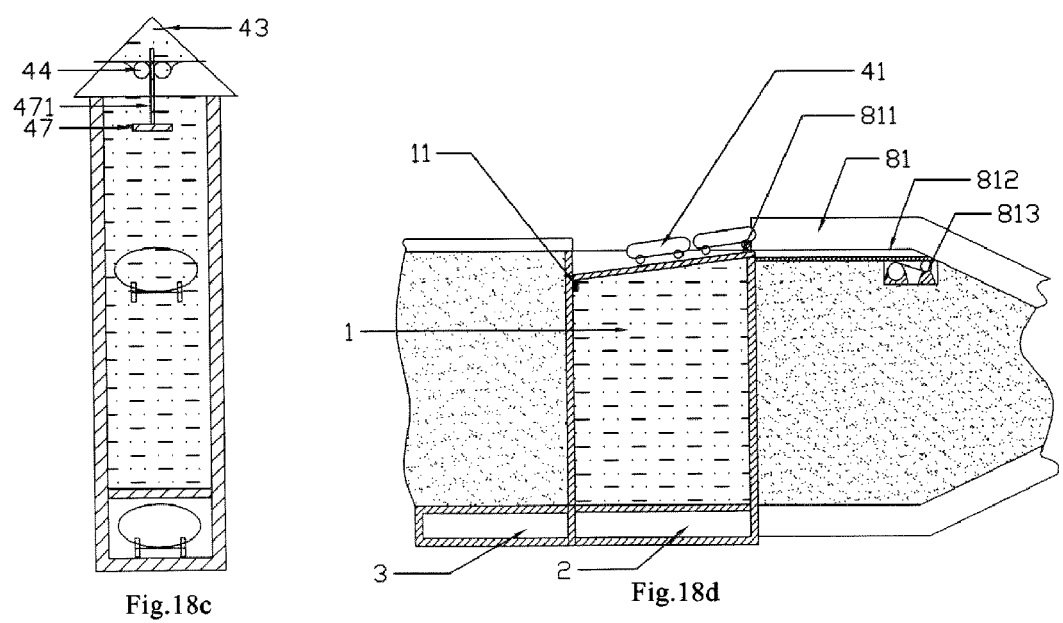
Fig.18c
Fig.18d

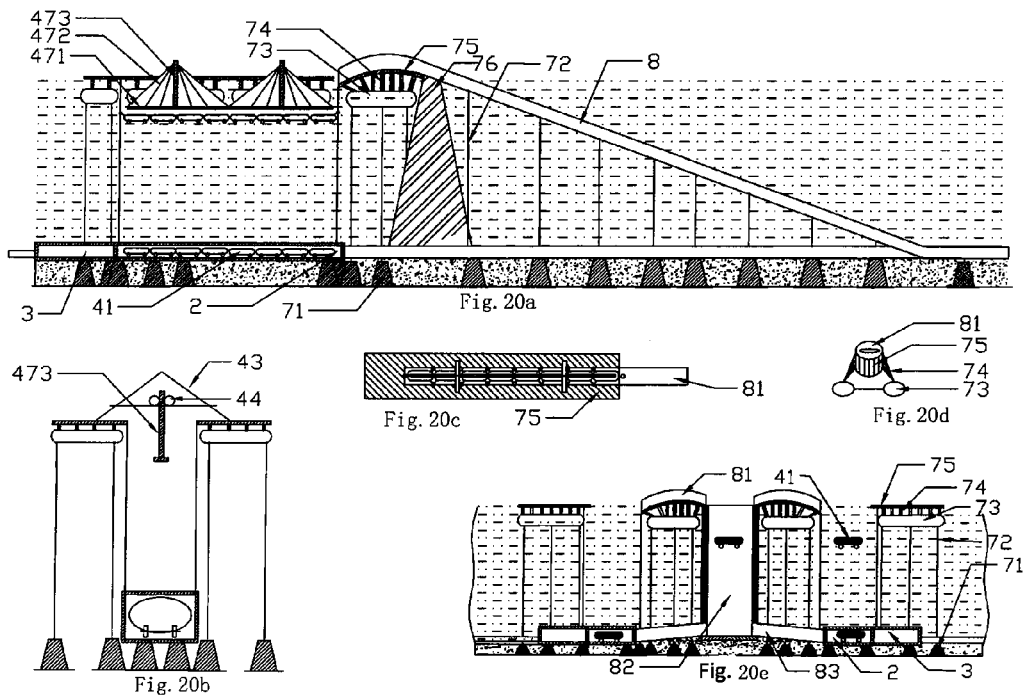
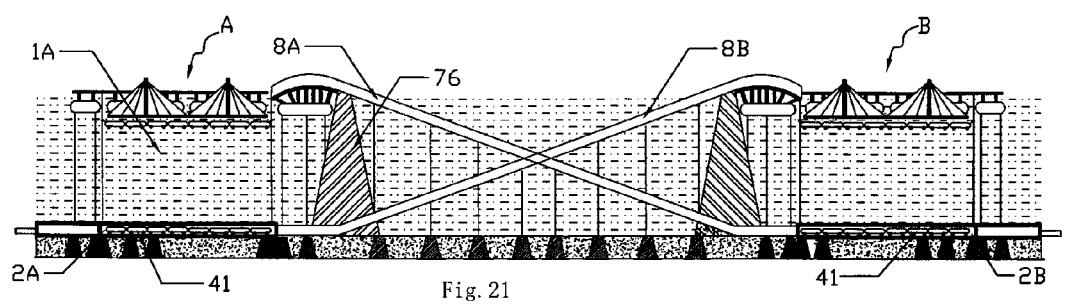

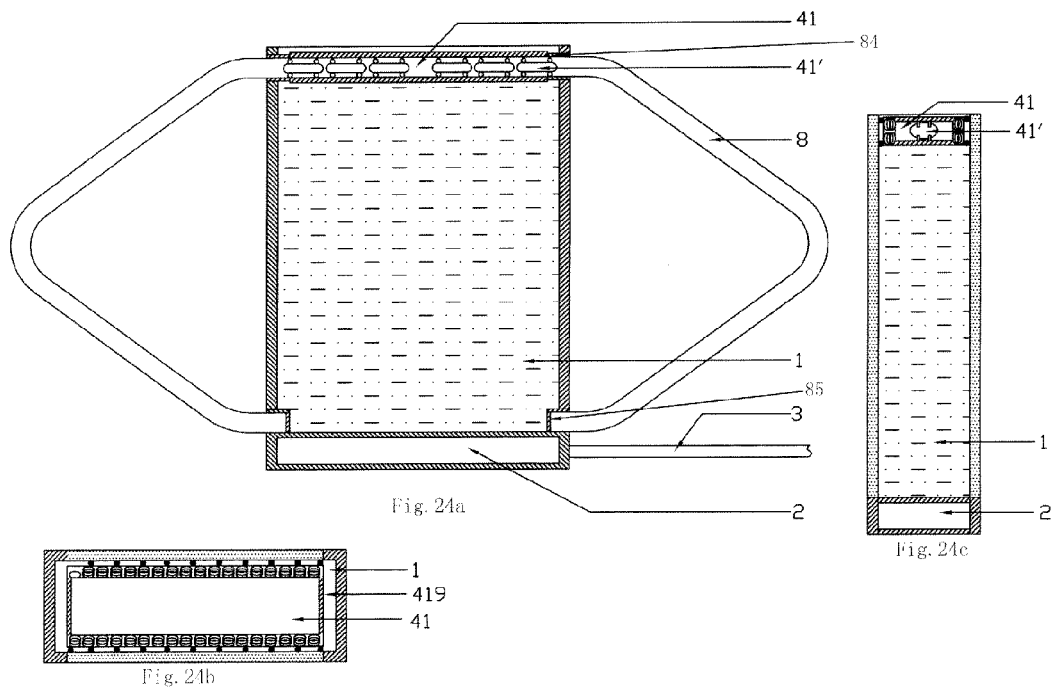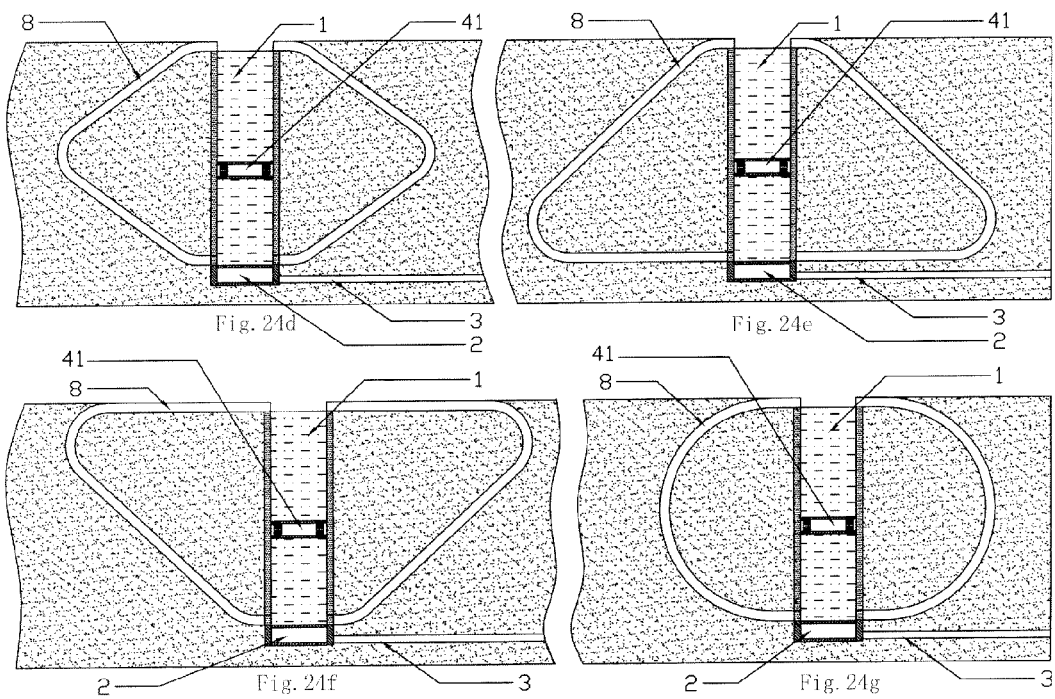

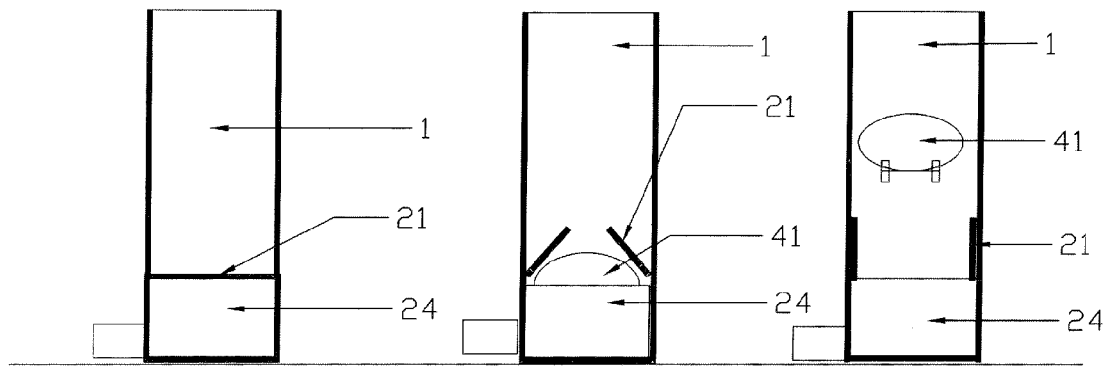
Fig. 30a    Fig. 30b    Fig. 30c
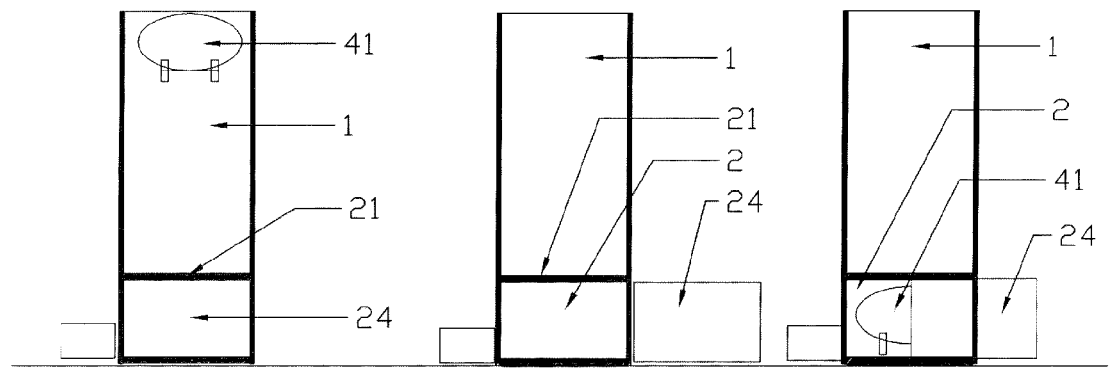
Fig. 30d    Fig. 30e    Fig. 30f
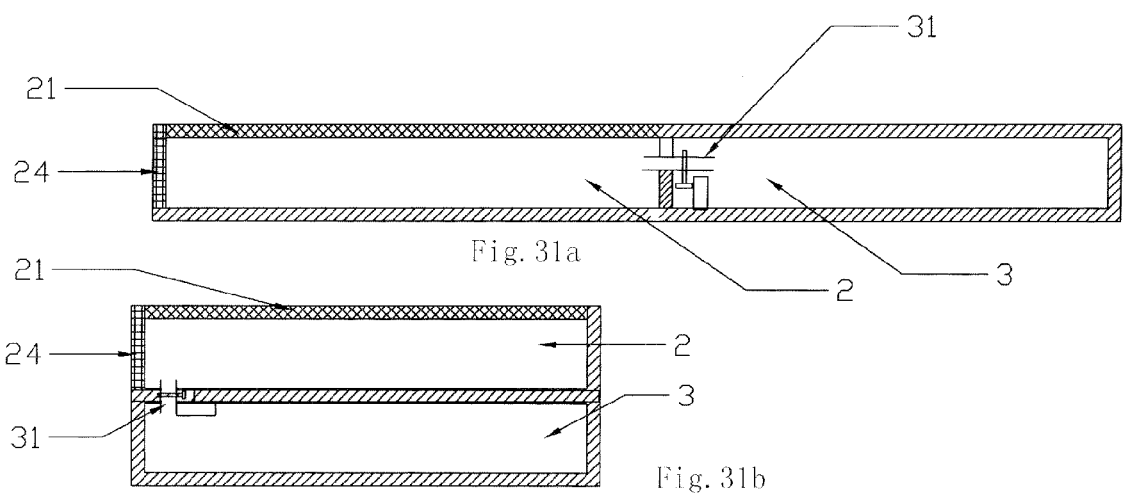
Fig. 31a
Fig. 31b

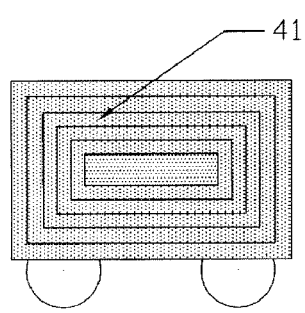
Fig. 32a
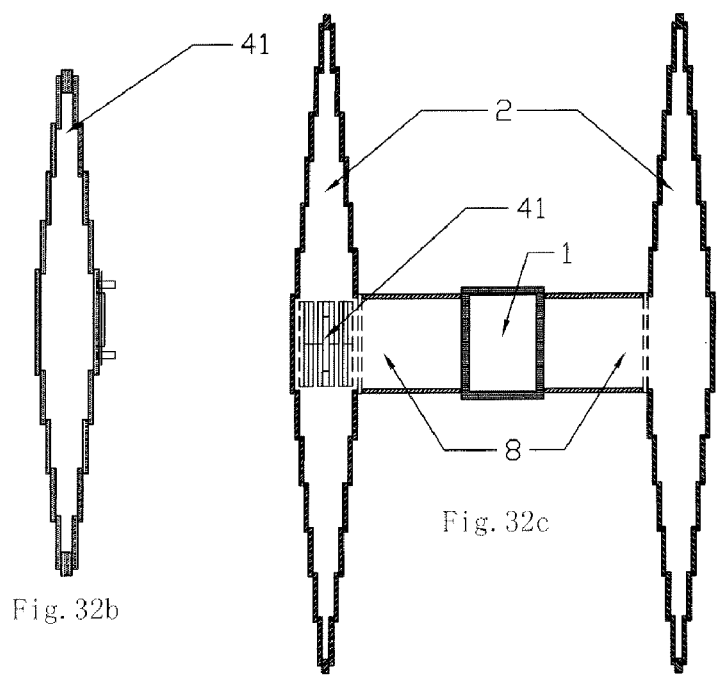
Fig. 32b
Fig. 32c

POWER GENERATING APPARATUS

This application is a continuation-in-part of PCT/CN2007/002622 filed Aug. 31, 2007 and a continuation-in-part of PCT/CN2006/002239 filed Aug. 31, 2006 which are incorporated by reference.

FIELD OF THE INVENTION

This invention relates to a power-generating apparatus, in particular to a kind of power-generating apparatus that uses natural energy to generate power.

BACKGROUND OF THE INVENTION

For the world's large population, the energy is the basic issue of the survival and development. It is inseparable from energy to improve living standards and develop economy. Energy crisis has been a problem for countries of the world all the time. Power shortage is an issue that all previous governments of each country must face. Due to improvement of production and living standards, the contradiction between the issue of power shortage and people's growing demand of power in China has been more obvious each day, especially during the peak hour of power usage. In order to ease the power shortage situation, the government has to take measures to set up restrictions on power usage. The implementation of this measure will greatly hamper consumption which is not conducive to Chinese economic growth. Therefore, countries around the world including China have been striving to improve the power supply capacity. The current power generation is mainly in three ways:

1. Thermal power generation. The best-scale of thermal power station is 60 kilowatts/hour. Normally its building cycle is three to five years. It takes about 10 years to build up the larger-scale thermal power station. Most of the thermal power stations use coal as fuel to generate power while a few stations use oil and gas as fuel. The cost for power generation of thermal power station is higher than that of liquid power station and slightly lower than that of nuclear power station. Due to the rising market price of energy such as cruel oil, it occurred that the cost level of thermal power generation switches with that of nuclear power generation. The pollution to atmospheric environment during the process of thermal power generation is unavoidable, especially in those coal-fueled thermal power stations. The energy conversion rate in thermal power station is normally 35%.

2. Fluid power generation. The best-scale liquid power station is normally one million kilowatts/hour. Its building cycle usually is a decade. Fluid power generation uses the natural fluid flow. There is no pollution in this kind of power generation process. The cost of power generation is also lower than that of other ways. However, it requests large land area and heavy relocation task and may cause damage to the ecology. In addition, liquid power station site requirements are stringent. Taking China as an example, the appropriate locations along the Yangtze and Yellow Rivers have basically been used up; yet power stations can not be constructed along Chinese southern border rivers with sufficient liquid volume and ideal fall such as the Yarlung Zangbo, Nujiang, Lancang etc. because of rugged and complicated situation there. Due to lack of control on liquid volume, power generation capacity can not be adjusted following actual needs. Power conversion rate of fluid power station power conversion rate is about 40-60%.

3. Nuclear power generation. The building cycle of Nuclear power station is longer than that of thermal power plant and shorter than that of liquid power station. Because current nuclear power stations mainly use nuclear fission for power generation, it requires the use of scarce and radioactive "uranium" as the power source, a large amount of liquid and high power generation conditions. To avoid nuclear leakage, specialized equipments are required for the long-term sealing up the nuclear waste coming from power generation. Therefore, the generation cost is higher than that of other power stations. Nuclear power conversion rate is less than 40%. In addition to presently used nuclear fission power generation, nuclear fusion power generation is currently being developed and can not be applied in industries yet.

All above three forms of power generation equipments require large investments. Taking 600,000 kilowatts/hour electricity power as an example, the thermal power station needs at least an investment from 35 to 50 billion yuan while the doubled investment is needed for a nuclear or liquid power station.

At present, there are small size power stations using wind energy, solar energy and sea liquid energy for power generation. Since the energy conversion rates of these forms of energy generation are all less than 10%, they require huge investment to build. Moreover, these forms of generation methods have a high demand for natural environment of the building site. For example, the wind power station demands to be set in a tuyere. Thus such power stations do not yet have the conditions for large-scale power generation. Considering energy saving and environmental protection, there have been a lot of devices that use objects' gravitational potential energy for power generation. For example, Chinese patent literature CN1048366C published a cableway power-generating device. However, there is a common problem to such gravitational potential energy generation devices, that is, for continuous power generation, it is necessary to enable smooth return of downward object to in situ so that the downlink and pick-up line can become a continuous and complete cycle of movement. But in reality, the process to make downlink objects back to in situ requires consumption of energy equivalent to or even more than the energy generated during objects going down. This is clearly not feasible to achieve the purposes of power generation. Therefore, this kind of device can not be used for continuous power generation and is hard to become special power generation equipment.

Contents of the Invention

The purpose of this invention is to solve the above-mentioned existing issues in current power-generating apparatuses. In order to achieve such objective, this invention provides a kind of device that uses natural energy for power generation. This device utilized objects' gravitational potential energy to generate power and the circular movement power generation system is formed by simple structure to ensure the continuity and stability of power generation.

The power-generating apparatus of this invention comprises: an autocontrol electronic mechanical unit for controlling automated, continuous and smooth operation of the device;

a power-generating unit including at least a pair of interactive and coupled reverse-linked movement bodies; the said movement bodies are two identical and hollow bodies equipped with liquid outlet openings;

a power transportation device connected to the said power-generating unit and transporting the generated power to public grid;

thereinto, the said power-generating apparatus also comprises:

a movement chamber or liquid chamber where the said pair of movement bodies do reverse up and down movement;

a liquid supply device, when one of the said pair of movement bodies moves or ascends to the upper part of the movement chamber or liquid chamber, this liquid supply device connects to the liquid outlet openings to add liquid to that movement body and increase the overall weight of the movement body;

a shift device, the said shift device is installed under the said movement chamber or liquid chamber, when the said movement body moves or descends to the lower part of the said movement chamber or liquid chamber, the said liquid in-out opening can connect to the said shift device to discharge liquid from the movement body to decrease its overall weight; a discharge device installed at the side of or under the said shift device and connected to the said shift device also equipped with a discharging exit leading to the environment with sufficient capacity to discharge liquid from the said shift device and enables the said shift device to conduct cycle shift to the said movement body.

According to the power-generating apparatus of this invention, thereinto, the said liquid supply device connects to liquid source or liquid supply pipeline connected to liquid material, liquid inlet opening is installed on this liquid supply source or liquid supply pipeline, the said liquid inlet opening aims at liquid in-out opening of movement chamber or liquid chamber, when the said movement body moves to the upper part of the movement chamber or liquid chamber, the said liquid inlet opening connects to the liquid in-out opening at the upper part of the said movement body to add liquid to the said movement body. According to the power-generating apparatus of this invention, thereinto, there is an upper trap door installed at the upper part of the said shift device with a liquid inlet opening installed on it, the said liquid inlet opening corresponds to the liquid in-out opening at the lower part of the said movement body; when the said movement body moves to the lower part of the said movement chamber or liquid chamber, the said liquid inlet opening connects to the liquid in-out opening at the lower part of the said movement body to discharge the liquid from the said movement body to shift device. According to the power-generating apparatus of this invention, thereinto, the said autocontrol mechanical unit comprises the stabilization-retention device installed in the contact part between the movement body and the shift device, this stabilization-retention device is used to fix the movement body and the shift device together temporarily to control the said movement body in a stable state during liquid discharge stage; this stabilization-retention device comprises the connecting part of the sliding card fixed at the upper part of the said shift device and the stabilization piece fixed at the lower part of the said movement body. According to the power-generating apparatus of this invention, thereinto, in the said power-generating unit, coil or magnet is installed in the inner wall of the movement chamber and liquid chamber, magnet or coil is installed in the said filling movement body, correspondingly; this power-generating unit also comprises the rotating wheel installed on the said movement body; the said rotating wheel is used to define the gap between the said movement body and the inner wall of the said movement chamber or liquid chamber and stabilize the power generation movement of movement body. According to the power-generating apparatus of this invention, thereinto, the said power-generating unit also comprises the generator and the motor wheel installed on the upper part of the movement chamber, as well as the transmission device connecting the said movement body and the said motor wheel; the said transmission device is pulley block including the pulley and the toothed belt, the said pulley is installed at the lower part of the movement chamber, the said toothed belt rounds the said motor wheel and the said pulley and forms an similar rectangle, the said movement body is fixed at one vertical edge of the said rectangle, or the said generator and motor wheel are installed at the lower part of the movement chamber, the said pulley is fixed at the upper part of the movement chamber. According to the power-generating apparatus of this invention, thereinto, the said discharge device is installed under the said shift device; liquid in the said shift device can flow naturally into the said discharge device, the said environment with efficient capacity is to utilize the natural force to make the discharged liquid return back to the liquid supply source in recycle, the said environment with efficient capacity is downstream rivers or discharge pipeline. According to the power-generating apparatus of this invention, thereinto, a ring-shaped sliding hook is set up at one side of the said movement body, a guiding sliding rope is set up in the movement chamber to control the said movement body, the said ring-shaped sliding hook buckle-grasps the said guiding sliding rope to control the said movement body running in stable state. According to the power-generating apparatus of this invention, thereinto, the said power-generating apparatus is installed in the ocean, the said environment of sufficient capacity is the apparatus installed in the ocean. According to the power-generating apparatus of this invention, thereinto, the said power-generating apparatus also comprises underwater fixing device, the said underwater fixing device comprises the anchorage piles installed on the ground floor of the ocean, the steel cable fixed on the said anchorage piles, the floater connected with the top end of the said steel cable, and the floating board and its support connected with the said floater, the said above water part is fixed on the said floating board; the said underwater fixing device also comprises supporting pole installed on the ground floor of the ocean and protruded out of the ocean, part of the steel cable in the said underwater fixing device is installed underwater; there is stabilization brake fixed at the top end of the said steel cable. According to the power-generating apparatus of this invention, thereinto, the said movement body is hollow body with the gravitation smaller than its floatage, there are liquid in-out openings set up at its upper and lower part; there is liquid inlet opening set up at the location corresponding to the said lower liquid in-out opening on the upper trap door of the said shift device; the filling liquid can be discharged into the said shift device by opening the said liquid in-out opening to add liquid to the said hollow movement body or by control to open the said liquid in-out opening and the said liquid inlet opening and make them tightly butt and connected with each other, thus adjusting the density of the movement body and that of liquid to change the movement state of the said movement body; there is stabilization-retention device installed in the contact part between the said movement body and the said upper trap door to fix the movement body and the shift device together temporarily to control the said movement body in a stable state temporarily during preparation stage for ascending movement; the said stabilization-retention device comprises the fixing device fixed on the said upper trap door, the connecting part of the sliding card connected to the fixing device through rotating ball as well as the stabilization piece fixed at the lower part of the said movement body. According to the power-generating apparatus of this invention, thereinto, the said power-generating apparatus further comprises at least one waterless pipeline from top to bottom and at least one filling movement body; the said waterless pipeline is installed at outside of the said movement chamber or liquid chamber, the upper end and lower end pipe nozzles of the said pipeline connect to the upper part and lower part of the said movement chamber or liquid chamber, respectively; one of the said pair of movement bodies is installed close to the pipe nozzles and a side door that can be opened is installed at the side of the movement body that close to the said pipe nozzles so that the filling movement body can enter and leave the said movement body via the said pipeline.

According to the power-generating apparatus of this invention, thereinto, the said power-generating apparatus further comprises at least one waterless pipeline from top to bottom; the said shift device is equipped with an upper trap door that can be opened and at least one side trap door, the said movement chamber is connected to or separated from the said shift device through the said upper trap door, the said shift device is connected to or separated from the said waterless pipeline through the said side trap door; the said waterless pipeline is installed outside of the said movement body whose upper end connected to the upper opening of the said movement chamber and lower end connected to the said side trap door, the said movement body moves along the route formed by the waterless pipeline, the shift device and the movement chamber; the said waterless pipeline includes upward delivery pipeline, descending downlink pipeline, as well as downward delivery pipeline; the upward delivery pipeline has one end connected to the upper opening of the movement chamber and another end connected to the beginning end of the downlink pipeline with the delivery sliding device installed there; the terminal end of the downlink pipeline connects to one end of the downward delivery pipeline whose another end connected to side trap door of the shift device. According to the power-generating apparatus of this invention, thereinto, the said waterless pipeline is straight pipe, standpipe or siphon; Coil or magnet is installed in inner wall of the said pipeline, magnet or coil is installed in the said filling movement body correspondingly; the said pipeline is also equipped with duct track inside, the said filling movement body further has a rotating wheel via which it moves on the said track, magnet or coil is installed on the inner track of the wheel of the said rotating wheel, coil or magnet is installed in the axle of the said rotating wheel correspondingly. According to the power-generating apparatus of this invention, thereinto, the said power transportation device comprises the cable installed close to the inner wall of the downlink pipeline, the wire connected with the coil in the rotating wheel as well as the trolleybus-style elastic rod cable buckle-grasping wheel slipped and buckled on the cable and connected with the wire; the said filling movement body is hollow movement body, or the said filling movement body is solid movement body; the brake power generating unit is installed in the said filling movement body to reduce the said filling movement body moving speed to zero gradually and generate power during the process of entering the said movement body.

According to the power-generating apparatus of this invention, thereinto, the shift device also comprises the heat source to heat and vaporize the liquid discharged from this movement body into this shift device;

the liquid supply device is the condensation compartment installed at the upper part of the said movement chamber or liquid chamber;

the discharge device is the heat insulation pipeline whose ends are connected with this shift device and this liquid supply device, respectively.

According to the power-generating apparatus of this invention, thereinto, the energy in the said heat source comes from geothermy or solar energy, the said liquid supply device is the condensation compartment using natural temperature difference for condensation; the said liquid is water, liquid nitrogen, lithium bromide or Freon, the said liquid supply device chamber is a condensation compartment that uses the refrigeration device installed inside it for condensation. According to the power-generating apparatus of this invention, thereinto, this power-generating apparatus comprises serial setting from top to bottom along the terrain trend, thereinto, the discharge device of the previous power-generating apparatus leads to the movement chamber of the next power-generating apparatus, the discharge device installed at the location whose terrain is the lowest leads to downstream rivers.

According to the power-generating apparatus of this invention, thereinto, this power-generating apparatus comprises parallel setting, thereinto, the first and last power-generating apparatus of the parallel setting are equipped with one said waterless pipeline, the middle power-generating apparatus is equipped with two said waterless pipelines; the end of waterless pipeline of the first power-generating apparatus connects to the shift device of the second power-generating apparatus, the end of the first waterless pipeline of the second power-generating apparatus connects to the shift device of the first power-generating apparatus; the end of the second waterless pipeline of the second power-generating apparatus connects to the shift device of the third power-generating apparatus, the first waterless pipeline of the third power-generating apparatus connects to the shift device of the second power-generating apparatus; those connections are in order; the second waterless pipeline of the last second power-generating apparatus connects to the shift device of the last power-generating apparatus; the end of the waterless pipeline of the last power-generating apparatus connects to the shift device of the second last power-generating apparatus. According to the power-generating apparatus of this invention, thereinto, this system comprises the power-generating apparatus and the underground transportation flat pipe described in claim 12, the said underground transportation flat pipe has a beginning end connected to the end of the waterless pipeline and a terminal end leading to the ground surface whose terrain is relatively lower to enable the said movement body moving along the said underground transportation flat pipe to transport human and goods in its hollow part to setup locations; the said underground transportation flat pipe has a terminal end leading to the lifting device, the said lifting device is movement chamber or liquid chamber of the next power-generating apparatus installed at the terminal end of the said transportation flat pipe, the said lifting device is ascending liquid ladder. This invention provides a power-generating apparatus that completely uses the natural energy existing in the nature world during its entire power generation process. Power generation capacity is easy to control. The energy conversion rate is over 90%, higher than all currently existing forms of power generation. The whole power generation process is energy-saving and environment protecting and low cost. The power-generating apparatus has a simple and feasible structure. Its size can be either large or small. It can be parallel connection or series settings. To build up the power station based on the power-generating apparatus device of this invention requires less investment. This kind of power station has the advantages such as large power generation capacity, short building cycle and quick investment return.

DESCRIPTION OF FIGURES

FIG. 1*a* is the longitudinal section view schematic diagram of the power-generating apparatus based on example 1 of this invention.

FIG. 1*b* is another directional section view schematic diagram of the power-generating apparatus in FIG. 1*a*.

FIG. 2a is the longitudinal section view schematic diagram of the power-generating apparatus based on example 2 of this invention.

FIG. 2b is another directional section view schematic diagram of the power-generating apparatus in FIG. 2a.

FIG. 3a is the longitudinal section view schematic diagram of the power-generating apparatus based on example 3 of this invention.

FIG. 3b is the top view schematic diagram of the power-generating apparatus based on example 3 of this invention.

FIG. 3c is another longitudinal section view schematic diagram of the power-generating apparatus based on example 3 of this invention.

FIGS. 4a to 4d present several ways of layout of coil and magnet in the power-generating unit used in example 3 of this invention.

FIGS. 5a to 5i present several forms of filling movement body used in example 3 of this invention.

FIGS. 6a to 6b present two forms of layout of the shift device and the discharge device used in this invention.

FIG. 8c is the longitudinal section view schematic diagram of the power-generating apparatus based on example 3 of this invention.

FIG. 9b is another directional section view schematic diagram of the power-generating apparatus in FIG. 9a.

FIG. 10b is another directional section view schematic diagram of the power-generating apparatus in FIG. 10a.

FIG. 11b is another directional section view schematic diagram of the power-generating apparatus in FIG. 11a.

FIG. 12a is the longitudinal section view schematic diagram of the power-generating apparatus based on example 5 of this invention, inside it magnet is installed in the inner wall of liquid chamber;

FIG. 12b is the A-A directional section view schematic diagram of the power-generating apparatus in FIG. 12a;

FIG. 12c is the longitudinal section view schematic diagram of the power-generating apparatus based on example 5 of this invention, inside it coil is installed in the inner wall of liquid chamber, magnet is installed in movement body;

FIG. 12d is the B-B directional section view schematic diagram of the power-generating apparatus in FIG. 12c;

FIG. 12e is the section view enlargement schematic diagram of the stabilization suspension device used in example 5 of this invention;

FIG. 13a is the longitudinal section view schematic diagram of the power-generating apparatus based on example 6 of this invention, inside it the power-generating unit is installed at the upper part of the liquid chamber;

FIG. 13b is the schematic diagram of the power-generating unit used for the power-generating apparatus base on example 6 of this invention;

FIG. 13c is the longitudinal section view schematic diagram of the power-generating unit based on example 6 of this invention, inside it the power-generating unit is installed at the lower part of the movement chamber;

FIG. 13d is the top view schematic diagram of the power-generating apparatus in FIG. 13a;

FIG. 13e is the top view schematic diagram of the movement body in FIG. 13a;

FIG. 13f is the top view schematic diagram of the shift device in FIG. 13a;

FIG. 14a is the longitudinal section view schematic diagram of the power-generating apparatus based on example 7 of this invention, inside it the power-generating unit is installed at the upper part of the liquid chamber;

FIG. 14b is the schematic diagram of the power-generating unit used for the power-generating apparatus based on example 7 of this invention;

FIG. 14c is the longitudinal section view schematic diagram of the power-generating unit based on example 7 of this invention, inside it the power-generating unit is installed at the lower part of the liquid chamber;

FIG. 14d is the top view schematic diagram of the power-generating apparatus in FIG. 14a;

FIG. 14e is the top view schematic diagram of the shift device in FIG. 14a;

FIG. 18a is the longitudinal section view schematic diagram of the power-generating apparatus based on example 11 of this invention;

FIG. 18b is the top view schematic diagram of the power-generating apparatus in FIG. 18a;

FIG. 18c is another directional section view schematic diagram of the power-generating apparatus in FIG. 18a;

FIG. 18d presents the construction schematic diagram of the delivery skateboard device of this invention;

FIG. 19b is the top view schematic diagram of the power-generating apparatus in FIG. 19a;

FIG. 20a is the longitudinal section view schematic diagram of the power-generating apparatus based on example 13 of this invention, inside it the downlink pipeline is declining pipe and installed at one side of the movement body;

FIG. 20b is the side view schematic diagram of the power-generating apparatus in FIG. 20a;

FIG. 20c is the top view schematic diagram of the power-generating apparatus in FIG. 20a;

FIG. 20d is the section view schematic diagram of the upward delivery pipeline of the power-generating apparatus of this invention;

FIG. 20e is the longitudinal section view schematic diagram of the power-generating apparatus based on example 13 of this invention; inside it the downlink pipeline is straight pipe installed between two liquid chambers;

FIG. 21 is the longitudinal section view schematic diagram of the power-generating apparatus based on example 14 of this invention;

FIG. 22b is the top view schematic diagram of the power-generating apparatus in FIG. 22a;

FIG. 22c is the schematic diagram of the power-generating apparatus in FIG. 22a;

FIG. 24a is the longitudinal section view schematic diagram of the power-generating apparatus based on example 17 of this invention;

FIG. 24b is another directional section view of the liquid chamber of the power-generating apparatus in FIG. 24a;

FIG. 24c is the A-A directional section view schematic diagram of the liquid chamber in FIG. 24a;

FIG. 24d to 24g are several shapes of the waterless pipeline used for example 17 of this invention;

FIG. 27b is the top view schematic diagram of the transportation device in FIG. 27a;

FIG. 27c is the enlargement schematic diagram of part A in FIG. 27a.

FIGS. 30a to 30f present the shift process of the shift device used in this invention;

FIGS. 31a to 31b present two forms of layout of the shift device and discharge device used in this invention;

FIGS. 32a to 32c present another structure of the movement body used in this invention and the structure of its corresponding shift device.

MODE OF CARRYING OUT THE INVENTION

Figure 7:
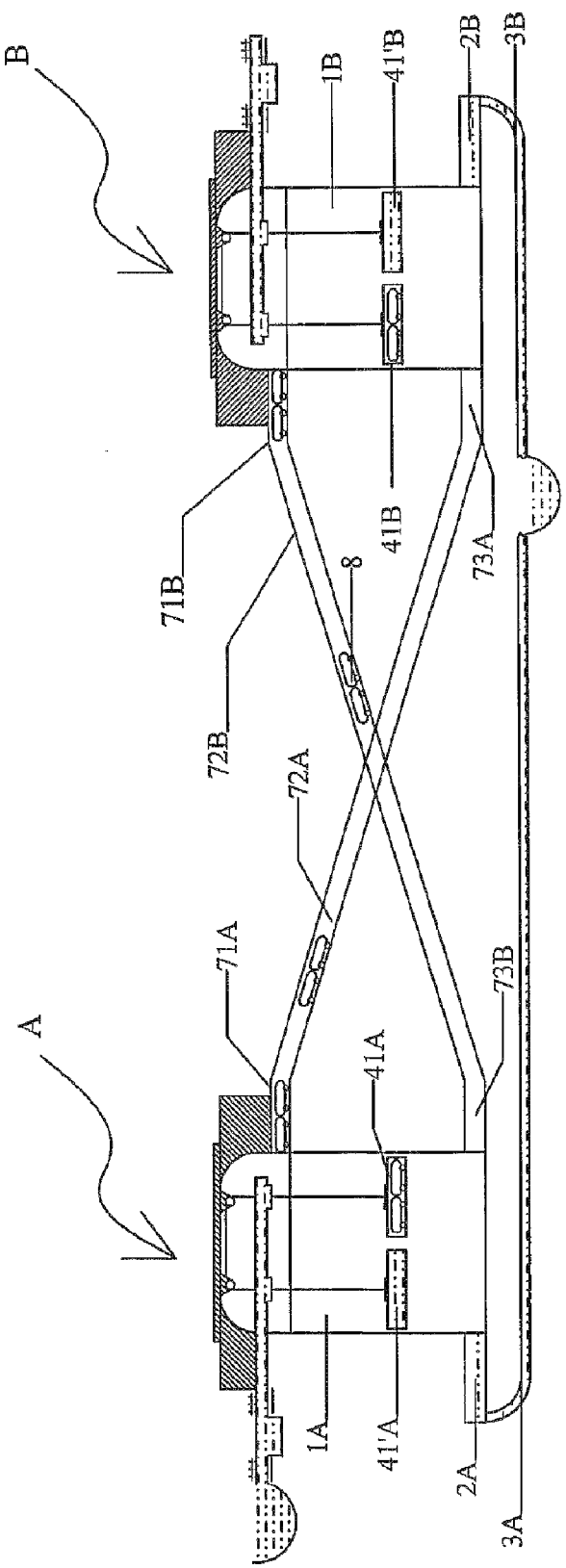
FIG. 7 is the longitudinal section view schematic diagram of the power-generating apparatus based on example 4 of this invention.

The examples are described in detail with figures. Thereinto, the same mark number is used for the same component.

Example 1

Please refer to FIGS. 1a and 1b which present the power-generating apparatus of example 1 of this invention.

According to the said invention, the power-generating apparatus of this invention comprises the movement chamber 1, the shift device 2 and the discharge device 3, the power-generating unit 4, the power transportation device 5 as well as liquid supply device 6.

To make full use of natural energy, the liquid used to change the weight of movement body in the said example is water. Preferably, the movement chamber 1 is the space digged in the ground of the river bank. It can also be set up in the location near the river but the terrain is lower than the river.

The shift device 2 is installed under movement chamber 1 with the trap door 21 and air hole (not shown). The trap door 21 will separate the movement chamber 1 from the shift device 2. Liquid inlet opening 22 is installed in the upper trap door 21.

The discharge device 3 is installed under the shift device 2 with a larger capacity than that of the shift device 2. The discharge device 3 has the same discharge hole (not shown) as the shift device 2. The liquid in the shift device 2 can enter the discharge device through the said discharge hole. The discharge device comprises the discharge pipe whose end leads to downstream rivers or discharge pipeline (not shown) whose terrain is lower than that of the discharge device 3 to timely empty the liquid discharged from the shift device 2 and prepare for the next liquid discharge. The discharge device also has air hole.

The power-generating unit 4 comprises paired movement bodies 41 and 41', the pulley block 42 connecting the paired movement bodies 41 and 41' for associated movement, the fixing device 43 installed at the upper part of the movement chamber 1 for fixing the entire pulley fixture, the magnet (or coil) installed on the movement bodies 41 and 41', as well as the coil (or magnet) installed correspondingly on the inner wall of the movement chamber. The pulley block 42 includes pulley 421 and toothed belt 422 with the toothed belt 422 around the pulley 421. The paired movement body 41 and 41' hang at both ends of the toothed belt 422 of pulley block 42, respectively and can be linked together to do reverse lifting and drop movement at the same time. The paired movement body 41 and 41' are two identical two hollow bodies whose shape can be set in accordance with the needs to a variety of shapes such as spherical, oblate spherical, cube and cone shape etc. Every movement body has liquid in-out opening 411 installed at its top and bottom, respectively. The location of the top liquid in opening 411 corresponds to the liquid inlet opening 62 on the liquid supply device 6. The location of the bottom liquid in opening 411 corresponds to the liquid inlet opening 22 on the upper trap door 21. The power-generating unit also has stabilization suspending device (not shown) installed between the said movement body and the liquid supply device.

The energy transportation device 5 comprises cable connected with the aforementioned coil and the corresponding output device.

The liquid supply device 6 includes derivation conduit (not shown) digged between movement chamber 1 and rivers. Sand and liquid separation device is set on the derivation conduit to avoid sand deposition in liquid supply device 6 and affect the service life of power-generating apparatus. The terrain settings of that river and the movement chamber 1 make the liquid in the river flow naturally into the liquid supply device 6 through that derivation conduit. The liquid supply device 6 includes the liquid pipeline 61 installed on the top of the movement chamber 1, several liquid inlet openings 62 installed in the liquid supply pipeline and liquid volume control device (not shown).

The working process of the power-generating apparatus of the said example is as follows: At initial position, the apparatus uses the stabilization suspension device to control movement body 41 in upper part of the movement chamber 1. That is the top of movement chamber and the top of its own movement route. The upper liquid in-out opening 411 aims at liquid inlet opening 62; the movement body 41' is placed at the bottom of movement chamber 1. That is the bottom of its own movement route. At this point when the liquid in-out opening 411 at the upper part of movement body 41 and liquid inlet opening 62 are opened, the liquid in the liquid supply device 6 flow naturally into the hollow part of movement body 41; The weight of movement body 41 after filled with liquid is heavier than the weight of movement body 41' without being filled with liquid. When the total weight of movement body 41 filled with liquid is heavier than the weight set by power generation, the apparatus controls the closure of the upper liquid in-out opening 411 and liquid inlet opening 62. At this point, as the total weight of movement body 41 is heavier than the weight of movement body 41', the movement body 41 goes down and brings the movement body 41' up through pulley block 42. That is the inner wall movement of movement body 41 and 41' relative to movement chamber. Because the coil and magnet used for power generation, as shown in FIG. 1b, are installed in the side wall of movement chamber and the outside of movement body, respectively, the relative movement of the magnet and coil produces power which is transported to public grid through the power transportation device 5.

When the movement body 41 moves to the lower part of movement chamber 1 and is located above the shift device 2, it controls the lower part liquid in-out opening 411 to aim at the liquid inlet opening 22 of the shift device 2. At this point, its linking movement body 41' has just arrived at the upper part of movement chamber 1, i.e. at the upper end of its own movement route, it controls its liquid in-out opening 411' to aim at liquid inlet opening 62. At this point, the apparatus starts the stabilization suspension device to control movement body 41 and 41' remaining at that position. It opens the liquid inlet opening 411' at the upper part of movement body 41' and liquid inlet opening 62, the lower part liquid inlet opening 411 of movement body 41 and liquid inlet opening 22, adds liquid to movement body 41' while discharging liquid from movement body 41 to the shift device 2; at the same time control opening discharge hole between the shift device 2 and discharge device 3 by autocontrol mechanical device to empty shift device 2 promptly.

When the liquid in movement body 41 is emptied, the apparatus controls the closure of the liquid in-out opening 411 of movement body 41 and the liquid inlet opening 22 of upper trap door 21. At this point, the movement body 41' has already been filled with liquid. The apparatus then loosens the stabilization suspension device and releases the movement body 41'. Because the total weight of movement body 41' is heavier than that of movement body 41, movement body 41' goes down while movement body 41 goes up. The process repeats and generates power in cycle.

Example 2

Please refer to FIG. 2a and FIG. 2b which are the longitudinal section view schematic diagram of example 2 of this invention.

According to the said invention, both the basic structure and working principle of power-generating apparatus of example 2 are same as that in example 1. The difference is: in example 2, coil and magnet are not directly setup at the side wall of movement chamber and outside of movement body. Instead, the power-generation unit is connected with pulley block for power generation. To be specific, the power-generating unit 4 in example 2 comprises two pairs of movement body 41,41', pulley block 42 as the transportation device, fixing device 43 installed in the upper part of movement space 1 and used to support the entire power-generating unit 44 and the power-generating unit 44 installed on the fixing device 43. The number of pulley blocks 42 and power-generating unit 44 all corresponds to the number of pairs of movement body, i.e. two groups, respectively. The structure of pulley block 42 is same as that in example 1, including pulley 421 and the toothed belt 422, paired movement body 41 and 41' hanging at both ends of the toothed belt 422 of pulley block 42, respectively and can be linked together to do reverse lifting and drop movement. The difference is that, toothed belt pulley 422 is rounded pulley 421 and the corresponding motor wheel. The movement of movement body 41 and 41' are sent to the motor wheel of each power-generating unit 44 through the pulley block 42 to drive power-generating unit rotation to generate power.

The working process of the power-generating apparatus of the said example is as follows: At initial position, the apparatus uses the stabilization suspension device to control movement body 41 in upper part of the movement chamber 1. That is the top of movement chamber and the top of its own movement route. The upper liquid in-out opening 411 aims at liquid inlet opening 62; the movement body 41' is placed at the bottom of movement chamber 1. This is the bottom of its own movement route. At this point when the liquid in-out opening 411 at the upper part of movement body 41 and liquid in opening 62 are opened, the liquid in the liquid supply device 6 flow naturally into the hollow part of movement body 41; The weight of movement body 41 after filled with liquid is heavier than the weight of movement body 41' without being filled with liquid. When the total weight of movement body 41 filled with liquid is heavier than the weight set by power generation, the apparatus control the closure of the upper liquid in-out opening 411 and liquid inlet opening 62. At this point, as the total weight of movement body 41 is heavier than the weight of movement body 41', the movement body 41 goes down and brings the movement body 41' up through pulley block 42. The falling of movement body 41 and the rising of movement body 41' drive the rotation of toothed belt 422. The rotation of toothed belt 422 drives the rotation of motor wheel which in turn drives the power-generating unit 44 to produce power. The produced power is transported to public grid through the power transportation device 5 connected with the coil of power-generating unit 44.

When the movement body 41 moves to the lower part of movement chamber 1 and stays above the shift device 2, it controls the lower part liquid in-out opening 411 to aim at the liquid inlet opening 22 of the shift device 2. At this point, its linked movement body 41' has just arrived at the upper part of movement chamber 1, i.e. at the upper end of its own movement route, it controls its liquid in-out opening 411' to aim at liquid inlet opening 62. At this point, the apparatus starts the stabilization suspension device to control movement body 41 and 41' remaining at that position. It opens the liquid inlet opening 411' at the upper part of movement body 41' and liquid inlet opening 62, as well as the lower part liquid inlet opening 411 of movement body 41 and liquid inlet opening 22, adds liquid to movement body 41' while discharging liquid from movement body 41 to the shift device 2; at the same time control opening discharge hole between the shift device 2 and discharge device 3 by autocontrol mechanical device to empty shift device 2 promptly.

When the liquid in movement body 41 is emptied, the apparatus controls the closure of the liquid in-out opening 411 of movement body 41 and the liquid inlet opening 22 of upper trap door 21. At this point, the movement body 41' has already been filled with liquid. The apparatus then loosens stabilization suspension device and releases the movement body 41'. Because the total weight of movement body 41' is heavier than that of movement body 41, movement body 41' goes down while movement body 41 goes up. The process repeats and generates power in cycle.

Example 3

Please refer to FIG. 3a~3c. FIG. 3a~3c present the power-generating apparatus of example 3 of this invention.

According to the said invention, the basic structure of power-generating apparatus of example 3 includes the power-generating apparatus with the same structure as that in example 2. In addition, a pipeline 7 is setup at the outside of movement chamber 1.

The pipeline 7 includes upward delivery pipeline 71, descending sloping downlink pipeline 72, as well as downward delivery pipeline 73. One end of upward delivery pipeline 71 connects to the top opening 11 of movement chamber 1, i.e. the upper part of movement route of movement body 41. Another end of upward delivery pipeline 71 connects to the beginning end of downlink pipeline 72 installed at the underground side of movement chamber 1. The terminal end of downlink pipeline 72 connects to one end of downward delivery pipeline 73. Another end of downward delivery pipeline 73 extends to the bottom opening 12 of movement chamber 1, i.e. the lower part of movement route of movement body 41. All the pipelines are equipped with duct track inside (not shown).

In addition, the power-generating apparatus of example 3 has at least one filling movement body 8 as shown in FIG. 5a~5i. The said filling movement body can be square cube, cube, round ball and oval ball etc, and can be equipped with rotating wheel 81. Through the rotating wheel 81, the filling movement body 8 can move descendingly along the duct track in the pipeline 7 by gravitational potential energy. The filling movement body 8 can be hollow and solid as well. Currently while using this apparatus for power generation, preferably, the filling movement body 8 is set to be solid; if the apparatus is expected to be used as human and goods transportation, the filling movement body should be set to be hollow. The hollow part can be used for loading human and goods. As shown in FIG. 4a, magnet is set up in inner wall of downlink pipeline 72 for power generation; coil is set up in filling movement body 8 for power generation. At this time, the power transportation device 5 is the cable connected with the coil of filling movement body and the transportation device connected with the said cable in manner of electric brush. As shown in FIG. 4b, coil can be set up in inner wall of downlink pipeline 72 for power generation; magnet can be set up in filling movement body 8 for power generation. At this time, the power transportation device 5 is the cable connected with the coil in the inner wall of downlink pipeline 72. As shown in FIGS. 4c and 4d, coil and magnet can be set up in rotating wheel 81; thereinto, magnet or coil is set up in inner track of the wheel and correspondingly coil or magnet is set up on the axle. The power transportation device 5 comprises the cable 51 installed close to the inner wall of the downlink pipeline 72, the wire 52 connected with the coil in the rotating wheel 81, as well as the trolleybus-style elastic rod cable buckle-grasping wheel 53 slipped and buckled on the cable 51 and connected with the wire 52.

Correspondingly, side door 412 is set up at the end of movement body 41 relative to the nozzle of downward delivery pipeline 73. After the side door 412 is opened, the filling movement body 8 that has moved to the nozzle of downward delivery pipeline 73 can enter the hollow movement body 41. The said filling movement body 8 can also be equipped with brake power-generating device. When the filling movement body 8 gradually enters the movement body 41 and its moving speed is controlled to gradually decrease to zero, the energy produced by this brake device can be used for power generation. The setting of this device is: the total weight of movement body and filling movement body should be less than the total weight of movement body and the set amount of water filled in it. Therefore, after filled with water, the role of movement body 41' is little, filling movement body 8 and movement body 41 ascend together.

FIG. 6a and FIG. 6b present two forms of layout of the shift device 2 and the discharge device 3 used for this invention. That is, the discharge device 3 can be installed either under or at the side of the shift device 2. Via 31 with a valve is set up between the shift device 2 and the discharge device 3.

In example 3, similarly due to the shifting of the shifting device 2, movement body 41 and 41' change status from descending to ascending alternately and then change status from ascending to descending; and ensure that the shift device has sufficient accommodation capacity by the discharge device 3, thus ensure that the shift device 2 can promptly convert the movement direction of movement body. At the same time, during its rising process, movement body 41 can carry the filling movement body 8 which has reached the end of pipeline 7 to an altitude with certain gravitational potential energy and this ensures that the filling movement body 8 can also convert status between ascending and descending in a timely manner.

As described in example 2, movement body 41 and 41' can generate power during the process of up and down movement. During the process of descending movement of the filling movement body 8, the above-mentioned installed coil and magnet make relative movement to generate power. Therefore this device can generate large amount of power continuously.

Example 4

Please refer to FIG. 7 which presents example 4 based on this invention.

The power-generating apparatus of example 4 shown in FIG. 7 is the combination of two power-generating apparatus A and B as described in example 3. Thereinto, the bottom nozzle of the downward delivery pipeline 73A of the power-generating apparatus A extends to the bottom of movement chamber 1B of the power-generating apparatus B, i.e. the bottom position where movement body 41B stays, so as to let the filling movement body 8 enter movement body 41B smoothly and rise to enter upward delivery pipeline 71B by the gravitation of movement body 41'B filled with liquid; then descend along downlink pipeline 72B until into the downward delivery pipeline 73B connected with the lower part opening of the power-generating apparatus A; then the filling movement body 8 move into the movement body 41A running in the movement chamber 1A by the gravitation of liquid-filled movement body 41'A and ascend with movement body 41A. This process repeats and generates power in cycle.

Example 5

Figure 8B:
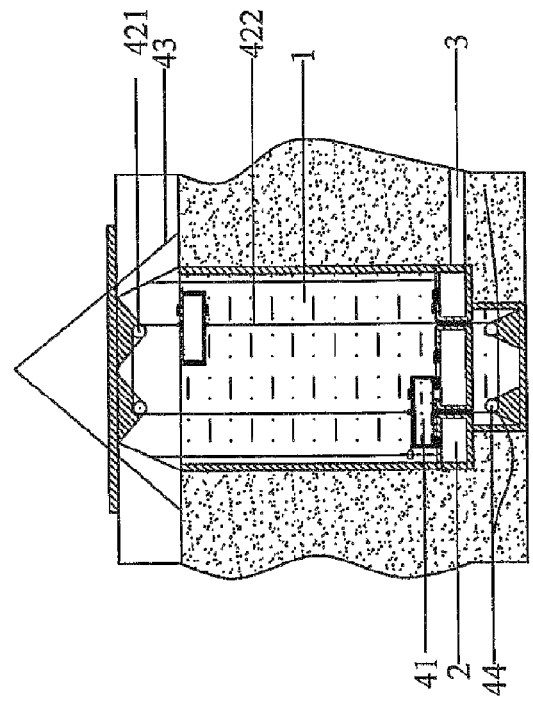
FIG. 8b is the schematic diagram used for the power-generating unit in the power-generating apparatus based on example 3 of this invention. Inside it the power-generating unit is installed at the lower part of the movement chamber or liquid chamber.
Figure 8A:
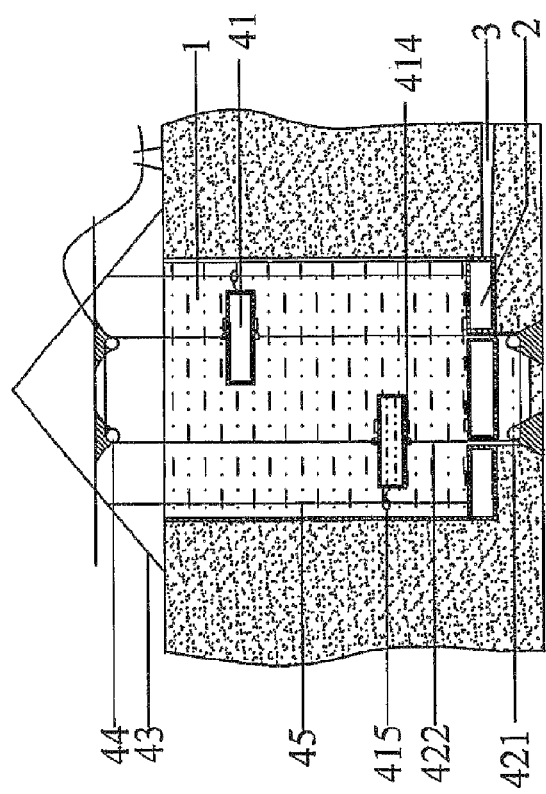
FIG. 8a is the longitudinal section view schematic diagram of the power-generating apparatus based on example 3 of this invention. Inside it the power-generating unit is installed at the upper part of the movement chamber or liquid chamber.

Please refer to FIG. 8a to 8c that present example 5 of this invention

According to the said invention, the power-generating apparatus of example 5 has the liquid chamber 1, shift device 2, discharge device 3 and the structure of movement body 41 and 41' that are same as those in example 2. The difference from example 1 is that in example 5, the liquid supply device 6 includes liquid volume control device (not shown) and liquid supply pipeline 61 that connected with the water source located at a higher terrain. The liquid supply pipeline 61 connects with the liquid chamber 1 directly. When the liquid supply device 6 is connected, the water from higher terrain water source naturally flow into the liquid chamber 1 through the said liquid supply pipeline 61 until the liquid of the liquid chamber 1 reach the ideal level and immerse movement body 41 and 41'. In addition, each pulley block 42 comprises two pulley installed in the upper or lower part of liquid chamber 1 and a toothed belt 422. The power-generating unit is correspondingly set up at the lower or upper part of liquid chamber 1. Correspondingly, the shift device 2 also includes via 23. The toothed belt 422 rounds pulley 421, goes through hole 24 of the shift device 2 and rounds the motor wheel of the corresponding power-generating unit 44 and formed a similar rectangle. By the fixing device 414, two movement body 41 and 41' are fixed at the corresponding position of both vertical sides of toothed belt 422. This is, when the movement body 41 at one vertical side of the toothed belt is at the upper part of liquid chamber 1; the movement body 41' at another side is just at the lower part of liquid chamber 1 and contacts the shift device 2. Therefore, the same principle as that in above examples, the movement body 41 and 41' can do the same ascending and descending movements as those in the said examples in the water of movement chamber 1.

The movements of movement body 41 and 41' are sent to the motor wheel of each power generating unit 44 through pulley block 42 and causes the power-generating unit 44 to rotate and generate power. The pulley block 42 includes pulley 421 and toothed belt 422; correspondingly, movement body 41 is equipped with several fixing device 413. The pulley 421 is fixed at the lower part of liquid chamber 1, the upper end of toothed belt 422 winds motor wheel, the bottom end of toothed belt 422 cross the through hole 24, winds the pulley 421 installed at the lower part of liquid chamber 1 and forms the similar rectangle. By fixing device 414, the movement body 41 is fixed at one vertical edge of the said similar rectangle. The power-generating unit 44 of example 5 can also be installed at the lower part of liquid chamber 1 while pulley 421 is fixed on the fixing device 43. As shown in FIG. 8c, stabilization unit 413 is set up under movement body 41 and 41' and sliding card connecting part 23 is installed above the shift device.

The working process of the power-generating apparatus of example 5 is as follows:

The liquid supply device is opened for supplying water to the liquid chamber 1 to an ideal level. At initial position, the movement body 41 is set up at the location of water surface in liquid chamber 1. Meanwhile the movement body 41' is at the location connecting with the shift device 2, the sliding card connecting part installed on the shift device 2 slides relatively to make the stabilization unit 413 on the movement body 41' fall between sliding card connecting part 23; then sliding card connecting part 23 is closed and stabilization unit 413 is stuck to temporarily hold the movement body 41' to the upper part of the shift device 2 with certain gap. At this point, the liquid in-out opening 411 at the upper and lower part of movement body 41 is opened. Because the entire or part of the movement body is immersed into the water in liquid chamber 1, water flow naturally into the hollow part of movement body 41; when the total weight of movement body 1 and water in it is heavier than the weight of movement body 41', the liquid in-out opening 411 at the top and bottom is closed by control and the sliding card connecting part 23 is opened to release the movement body 41'. At this point, because the total weight of movement body 41 is heavier than total weight of the movement body 41', the movement body 41 descends and the movement body 41' ascends at the same time. The movement of the movement body causes the rotation of toothed belt 422 and in turn causes the motor wheel installed at top and bottom to rotate; then the power-generating unit 44 produces power which is transported to public grid through the connected power transportation device.

When the movement body 41' reaches the upper part of the liquid chamber 1, i.e. water surface location of liquid chamber 1, movement body 41 descend to contact with the shift device 2 and its lower part liquid in-out openings 411 tightly butt with liquid inlet opening 22. The above said stabilization device 413 and card connecting part 23 are used to hold movement body 41 temporarily. At this point, the liquid in-out opening 411 at the lower part of movement body 41 and liquid inlet opening 22 are opened by control to discharge the water from movement body 41 into the shift device 2 and then to the downstream river through the discharge device 3. At the same time, the liquid inlet opening 411 at the upper and lower part of movement body 41' is opened by control. The water in the liquid chamber 1 flow naturally into the movement body 41'. The movement body 41 is released. Because the total weight of the movement body 41' is heavier than that of movement body 41, the movement body 41 goes up when movement body 41' goes down so as to drive toothed belt 411 and then the motor wheel to rotate and generate power. This process is repeated to make movement body 41 and 41' move in cycle to generate power in cycle continuously.

Example 6

Figure 9A:
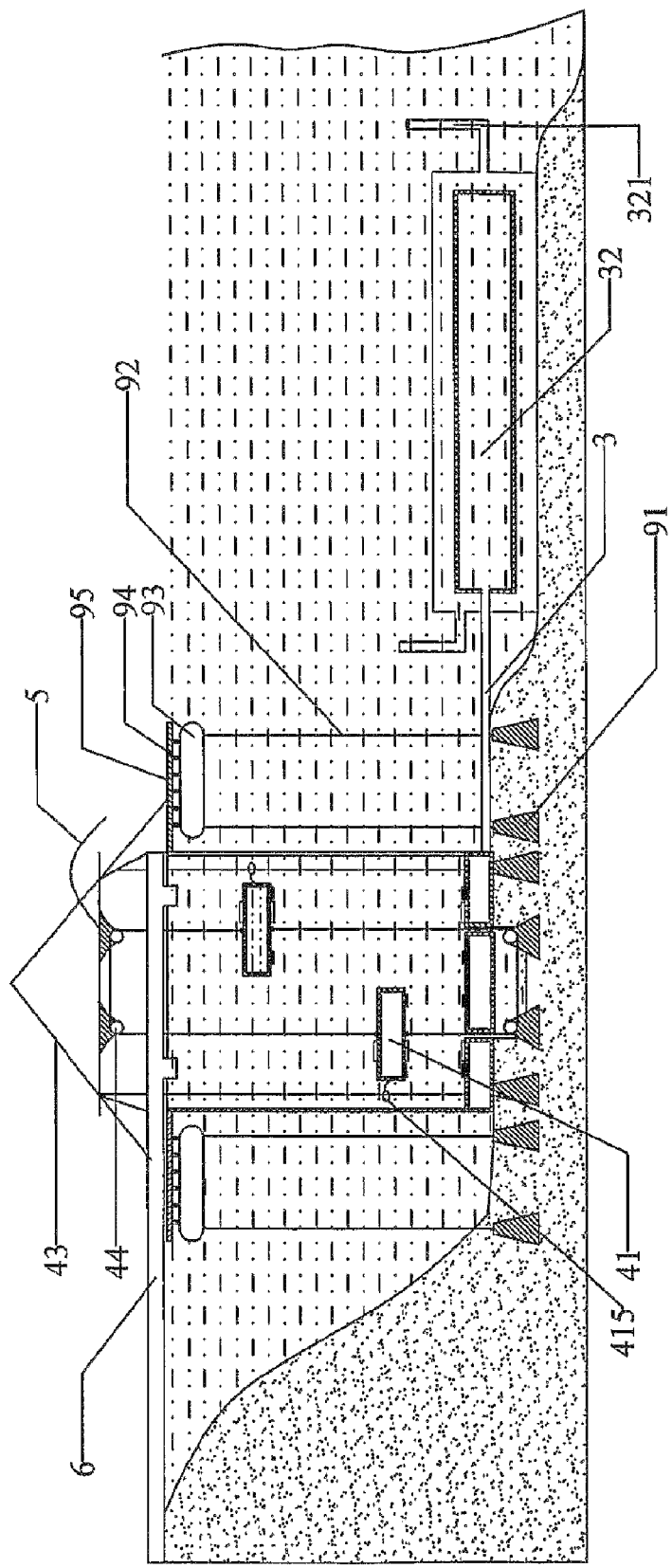
FIG. 9a is the longitudinal section view schematic diagram of the power-generating apparatus based on example 1 of this invention.
Figure 9B:
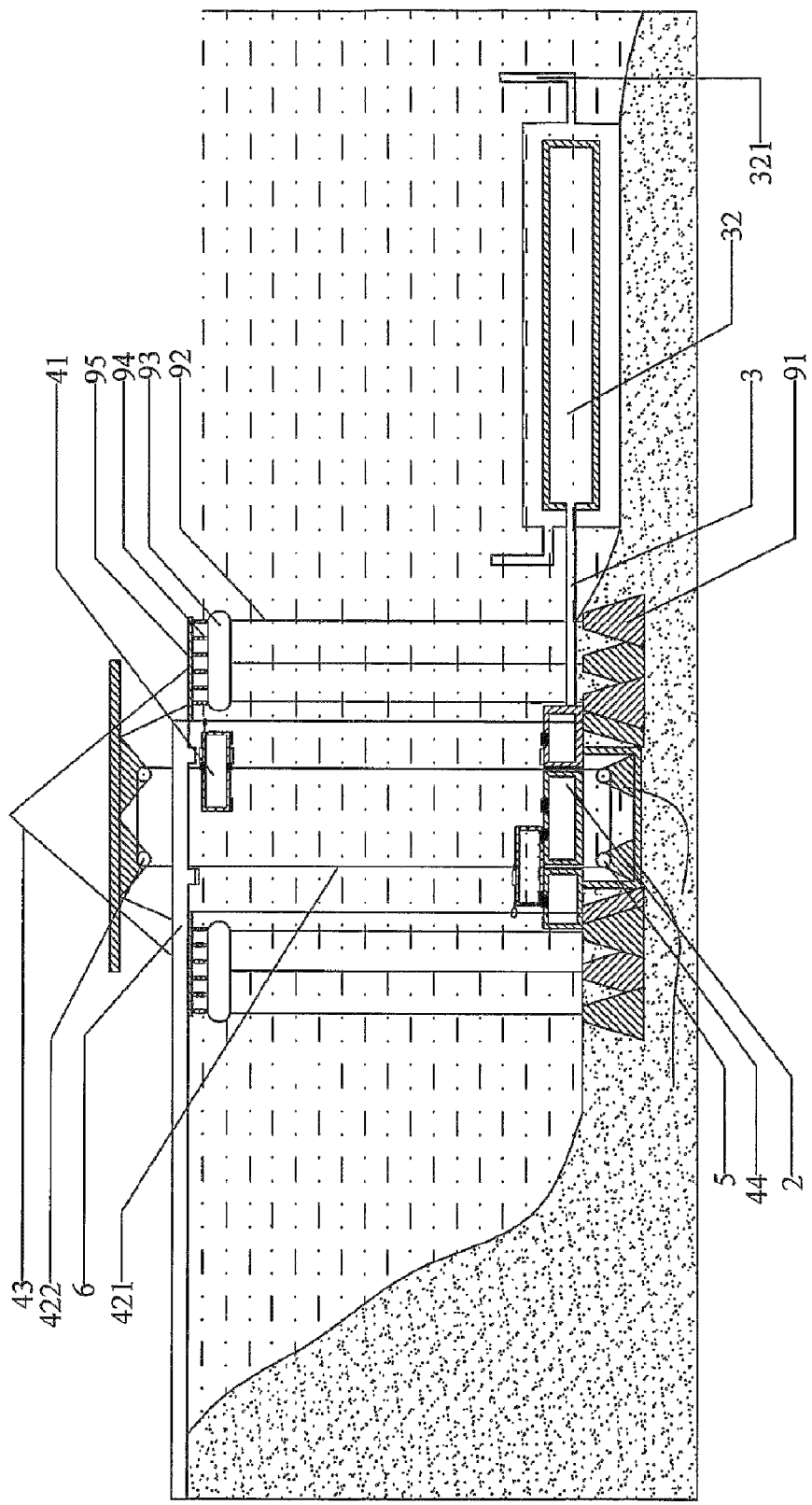

Please refer to FIG. 9a~9b that present the power-generating apparatus of example 6 of this invention.

In example 6, the power-generating apparatus which has the similar basic structure as that of example 5 of this invention is set in sea liquid. Thereinto, the power-generating apparatus of the said embodiment is set in the sea at the mouth of river. As shown in FIG. 9a and FIG. 9b, fresh liquid is filled into the movement body 41 and 41' through the liquid supply device 6 installed at the upper part of liquid chamber and connected with fresh water source. Therefore, the discharge device 3 also includes positive osmosis device 32 connected with another end of the discharge pipeline. The said positive osmosis device takes advantage of the concentration gap between fresh water and sea water to discharge the fresh water from the shift device into sea water by the way of cis-permeability membrane. As shown in the said embodiment, during the process of using fresh water to reduce the weight of movement body to generate power in cycle and of using concentration gap between fresh water and sea water to discharge fresh water from movement body into sea water, the said positive osmosis device can be set as the movable one in order to prevent that concentration variance in the sea water surround the discharge device caused by discharge affects continuing discharge. It can move around one end point of itself or move left and right so as to complete moving discharge from fresh water to sea water.

In addition, sea water can also be used directly to adjust the weight of movement body. That is, instead of setting up a separate liquid supply device, ocean is used as a natural water supply device. When it is necessary to discharge the sea water which is in the movement body and discharged from the shift device into the ocean with a certain depth, specialized discharge device is required. In another application the applicant proposed a seawater reverse osmosis device that can use magnetic energy efficiently and use the reverse osmosis technology and the way of reverse osmosis membrane to discharge the sea water from the movement body into the surrounding ocean environment and enable the entire power generation process continue in cycle.

Since all components are installed in the sea liquid, there is no need to setup walls of liquid chamber 1 so as to save materials and simplify the building requirement. Therefore, specialized fixing device 9 is needed to fix each component. The fixing device 9 includes the anchorage pile 91 installed in the ground floor of the ocean, the steel cable 92 fixed in anchorage pile 91, the floater 93 fixed by steel cable 92, the float board support column 94 fixed on the floater 93, the float board 95 fixed on the top of float body support column 94. The float board 95 has the same shape above the liquid surface as that at the upper part of liquid chamber 1 in example 5. Certainly in this embodiment, the wall of liquid chamber 1 can be set in the sea liquid as shown in FIG. 9a.

In addition, in order to control movement body 41 and 41' move along the set route, a vertical orientation guiding sliding track 45 is set up and ring-shaped sliding hook 415 is set up at the side of movement body 41. The structures of shift device 2, power-generating unit 4 and power transportation device 5 are basically same as those in example 5.

The power-generating unit 44 and the fixing device 43 are fixed on the float board 95. The pulley 421, the shift device 2 and the discharge device 3 are installed in the ground floor of ocean and reinforcement is done at the underneath ocean floor. The vertical orientation guiding sliding track 45 has one end fixed with the anchorage pole 91 in the ground floor of ocean and another end fixed on the float board 95.

The working process of the power-generating apparatus of the said embodiment is the same as that of example 5 and will not be repeated.

Example 7

Figure 10B:
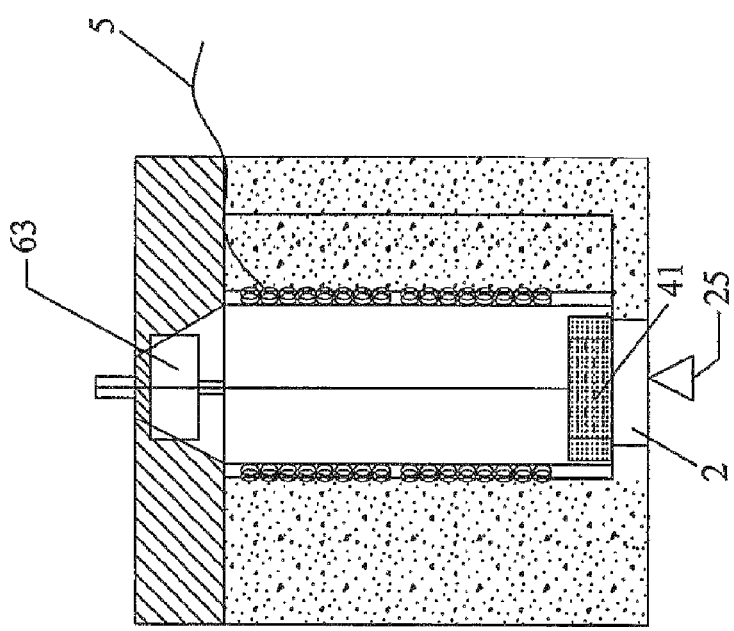
Figure 10A:
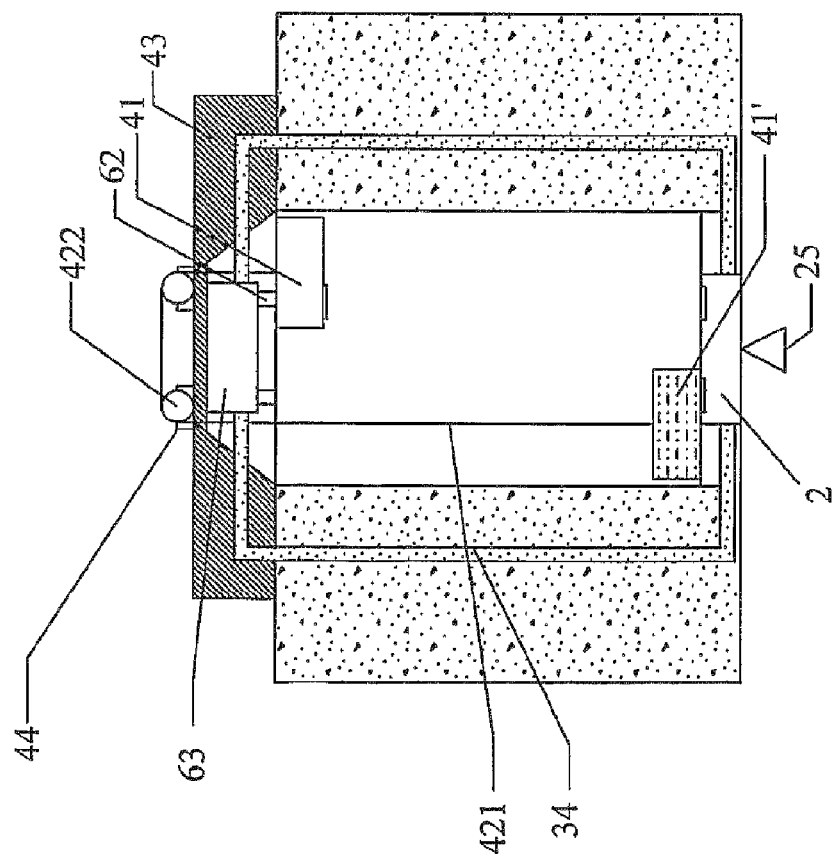
FIG. 10a is the longitudinal section view schematic diagram of the power-generating apparatus based on example 1 of this invention.

Please refer to FIG. 10a~10b that present the power-generating apparatus of example 7 of this invention.

In the power-generating apparatus of this embodiment, the movement chamber 1, power-generating unit 4 and power transportation device 5 etc are all the same as those in the example 1 of this invention. The power generation theory is also the same as that in first embodiment. The difference between the power-generating apparatus of this embodiment and that of example 1 is that: this embodiment makes use of the basic principle that material may transform between liquid and vapor at different temperature to move the liquid discharged from the movement body into the shift device into the liquid supply device at the upper part of movement body for repetitive use so as to realize the continuous process of power generation. The specific process is that adding heat source into shift device to vaporize the liquid discharged from the movement body into the shift device; based on the theory that vapor may naturally effuse into any possible space to send vapor back to the liquid supply device at the upper part of movement chamber 1; then condensate the vapor in liquid supply device into liquid; then use the liquid from condensation to adjust the weight of movement body and bring the liquid back into the movement body again. This process can make the liquid changing the weight of movement body be used in cycle. The heat source used in the vaporization process can be natural energy such as geothermal or collected solar energy etc. The condensation process can use the natural difference between underground and ground temperature; and if necessary, use the refrigeration devices with refrigerant.

In this embodiment, the shift device 2 includes the heat source 25 installed below or at one side. The energy in heat source 25 may come from geothermal or solar energy. The liquid supply device 6 is a cavity room 63 which is set up at the upper part of movement chamber 1. It has liquid inlet opening 6 corresponding to the liquid inlet opening on movement body 41. At this point, the shift device 2 constitutes a heating room and the collecting room 6 constitutes a condensation compartment.

When the liquid in the movement body 41 is discharged to the shift chamber 2, it is heated by the heat source and vaporized into liquid vapor which ascends along the connected discharge pipeline 34 and collected by the collecting room 63 at the top end of discharge pipeline 34, and cooled naturally inside it, then transformed into liquid. When movement body 41 moves to the top end of its movement route, it connects to the liquid out opening of collecting room 63. The liquid in collecting room 63 flows into the movement body 41 because of its gravitation, thus the total weight of movement body 41 filled with liquid is heavier than the weight of movement body 41, the movement body filled with liquid goes down. The rest of process is same as that of the first embodiment.

Figure 11B:
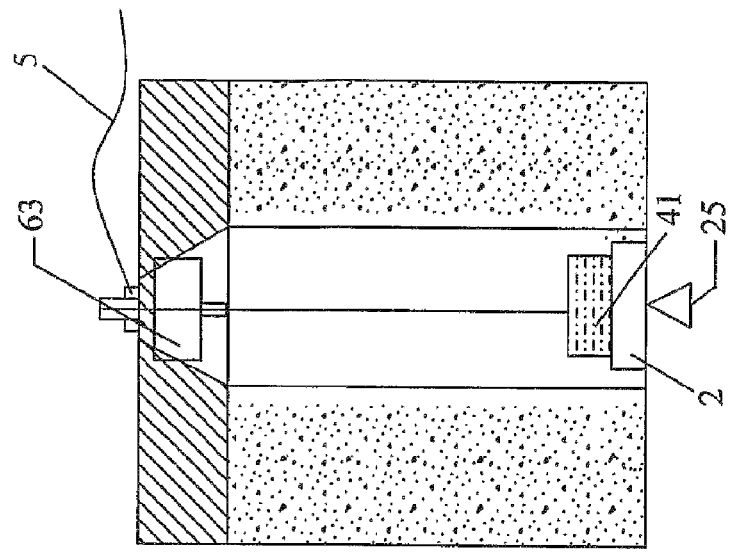
Figure 11A:
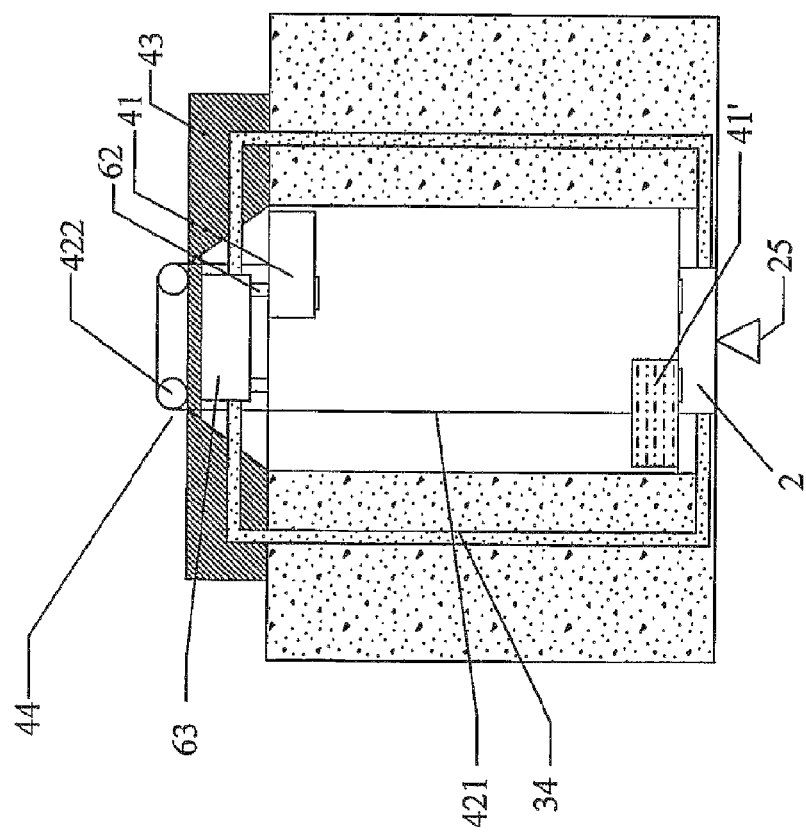
FIG. 11a is the longitudinal section view schematic diagram of the power-generating apparatus based on example 1 of this invention.

Please refer to FIG. 11a~11b that presents the power-generating apparatus of example 7 of this invention.

In the power-generating apparatus of this embodiment, the movement chamber 1, power-generating unit 4, power transportation device 5 and liquid supply device etc are all the same as those in the second embodiment of this invention. The theory of power generation is also the same as that in second embodiment. Difference between the power-generating apparatus of this embodiment and that of the seventh embodiment is that: this embodiment makes use of the basic principle that material may transform between liquid and vapor at different temperatures, by adding heat source to vaporize the liquid discharged from the movement body into the shift device into the liquid supply device, based on the theory that vapor may naturally ascend to send vapor back to the liquid supply device 63 at the upper part of movement chamber 1; condensate the vapor in liquid supply device into liquid; then use the liquid from condensation to adjust weight of movement body for continuous use. The heat source used in the vaporization process can be natural energy such as geothermal or collected solar energy etc. The condensation can use the natural gap between underground and ground temperature; and if necessary, use the refrigeration devices with refrigerant.

Specifically, the shift device 2 of this embodiment includes a shift room 2 and the heat source 25 at either side of it. The energy in heat source 25 may come from geothermal or solar energy. The liquid supply device 6 is a cavity cell 63 installed at the upper part of movement chamber 1. It is equipped with liquid outlet opening 62 corresponding to the liquid inlet opening on the movement body 41. At this point, the shift device 2 constitutes a evaporation room and the liquid supply device constitutes a condensation room. The discharge device is a thermal insulation discharge pipeline 34 to avoid early condensation due to the heat exchange between the air through discharge pipeline 34 and surrounding environment. For example, the discharge pipeline 34 may use high quality corrosion resistance ceramic pipeline surrounded by high quality thermal insulation material. The shift device 2 as vaporization room connects with the liquid supply device 6 as the condensation room through the thermal insulation pipeline 34.

The working liquid can be water. If water is used as working liquid, the device may be set up in the environment with an underground temperature above 100 degrees such as high temperature hot spring area. The cell in the liquid supply device may use good quality cooling device to make the steam collected in that cell rapidly condensate by taking advantage of the natural temperature difference between above and under the ground. If the speed of natural condensation doesn't meet the needs, cooling device may be installed in the liquid supply device to quicken the effectiveness of steam condensation and ensure supply water into the movement body promptly. The working liquid may not be water. It can be replaced by the liquid gas such as liquid nitrogen, LiBr and Freon that requires less temperature difference to transform between liquid and gas. In this way the requirement for temperature difference between condensation room and vaporization room is low and thus it can be widely applied to various environments.

The working process of supplying, shifting and discharging the liquid in the movement of this embodiment is as follows:

When the liquid in the movement body 41 is discharged into the shift device 2, it is heated by the heat source 25 and vaporized into liquid gas which ascends along the connected discharge pipeline 34 and collected by cavity cell 63 at the top end of discharge pipeline 34, and cooled naturally inside, then transformed into liquid. When movement body 41 moves to the top end of its movement route, it connects with the liquid outlet opening of cavity cell 63. The liquid in cavity cell 63 flows into the movement body 41 by its gravitation, thus makes the total weight of movement body 41 filled with liquid heavier than the weight of movement body 41' that being discharged, thus the liquid-filled movement body 41 goes down and cause the movement body 41' go up.

In the power-generating process of the above said embodiments, through the discharge device 3 to ensure that the shift device 2 has sufficient accommodation capacity which can ensure the movement body 41 and 41' change from descending state to ascending state and verse vice promptly with continuous and repetitive up and down vertical movements. The movement body 41 and 41' can generate power in both descending and ascending process, hence this device can generate large amount of power uninterruptedly. In term of power generating capacity is calculated as 6,000,000 kilowatts per hour, the weight of movement body 41 is 11,688.52 tons, the usage of liquid is 3061.22 cubic meters per second, power-generating capacity is 4,000,000 kilowatts per hour in the descending process and 2,000,000 kilowatts per hour in the ascending process. The power generated in the ascending process is twice as much as that in the descending process.

Please refer to FIG. 12*a* to 12*e* which present the power-generating apparatus based on example 8 of this invention, the power-generating apparatus based on example 8 of this invention comprises liquid chamber 1, shift device 2 and discharge device 3, power-generating unit 4, and power transportation device 5.

Preferably, liquid chamber 1 is installed at river bank with appropriate amount of water; derivation conduit (not shown) is digged between the liquid chamber and rivers. Derivation opening is (not shown) installed on one side of the upper part of the liquid chamber 1 connected to the forth-said derivation conduit to add liquid to the liquid chamber 1. Sand and liquid separation device is set on the derivation conduit to avoid sand deposition in liquid chamber 1 and affect the service life of power-generating apparatus.

The shift device 2 is installed under liquid chamber 1 with the upper trap door 21 and air hole (not shown), the trap door 21 will separate the liquid chamber 1 from the shift device 2. Liquid inlet opening 22 is installed at the upper part of the upper trap door 21.

The discharge device 3 is installed under the shift device 2 with a larger capacity than that of the shift device 2. The discharge device 3 has the same discharge hole (not shown) as the shift device 2, the liquid in the shift device 2 can enter the discharge device through the discharge hole. The discharge device comprises the discharge pipe whose end leads to downstream rivers or discharge pipeline (not shown) to timely empty the liquid discharged from the shift device 2 and prepare for the next liquid discharge. The discharge device also has air hole.

The power-generating unit 4 comprises movement bodies 41 which is hollow cabinet with a plurality of upper and lower liquid in-out opening 413, thereinto, the location of the lower liquid in-out opening corresponds to the location of the liquid inlet hole 22 on the upper trap door 21. The relationship between gravitation and flotage of the movement body 41 can be changed through filling liquid to the hollow part of movement body 41 or discharging liquid from it to convert kinetic energy into electric energy by doing descending and descending movements in liquid chamber 1 continuously to generate power.

The movement body 41 begins ascending when it discharges partial liquid to the extent that its gravitation is smaller than its floatage, at this point, liquid in movement body 41 has not been discharged fully, the difference between gravitation and floatage of movement body 41 is extremely small, the floating potential energy of movement body 41 is relatively small, therefore, specialized stabilization suspension device is required to control the movement body 41 that has been descended to the end of the liquid chamber 1 remaining above the shift device 2 to realize liquid discharge fully. According to this, as shown in FIG. 12*a* and FIG. 12*e*, in the present embodiment, several stabilization-retention mechanisms 23 are installed on the upper trap door 21 which includes fixing pieces set on the upper trap door 21 as well as the connecting part of the sliding card 222 connected to the fixing pieces through rotating ball, the paired of connecting part of the sliding card 222 can be sliding, opened or closed relative to each other. The underside of movement body 41 is also equipped with several stabilization pieces 412 which can be stuck into connecting part of the sliding card 222 of stabilization suspension mechanism 23. Stabilization suspension mechanism 23 is utilized to fix movement body 41 on shift device 2 temporarily when it descends into the bottom of liquid chamber 1, so as to discharge liquid fully.

There are two forms of layout of the coil and magnet used for power generation in this embodiment. As shown in FIG. 12a, magnet is installed in the inner side of liquid chamber 1, coil is installed in the inner side of movement body 41. At this point, the power transportation device 5 is cable connected to the coil in movement body 41 and electric brush connected to the cable to transport the generated power caused by movement body 41 to public grid. As shown in FIG. 12c, coil is installed in the inner side of liquid chamber 1, magnet is installed in the inner side of movement body 41, at this point, the power transportation device 5 is cable connecting the coil to public grid. In order to control the gap between movement body 41 and inner side of movement chamber 1 to keep power generation in a stable state, a rotating wheel 411 that contacts with the inner side of movement chamber 1 is installed on the movement body 41 and can move on the inner side of movement chamber 1.

The working process of the power-generating apparatus of the said example is as follows:

The movement body 41 is placed at the location of water surface in movement chamber 1, the liquid in-out opening at its upper and lower part are opened by control, the liquid in liquid chamber 1 naturally flow into the hollow part of movement body 41; when the total weight of movement body 1 and liquid in it is heavier than the floatage of movement body 41 and reaches the weight set by power generation, the liquid in-out opening at its upper and lower part is closed by control. At this point, as the overall gravitation of the movement body is larger than its floatage, that is, the density of the movement body 41 is larger than that of liquid, movement body 41 descends to move downwards relative to the inner side of liquid chamber 1, that is, the relative movement of the magnet and coil produces power which is transported to public grid through the power transportation device 5 that is connected to the coil.

When movement body 41 moves to the bottom of movement chamber 1 and connects with shift device 2 with certain gap, the sliding card connecting part 222 slides relatively to make the stabilization pieces 412 of the movement body 41 fall between sliding card connecting part 222 and contact with fixing device 221; then sliding card connecting part 223 is closed by control and stabilization piece 412 is stuck to temporarily hold the movement body 41 to the upper part of the shift device 2 with certain gap. meanwhile, the liquid in-out opening at the lower part of movement body 41 is connected with liquid inlet opening 22 on shift device 2 by control, the valves on the said lower liquid in-out opening and liquid inlet opening 22 are opened, liquid in the hollow part of movement body 41 are discharged into shift device 2 because of the gravitation, meanwhile, the discharge hole between the shift device 2 and the discharge device 3 is opened by control to timely empty the discharge device 3. When the liquid in movement body 41 is empty, the liquid in-out opening 413 of movement body 41 and liquid inlet 22 of upper trap door 21 are closed by control, meanwhile, the sliding card connecting part 222 is loosen to release movement body 41. At this point, the floatage of movement body 41 is larger than its gravitation, that is, the density of the movement body is smaller than that of liquid, the movement body 41 does ascending movement relative to the inner side of liquid chamber 1, that is, the relative movement of the coil and magnet produces power which is transported to public grid through the power transportation device 5.

When movement body 41 reaches the water surface of liquid chamber 1, the above said process is repeated to move the movement body 41 in cycle.

During the whole process, the movement body 41 descends at first because of the function of gravitation, when it reaches the bottom of liquid chamber 1, the relationship between its floatage and gravitation is changed by shifting of shift device to convert its state from descending to ascending, and then it ascends because of the function of floatage. Through the discharge device 3 to ensure that the shift device 2 has sufficient accommodation capacity which can ensure the movement body 41 change from descending state to ascending state and verse vice promptly with continuous and repetitive up and down vertical movements. The movement body 41 can generate power in both descending and ascending process, hence this device can generate large amount of power uninterruptedly. In term of power generating capacity is calculated as 6,000,000 kilowatts per hour, the weight of movement body 41 is 11,688.52 tons, the usage of liquid is 3061.22 cubic meters per second, power-generating capacity is 4,000,000 kilowatts per hour in the ascending process and 2,000,000 kilowatts per hour in the descending process. The power generated in the ascending process is twice as much as that in the descending process.

Please refer to FIG. 13a to 2f that present the power-generating apparatus based on example 9 of this invention.

As shown in FIG. 13a, in the power-generating apparatus based on example 9 of this invention, both the structures of movement chamber 1 and discharge device 3 are same as those in example 1.

As shown in FIG. 13b, 13e, the structure of shift device 2 is basically same as that in example 8 which has upper trap door 21 as well as stabilization suspension device 23 and liquid inlet opening 22 installed there. In addition, the upper trap door 21 is also equipped with the first through hole 24.

As shown in FIG. 13a, 13b and 13d, the power-generating unit 4 comprises movement body 41, pulley block 42 as transmission device, fixing device 43 installed at the upper part of the liquid chamber 1 and an array of power-generating unit 44 installed on the fixing device 43.

As shown in FIG. 13b, 13e, movement body 41 is hollow body has a structure that is basically same as that in example 8, several liquid in-out openings 413 that can be opened or closed are installed at upper or lower part of the movement body 41, thereinto, the location of the lower liquid in-out opening corresponds to the location of liquid inlet opening 22 installed on the upper trap door 21.

As shown in FIGS. 13a and 13b, the amount of pulley block 42 is same as that of power-generating unit 44. The movement of movement body 41 is sent to the motor wheel of each power-generating unit 44 through the pulley unit 42 to drive power-generating unit rotation to generate power. Pulley unit 42 includes pulley 421 and toothed belt 422; correspondingly, the movement body 41 is also equipped with several fixing devices 414 and the second through holes 415, the location of the second through hole 415 corresponds to that of the first through hole, respectively. The pulley 421 is fixed at the upper part of liquid chamber 1, the upper end of toothed belt 422 winds motor wheel, the bottom end of toothed belt 422 cross the first through hole 24 and the second through hole 415, winds the pulley 422 installed under the liquid chamber 1 and forms the similar rectangle, by fixing device 414, the movement body 41 is fixed at one vertical edge of the said similar rectangle.

As shown in FIG. 2f, the power-generating unit 44 also can be installed at the lower part of the movement chamber 1 while the pulley 422 is fixed on the fixing device 43. A ring-shaped sliding hook 416 that installed on the movement body 41 and a guiding sliding track 45 installed in movement chamber 1 are also doable to control the movement body 41 to move along the set route. The working process of the power-generating apparatus based on this embodiment is as follows:

The movement body 41 is placed at the location of water surface of liquid chamber 1, the liquid in-out opening 413 at its upper and lower part are opened by control, the liquid in movement chamber 1 flow naturally into the hollow part of movement body 41; when the total weight of movement chamber 1 and the liquid in it is heavier than its floatage and reaches the weight set by power generation, the upper and lower liquid in-out openings 413 are closed. At this point, as the gravitation is larger than floatage, that is, the density of the movement body 41 is larger than that of liquid, the movement body 41 descends. The descending of movement body 41 drives the power-generating unit 44 rotation, the toothed belt 421 drives the motor wheel rotation, in turn drives the power-generating unit 44 to generate power. The generated power is transported to public grid through the power transportation device 5 connected to the coil in power-generating unit 44.

Please refer to FIG. 14a to 14e that present the power-generating apparatus based on example 10 of this invention.

In the power-generating apparatus based on example 10 of this invention, the structures of liquid chamber 1, shift device 2, discharge device 3 are same as those in example 9.

As shown in FIGS. 14a and 14b, the structure of power-generating apparatus 4 also is basically same as that in example 9 with the difference in that the power-generating unit 44 is set in two rows in this embodiment; movement body 41 are two identical hollow bodies, each pulley block 42 corresponds to two power-generating units 44 set in two rows. Each pulley block 42 includes two pulleys 421 installed at the lower part of liquid chamber 1 and a toothed belt 422, the toothed belt 422 rounds pulley 421 and corresponding motor wheel to form the similar rectangle. By the fixing device 414, two movement bodies 41 are fixed at the corresponding position of both vertical sides of toothed belt 422. This is, when the movement body 41 at one vertical side of the toothed belt 422 is at the upper part of move chamber 1; the movement body 41 at another side is just at the lower part of movement chamber 1 and contacts the shift device 2.

The working process of the power-generating apparatus based on this embodiment is basically same as that in example 9 with the difference in that: when the movement body 1 at the vertical side of toothed belt 422 goes up, the movement body 41 at another side goes down, so as to generate power in cycle continuously.

The present embodiment also utilizes shifting of shift device 2 to change movement state of movement body 41, in turn connects the two processes of power generation by gravitation and floatage. Meanwhile increase the amount of power generation by installing two movement bodies 41 on the one and same pulley block 42.

Figure 15A:
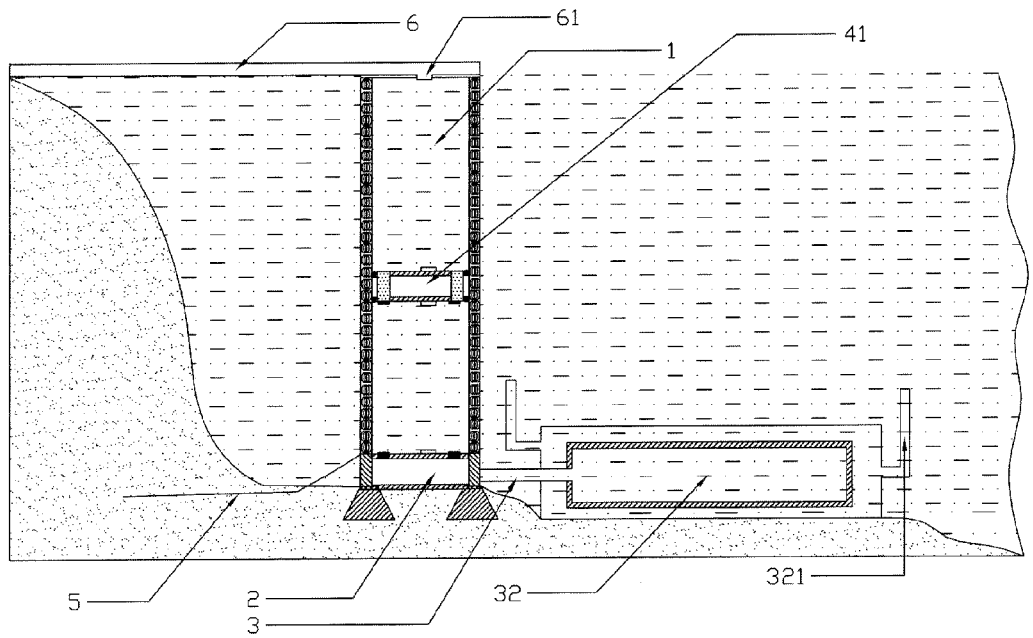
FIG. 15a is the longitudinal section view schematic diagram of the power-generating apparatus based on example 8 of this invention, inside it coil is installed in the inner wall of the liquid chamber, magnet is installed in the movement body.
Figure 15B:
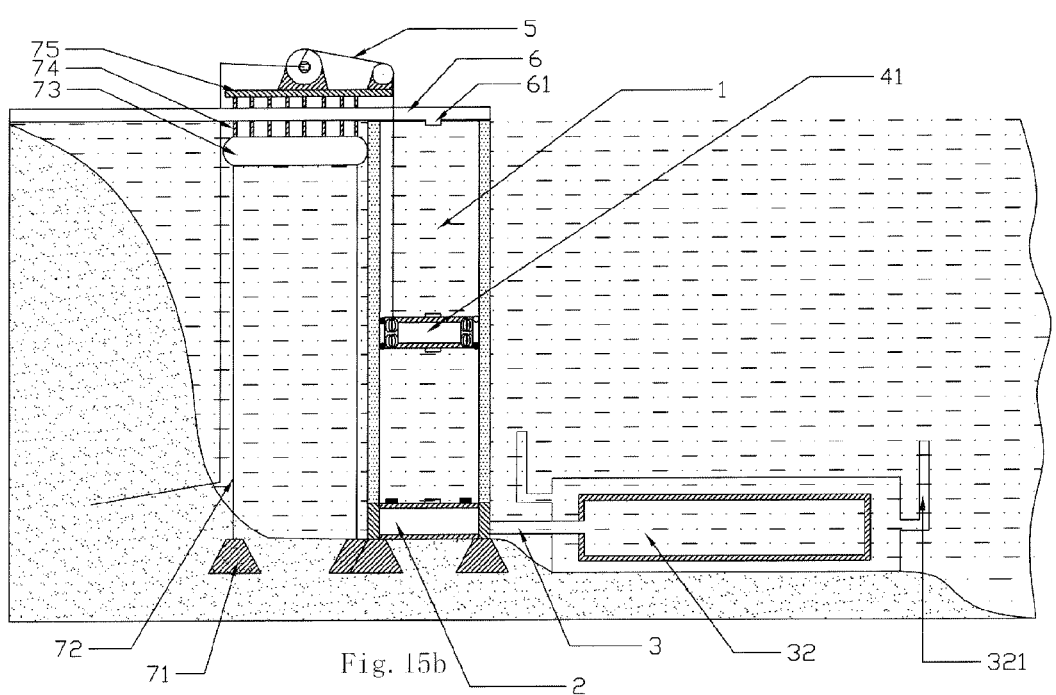
FIG. 15b is the longitudinal section view schematic diagram of the power-generating apparatus based on example 8 of this invention, inside it magnet is installed in the inner wall of the liquid chamber, coil is installed in the movement body.

Please refer to FIG. 15a and FIG. 15b that present the power-generating apparatus based on example 11 of this invention.

In the present embodiment, the power-generating apparatus that is basically same as that in example 8 is installed in the sea at the mouth of river. Thereinto, the structures of liquid chamber 1, shift device 2, discharge device 3 and power-generating unit 4 are basically same as those in example 8 with the difference that: fresh liquid derivation conduit 6 is installed at the upper part of the movement chamber 1 which has one end leading to rivers and another end leading to the upper part of liquid chamber 1 equipped with liquid inlet opening 61. Movement body 41 is equipped with all the components that are same as those in example 8, thereinto, the liquid in-out opening 413 at the upper part of movement body 41 corresponds to the location of liquid inlet opening 61 to fill liquid into movement body 41. As the liquid chamber 1 is installed in sea liquid, the fresh liquid discharged into the shift device 2 from movement body 41 can be discharged into sea liquid through positive osmosis device 32. Therefore, besides the components same as those in example 8, the discharge device 3 in this embodiment further includes positive osmosis device 32 installed at the location with a depth lower than 200 m preferably, there is a sea liquid delivery pipeline 321 set on the positive osmosis device 32 to delivery the sea liquid at other locations into the location around the positive osmosis device 32 to ensure fresh liquid flow into sea liquid through positive osmosis continually in high speed by delivering sea liquid at other locations, thereby ensure the sufficient capacity of shift device 2, and converting the movement state of movement body 41 timely and quickly.

In the present embodiment, there are also two forms of layout of the coli and magnet used for power generation, as shown in FIG. 15a, coil is installed in inner side of liquid chamber, magnet is installed in movement body. When coil is installed in movement body 41, cable and electric brush connected to the cable that are installed in the power-generating apparatus are required to enable the movement body 41 transporting power through the cable connected on it during ascending and descending stage. In order to install the power transportation device such as electric brush on location of water surface that close to the liquid chamber 1, underwater fixing device 7 is required, the underwater fixing device 7 comprises the anchorage piles 71 installed on the ground floor of the ocean, the steel cable 72 fixed on the said anchorage piles 71, the floater 73 connected with the top end of the said steel cable 72, and the floating board 75 and its support connected with the said floater 73. The power-generating apparatus 5 is fixed on the floating board 75.

The working process of the power-generating apparatus based on this embodiment is as follows:

The movement body 41 is placed at the location of water surface in liquid chamber 1, the liquid in-out opening 413 at the upper part of movement body 41 is tightly butt and connected with liquid inlet opening 61 by control, liquid in liquid inlet pipe 6 naturally flow into the hollow part of movement body 41; when the total weight of movement body 41 and the liquid in it is heavier than its floatage and reaches the weight set by power generation, the upper liquid in-out opening 413 is closed by control. At this point, because of the gravitation is larger than the floatage, the movement body does descending movement as that in example 8 to generate power and transport the generated power to public grid by the way same as that in example 5.

When movement body 41 reaches the bottom of liquid chamber 1 and contacts with shift device 2, fresh liquid in the hollow part of movement body 41 is discharged fully into shift device 2 by the way same as that in example 8, and then discharged into positive osmosis device 32 by the way same as that in example 1, in turn discharged into sea liquid through the positive osmosis device 32. When the liquid in movement body 41 are emptied, the valves on the lower liquid in-out opening 413 and liquid inlet opening 22 are closed by control, at this point, the floatage of movement body 41 is larger than its gravitation, the movement body 41 dose ascending movement by the function of floatage to generate power and transport the generated power to public grid by the way same as that in example 8.

When movement body 41 reaches the location of water surface in liquid chamber 1, the above said process repeats to generate power by movement of movement body 41. The generated power is transported to public grid through power transportation device 5 connected to power-generating unit 44.

Figure 16A:
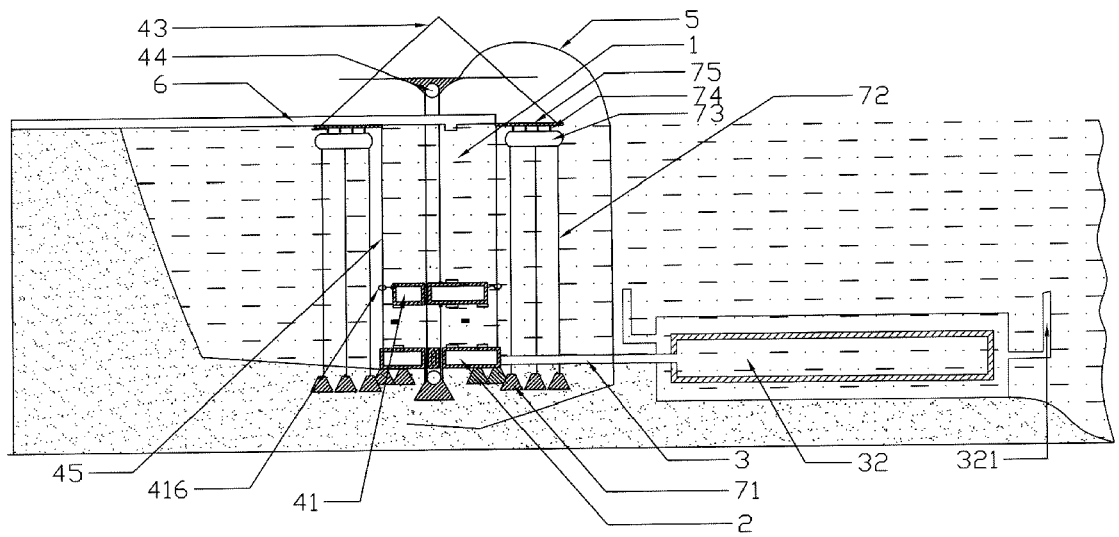
FIG. 16a is the longitudinal section view schematic diagram of the power-generating apparatus based on example 9 of this invention, inside it derivation conduit is installed on the upper end of the liquid chamber.
Figure 16B:
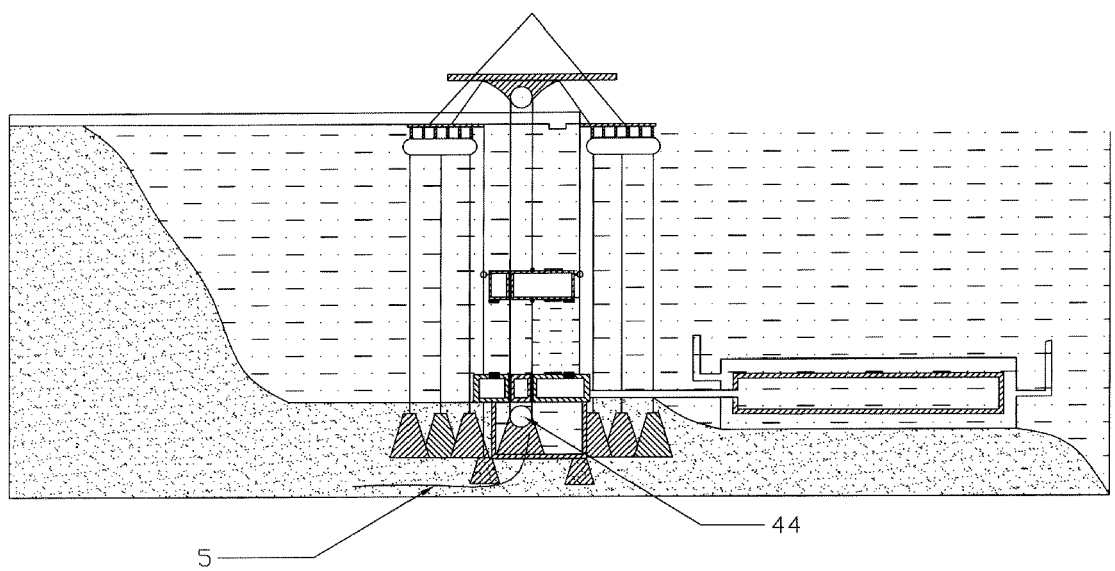
FIG. 16b is the longitudinal section view schematic diagram of the power-generating apparatus based on example 9 of this invention, inside it derivation conduit is installed on the upper end of the liquid chamber, power-generating unit is installed at the lower part of the liquid chamber.
Figure 16C:
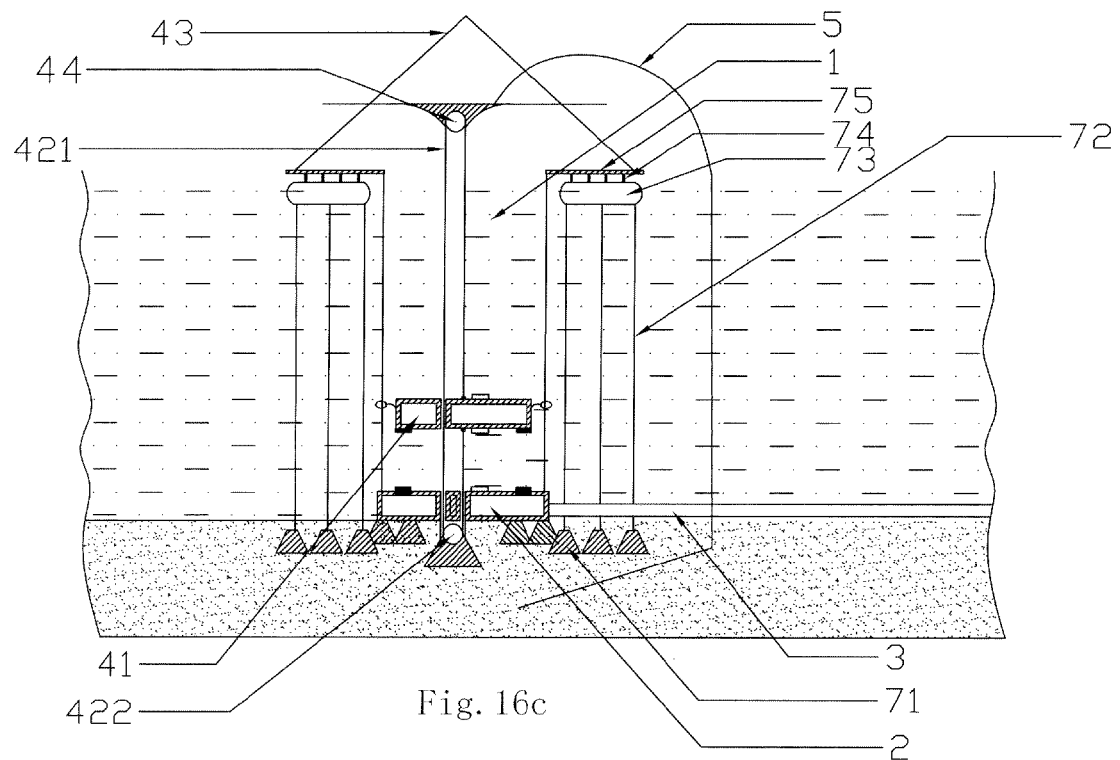
FIG. 16c is the longitudinal section view schematic diagram of the power-generating apparatus based on example 9 of this invention, inside it the power-generating unit is installed at the upper part of the liquid chamber.

Please refer to FIG. 16a to 16c that present the power-generating apparatus based on example 12 of this invention.

In the present embodiment, the power-generating apparatus that is basically same as that in example 9 is installed in the sea liquid at the mouth of river, the sea liquid can form natural liquid chamber 1 used for ascending and descending movements of movement body 41, for the purpose of saving material, there is no need to setup walls of movement chamber 1. However, in order to control movement body 41 to move along the set route, a vertical orientation guiding sliding track 45 is required and ring-shaped sliding hook 416 is set up at the side of movement body 41 to control movement body 41 to move along the set route. The structures of shift device 2, power-generating unit 4 and power transportation device 5 are basically same as those in example 5. Since all components are installed in the sea liquid, specialized underwater fixing device 7 is needed to fix each component.

The underwater fixing device 7 comprises the anchorage pile 71 installed in the ground floor of the ocean, the steel cable 72 fixed in anchorage pile 71, the floater 73 fixed by steel cable 72, the float board support column 74 fixed on the floater 73, the float board 75 fixed on the top of float body support column 74. The float board 95 has the same shape above the liquid surface as that at the upper part of liquid chamber 1 in example 9.

The power-generating unit 44 and the fixing device 43 are fixed on the float board 75. The pulley 421, the shift device 2 and the discharge device 3 are installed in the ground floor of ocean and reinforcement is done at the underneath ocean floor. The orientation guiding sliding track 45 has one end fixed with the anchorage pole 71 in the ground floor of ocean and another end fixed on the float board 75.

In the present embodiment, discharge device 3 adopts different discharging ways according to the water quality in the hollow part of the movement body 41. As shown in FIG. 16a and FIG. 15b, filling the movement body 41 with fresh liquid delivered from rivers by the way same as that in example 11, at this point, discharge device 3 includes a fresh liquid positive osmosis device 32 same as that in example 11 to discharge the fresh liquid from shift device 2 into sea liquid; as shown in FIG. 5c, filling the movement body 41 with sea liquid directly, at this point, the discharge device 3 includes a reverse osmosis device (not shown) for converting sea liquid into fresh liquid which collects the fresh liquid converted by the reverse osmosis device and condensed water with mineral by utilizing natural energy for use. The reverse osmosis device is a new type reverse osmosis device invented by the present inventor that is adaptable to be installed in deep-sea cooperated with the power-generating apparatus in this embodiment.

The movement body 41 is fixed on the vertical side which rounds the pulley 421 and the toothed belt 422 on the motor wheel according to the way same as that in example 9; meanwhile, the ring-shaped sliding hook 416 set up at side of each movement body 41 buckle-grasps the corresponding guiding sliding track 45 moves along the set route.

The working process of the power-generating apparatus is basically same as that in example 9.

As the way shown in FIG. 16c, when the movement body 41 is placed at the location of ocean surface surrounded by float board 75, the liquid in-out opening at its upper and lower part are opened by control, liquid in movement chamber naturally flow into the hollow part of movement body 41; when the total weight of movement body 41 and the liquid in it is heavier than its floatage and reaches the weight set by power generation, the liquid in-out opening 413 is closed by control. At this point, as the gravitation is larger than the floatage, that is, the density of the movement body 41 is larger than that of liquid, movement body 41 goes down. Movement body 41 descends along the movement route defined by the ring-shaped sliding hook 416 buckle-grasped on the guiding sliding track 45 to transport the generated power to public grid by the way same as that in example 9.

When the movement body 41 reaches the bottom of liquid chamber 1 and contacts with shift device 2, sea liquid in the hollow part of movement body 41 are discharged into shift device 2 by the way same as that in example 9, and then liquid in shift device 2 are discharged by the way same as that in example 9. When the sea liquid in movement body 41 is emptied, the floatage of the movement body 41 is larger than its gravitation, the movement body 41 dose ascending movement by the function of the floatage to generate power and transport the generated power to public grid by the same as that in example 9.

For the ways shown in FIG. 16a, 16b, movement body 41 is placed at the location of water surface, the liquid inlet opening 61 is connected to and opened leading to the upper liquid in-out opening 413, the liquid in liquid inlet pipe 6 naturally flow into the hollow part of movement body 41; when the movement body 41 reaches the bottom of liquid chamber 1, the liquid in the hollow part of the movement body 41 is discharged into sea liquid through the shift device, in turn through the positive osmosis device 32. The rest of process is same as the way shown in FIG. 16c.

When the movement body 41 reaches the location of water surface in movement chamber 1, the above said process repeats to move the movement body 41 in cycle.

Figure 17A:
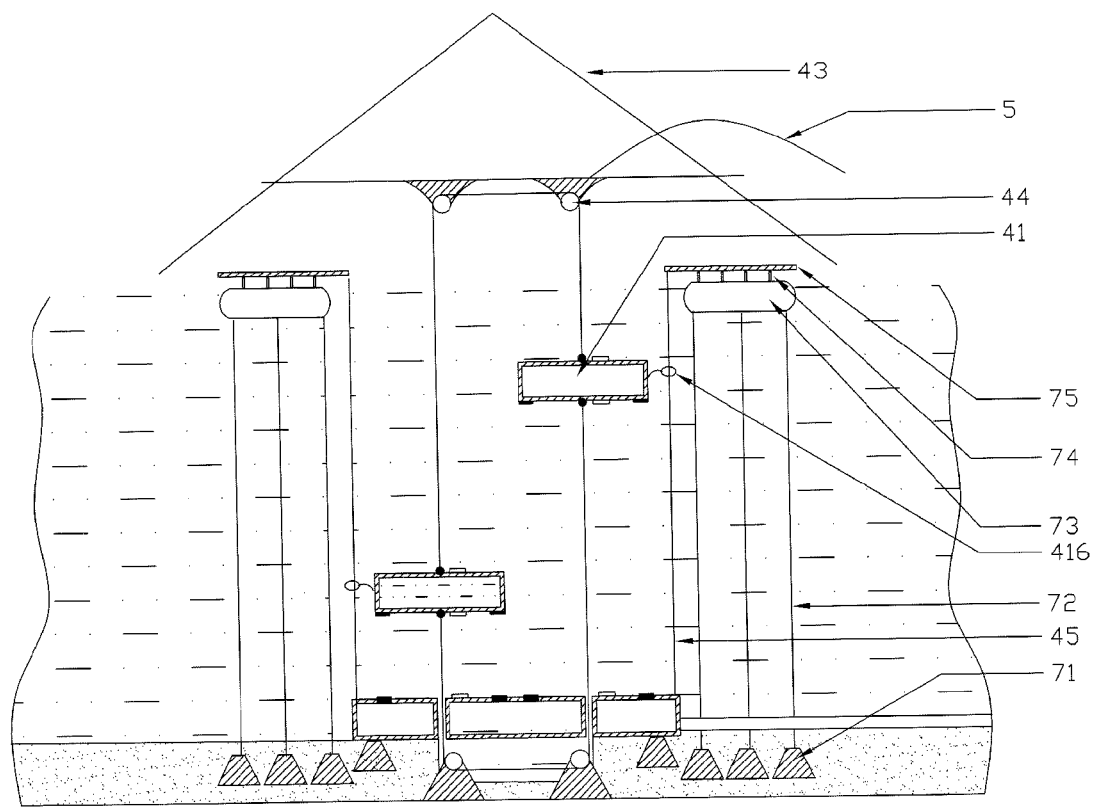
FIG. 17a is the longitudinal section view schematic diagram of the power-generating apparatus based on example 10 of this invention.
Figure 17B:
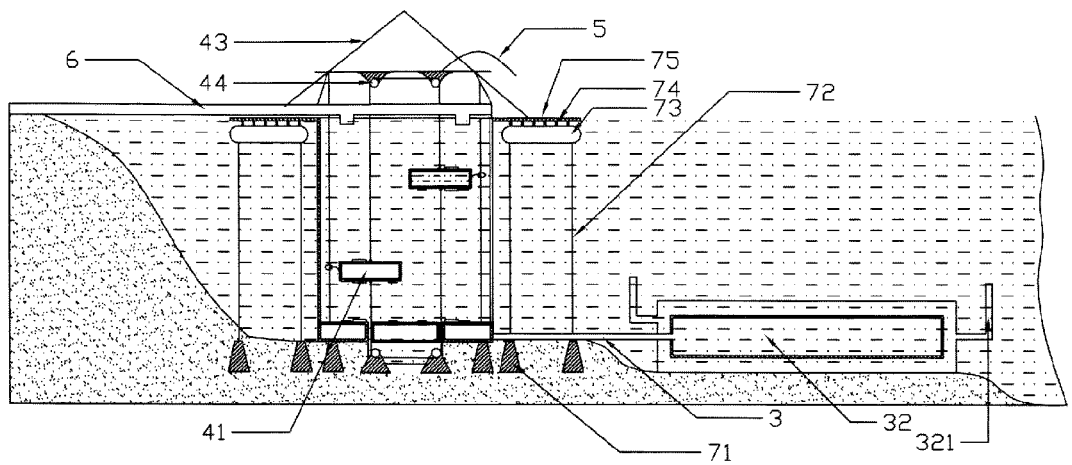
FIG. 17b is the longitudinal section view schematic diagram of the power-generating apparatus based on example 10 of this invention, inside it derivation conduit is installed on the upper end of the liquid chamber, power-generating unit is installed at the upper part of the liquid chamber.
Figure 17C:
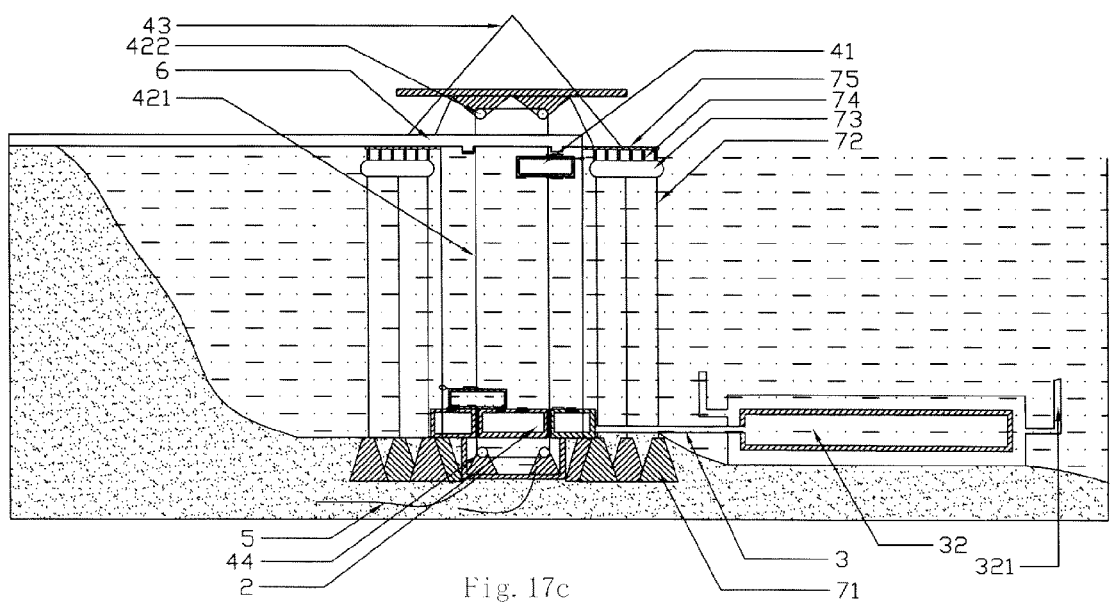
FIG. 17c is the longitudinal section view schematic diagram of the power-generating apparatus based on example 10 of this invention, inside it derivation conduit is installed on the upper end of the liquid chamber, power-generating unit is installed at the lower part of the liquid chamber.
Figure 18E:
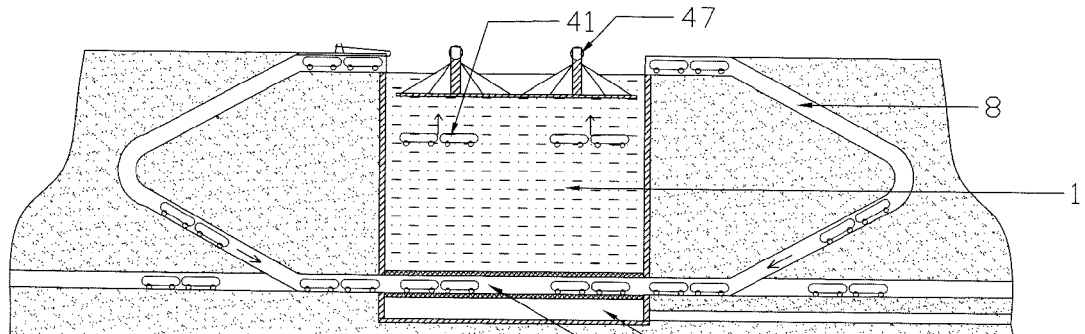
FIGS. 18e and 18f present two shapes of the waterless pipeline based on example 11 of this invention.
Figure 18F:
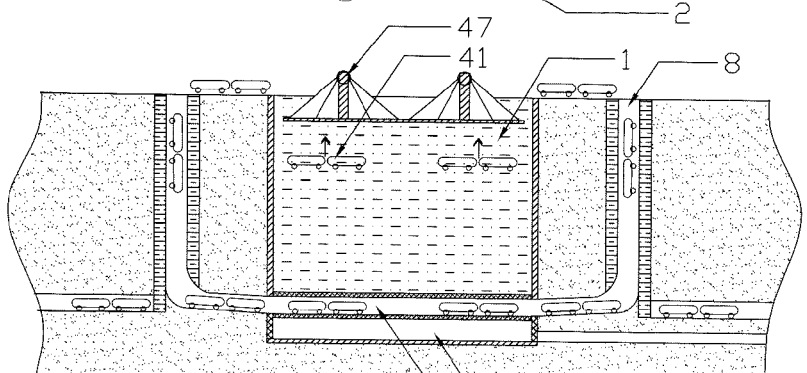

Please refer to FIG. 17a to 17c that present the power-generating apparatus based on example 13 of this invention.

In the present embodiment, the power-generating apparatus whose structure is basically same as that of example 10 of this invention is installed in the sea liquid. Thereinto, the sea liquid can form a natural liquid chamber 1 for ascending and descending movements of movement body 41, for the purpose of saving material, there is no need to set walls of movement chamber 1, as shown in FIGS. 17a and 17b. However, a vertical orientation guiding sliding track 45 is required and ring-shaped sliding hook 416 is installed at the side of movement body 41 to control movement body 41 to move along the set route. The structures of shift device 2, power-generating unit 4 and power transportation device 5 are basically same as those in example 5. As shown in FIG. 17b and FIG. 17c, filling the movement body 41 with fresh liquid through derivation conduit 6 set up at the upper part of movement chamber, therefore, discharge device 3 also comprises positive osmosis device 32 connected to another end of discharge pipe. As shown in FIG. 17a, discharge device 3 includes sea liquid reverse osmosis device.

In the present embodiment, the sides of liquid chamber 1 installed in the sea liquid are also doable, as shown in FIG. 17a.

Since all components are installed in the sea liquid, specialized underwater fixing device 7 is needed to fix each component. The underwater fixing device 7 comprises the anchorage pile 71 installed in the ground floor of the ocean, the steel cable 72 fixed in anchorage pile 71, the floater 73 fixed by steel cable 72, the float board support column 74 fixed on the floater 73, the float board 75 fixed on the top of float body support column 74. The float board 75 has the same shape above the liquid surface as that at the upper part of liquid chamber 1 in example 9.

The power-generating unit 44 and the fixing device 43 are fixed on the float board 75. The pulley 421, the shift device 2 and the discharge device 3 are installed in the ground floor of ocean and reinforcement is done at the underneath ocean floor. The orientation guiding sliding track 45 has one end fixed with the anchorage pole 71 in the ground floor of ocean and another end fixed on the float board 75.

The two movement bodies 41 are fixed at the corresponding position of both vertical sides which round the pulley 421 and the toothed belt 422 on the motor wheel according to the way same as that in example 10; meanwhile, the ring-shaped sliding hook 416 set up at side of each movement body 41 buckle-grasps the corresponding guiding sliding track 45.

The working process of the power-generating apparatus is basically the same as that in example 10.

As the ways shown in FIG. 17*a*, when the movement body 41 is placed at the location of ocean surface surrounded by float board 75, the upper and lower liquid in-out opening are opened by control, the liquid in movement chamber naturally flow into the hollow part of movement body 41; when the total weight of movement body 41 and the liquid in it is heavier than its floatage and reaches the weight set by power generation, the liquid in-out opening 413 is closed by control. At this point, as the gravitation is larger than the floatage, that is, the density of the movement body 41 is larger than that of liquid, the movement body 41 goes down. Movement body 41 descends along the movement route defined by the ring-shaped sliding hook 416 buckle-grasped on the guiding sliding track 45 to transport the generated power to public grid by the way same as that in example 9.

When the movement body 41 reaches the bottom of liquid chamber 1 and contacts with shift device 2, sea liquid in the hollow part of movement body 41 are discharged into shift device 2 by the way same as that in example 9, and then liquid in shift device 2 are discharged by the way same as that in example 9. When the sea liquid in movement body 41 is emptied, the floatage of the movement body 41 is larger than its gravitation, the movement body 41 dose ascending movement by the function of the floatage to generate power and transport the generated power to public grid by the same as that in example 9.

As shown in FIGS. 17*b* and 17*c*, the movement body 41 is placed at the location of water surface in liquid chamber 1, the liquid inlet opening 62 is connected to and tightly butt with the upper liquid in-out opening 413, the liquid in liquid inlet pipe 6 naturally flow into the hollow part of movement body 41. The rest of process is same as the apparatus shown in FIG. 17*a*.

When the movement body 41 reaches the location of water surface, the above said process repeats to move the movement body 41 in cycle. When the movement body 41 fixed on one vertical side of toothed belt 422 goes down, the movement body 41 fixed on another vertical side goes up, vice versa.

Please refer to FIG. 18*a* to 18*f* that present the power-generating apparatus based on example 14 of this invention.

The power-generating apparatus based on example 14 of this invention installed at river bank with appropriate amount of water comprises liquid chamber 1, shift device 2, discharge device 3, power-generating unit 4, power transportation device 5 and waterless pipeline 8.

Preferably, liquid chamber is installed at river bank with appropriate amount of water, derivation conduit is digged between the liquid chamber and rivers for filling liquid into liquid chamber 1. Sand and liquid separation device 101 is set on the derivation conduit to avoid sand deposition in liquid chamber 1 and affect the service life of power-generating apparatus.

The shift device 2 is installed under the liquid chamber 1 with upper trap door 21, air hole 25 and side trap door 26, the upper trap door 21 can be opened or closed to connect or separate the liquid chamber 1 to or from the shift device 2. The side trap door 26 can be opened or closed to connect or separate the shift device 2 to or from the waterless pipeline 8. As shown in FIG. 31*a* and FIG. 31*b*, discharge device 3 is set up above or under the shift device with a capacity larger than that of shift device.

Discharge device 3 has discharging hole 31 leading to shift device 2, the liquid in shift device 2 can enter the discharge device 3 through the discharging hole 31 the discharge device 3 also has discharging pipe 33 whose end leading to downstream rivers or discharging pipeline (not shown) whose terrain is lower than that of the discharge device to timely empty the liquid from shift device 2 for the next discharging. The discharge device also has air hole (not shown).

The power-generating apparatus in this embodiment is different from above embodiments in that: a waterless pipeline 8 is installed at the outside of liquid chamber 1. The waterless pipeline includes upward delivery pipeline 81, descending sloping downlink pipeline 82 as well as downward delivery pipeline 83. One end of upward delivery pipeline 81 connects to the top opening of liquid chamber 1 with delivery sliding device set up there, another end of upward delivery pipeline 81 connects to the beginning end of downlink pipeline 82 having a terminal end connected to one end of downward delivery pipeline 83; Another end of downward delivery pipeline 83 connects to the side trap door 26 of shift device 2. All the pipelines are equipped with duct track inside (not shown), movement body 41 moves along the track. The delivery sliding device is installed at the side of upward delivery pipeline 81 connected to liquid chamber 1 which includes flexible delivery sliding board 811, as well as storage cavity cell 812 of the delivery sliding board 811, and transmission device 813, correspondingly, supporting device 11 is set up at corresponding locations in liquid chamber. There also can be two or several waterless pipelines 8 those can be set as the shapes shown in FIGS. 18*e* and 18*f*.

Figures 28A, 28B:
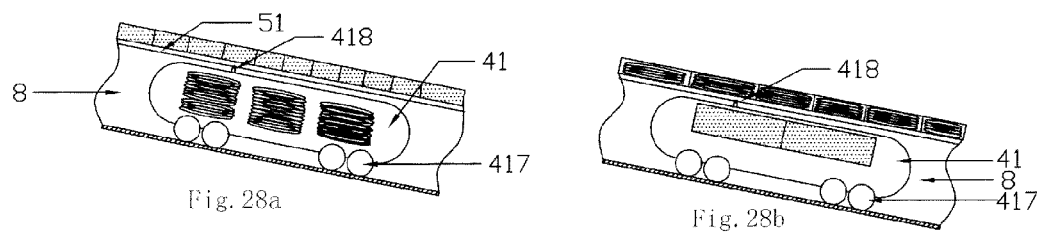
FIGS. 28a to 28d present several forms of layout of coil and magnet of the power-generating unit used for example 11 in this invention.
Figures 28C, 28D:
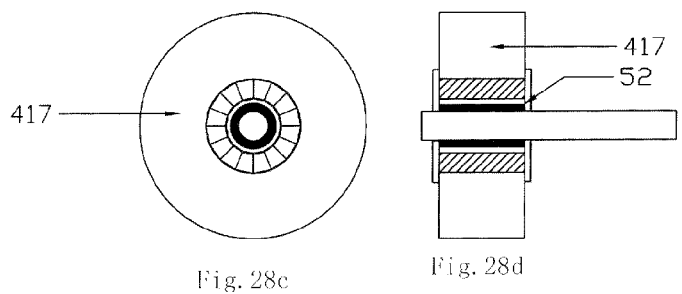
Figures 29A, 29B, 29C, 29D, 29E:
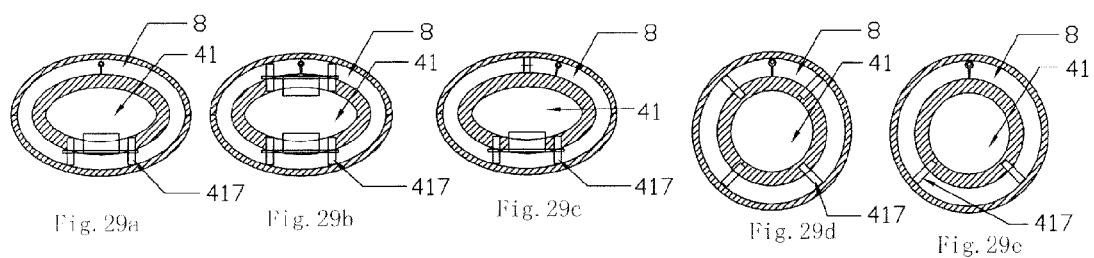
FIGS. 29a to 29j present several forms of the movement body used in this invention.
Figures 29F, 29G, 29H, 29I, 29J:
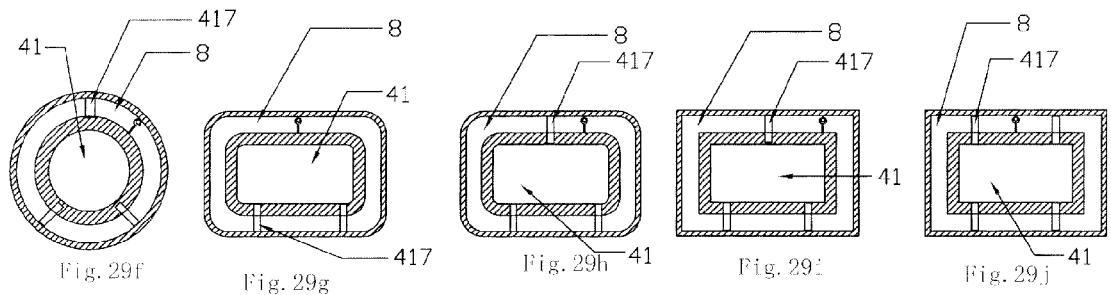

The power-generating process in this embodiment can be divided into two parts, those are the processes of power generation by descending movement of movement body 41 in waterless pipeline 8 and the process of power generation by ascending movement of movement body 41 in liquid chamber 1. Therefore, the power-generating unit 4 includes descending power-generating unit and ascending power-generating unit both of that include movement body 41. As shown in FIG. 28*a*, thereinto, movement body 41 in the descending power-generating unit is hollow oblate sphere with rotating wheel 417 whose floatage is heavier than gravitation. As shown in FIG. 17*a*, magnet is installed in inner side of downlink pipeline 82 used for power generation, coil is installed in the movement body 41 used for power generation, at this point, the power transportation device 5 is cable connected to the coil in movement body 41, as well as the transportation device connected to the cable by the way of electric brush. As shown in FIG. 28*b*, the coil installed in inner side of downlink pipeline 82 and the magnet installed in movement body 41 are also doable, at this point, the power transportation device 5 is cable connected to the coil at inner side of downlink pipeline 82. as shown in FIGS. 28*c* and 28*d*, the coil and magnet installed in rotating wheel 417 are also doable, thereinto, magnet or coil is installed on the inner track of the wheel of the said rotating wheel, coil or magnet is installed in the axle of the said rotating wheel correspondingly, at this point, the power transportation device 5 includes the cable 51 installed close to the inner wall of the downlink pipeline 82, the wire 52 connected with the coil in the rotating wheel 417 as well as the trolleybus-style elastic rod cable 418 buckle-grasping wheel slipped and buckled on the cable 51 and connected with the wire 52. The ascending power-generating unit includes the fixing device 43 set up at the upper part of liquid chamber 1 and the power-generating unit 44 fixed on the fixing device 43, as well as the buffer drive device 47. the buffer drive device 47 is placed at the set location in liquid chamber 1 which includes buffer board 471, balance frame 472 set up on the buffer board 471, sprocket column 473 set up between the balance frame 472, sprocket column 473 engagemented with the motor rotating toothed wheel of the power-generating unit 44.

As shown in FIG. 29a to 29f, the movement body 41 in this example can be set in several shapes.

The working process of the power-generating apparatus in this embodiment is as follows:

The liquid in shift device are discharged into discharge device 3, in turn into downstream rivers or discharge pipeline whose terrain is lower than that of discharge device. Meanwhile the movement body 41 is installed at top end of downlink pipeline 82, the movement body 41 slides downward along pipe track and does descending movement relative to the inner side of downlink pipeline 82 by the function of gravitation, that is, the relative movements between the coil and magnet produces power which is transported to public grid through the power transportation device 5.

When the movement body 41 reaches the bottom of downlink pipeline 82, it is driven to turn into the downward delivery pipeline 82 and continue to move; when it reaches the location at side trap door 26 of shift device 2, the side trap door 26 of shift device 2 is opened by control, the movement body 41 continue to move into shift device 2; at this point, the side trap door 26 is closed by control, the upper trap door 21 is opened, the liquid flow into shift device 2; as the gravitation of the movement body 41 is smaller than the floatage, it begins ascending with a speed that is quicken continuously till the movement body reaches the buffer drive device 47. When the movement body contacts with the buffer drive device 47, it produces huge impact power relative to the buffer drive device 47 which drives the buffer drive device 47 move upward. The sprocket column 473 moves upward thereupon and drives motor wheel, in turn drives the power-generating unit 44 to generate power. The generated power is transported to public grid through the power transportation device 5 connected to the coil in power-generating unit 44.

When the movement body 41 ascends to reach water surface, it drives the delivery sliding board 811 to extend to the lower part of movement body 41 which has a protrude end supporting on the supporting device 11, at this point, the movement body 41 can enter into upper delivery pipeline 81 along delivery sliding board 811 by driving movement body 41, in turn the movement body 41 can be delivered into the top end of downlink pipeline 82. After this, the delivery sliding board 811 draws back by control, the above said process repeats in cycle which can generate power continuously.

During the whole process, the movement body 41 moves downward by the function of gravitation at first, when it reaches the bottom of the waterless pipeline 8, the side trap door 26 is opened by control, the movement body 41 enters into the shift device 2 easily because of the waterless state of shift device 2; as shown in FIG. 30a to 30e, when the movement body 41 enters, the side trap door 26 is closed, and then the upper trap door 21 is opened by control, at the time when it is just opened, the liquid flow into liquid chamber 1 uninterruptedly and immediately which pushes the upper trap door 21 to open quickly; when the upper trap door 21 is opened, there are liquid existed in shift device 1, the movement body 41 begins ascending; when the movement body 41 ascends out of the shift device 2, the upper trap door 21 is closed by control, the liquid in shift device 2 are discharged into downlink rivers or discharge pipeline whose terrain is lower than that of discharge device 3 by utilizing discharge device 3.

The movement body can also be equipped with brake power-generating device as its brake mechanism. When the movement body reaches the location close to the side trap door 26, the brake power-generating device can control the moving speed to gradually decrease to zero, meanwhile the energy produced by speed reduction can be used for power generation, so as to reduce the moving speed to just zero when the movement body enters into the shift device 2 in full.

In the present embodiment, similarly due to the shifting of the shifting device 2, movement body 41 changes status from descending to ascending and then ascends by the function of floatage. Through the discharge device 3 to ensure sufficient accommodation capacity of the shift device, thus ensure that the shift device 2 can convert status between ascending and descending in a timely manner and repeat the ascending and descending vertical movements continually, because of both of the processes of ascending and descending movements of the movement body can generate power, the device can generate power in large amount uninterruptedly.

Please refer to FIG. 32a to 32c, the movement body 41 also can be made as a flexible part which is a solid body having a gravitation larger than its floatage that can move downward by the function of gravitation when drawing back and can be converted into hollow body having an gravitation smaller than its floatage that can move upward in the liquid when extending. Correspondingly, the shift device 2 is made into the shape that can accept the extended movement body 41 to ensure it extends easily there even if the movement body converts its state from descending to ascending. Movement body with such structure can save construction material of waterless pipeline 8.

Figure 19A:
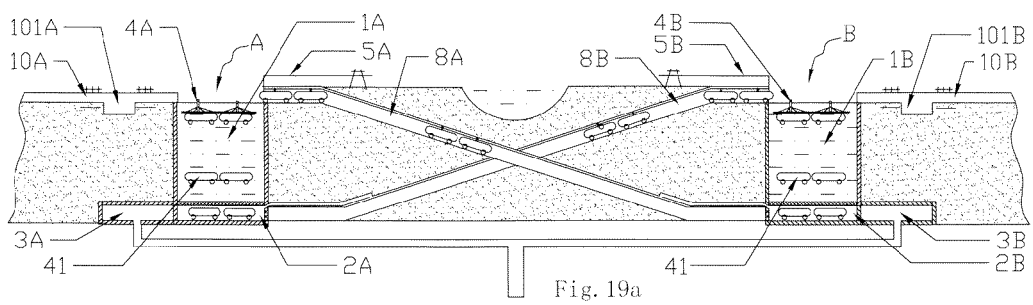
FIG. 19a is the longitudinal section view schematic diagram of the power-generating apparatus based on example 12 of this invention.
Figure 19B:
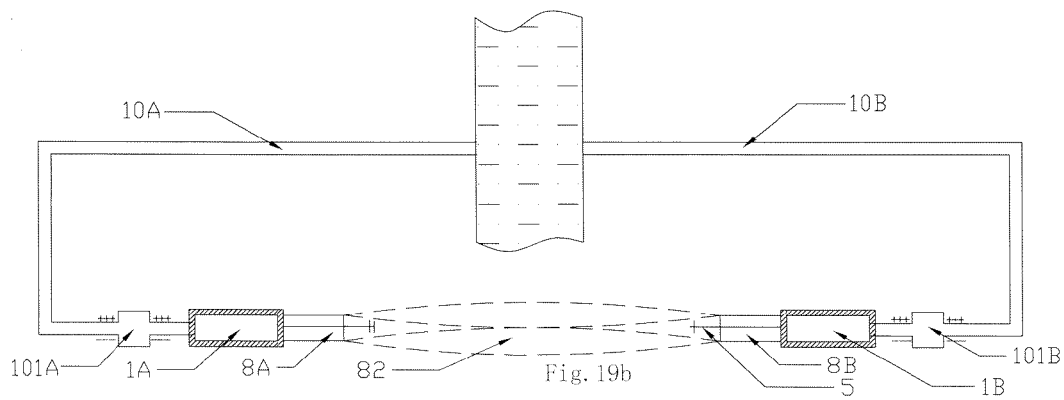

Please refer to FIGS. 19a and 19b that present the power-generating apparatus based on example 15 of this invention.

The power-generating apparatus based on example 15 of this invention is installed at river bank with appropriate amount of water, comprises the first power-generating apparatus A and the second power-generating apparatus B that are set in serial at the river bank. Both of the first power-generating apparatus A and the second power-generating apparatus B comprise liquid chamber 1, shift device 2, discharge device 3, power-generating unit 4, power transportation device 5 and waterless pipeline 8, the structure of each component is same as that in example 14. Thereinto, the end of the first waterless pipeline 8A of the first power-generating apparatus A leads to the second shift device 2B of the second power-generating apparatus, the second waterless pipeline 8B of the second power-generating apparatus B leads to the shift device 1B of the first power-generating apparatus. The first waterless pipeline 2A and the second waterless pipeline 2B are set by themselves, respectively, without crossing with each other. In this way, movement body 41 that moves along the downlink pipeline 82A of the first power-generating apparatus A and reaches its end can enter into shift device 2B of the second power-generating apparatus B directly, in turn ascends back to upper delivery pipeline 81B through movement chamber 2B of the second power-generating apparatus B; Correspondingly, movement body 41 that moves along downlink pipeline 82B of the second power-generating apparatus B and reaches its end can enter into shift device 2A of the first power-generating apparatus A, then ascends back to upper delivery waterless pipeline 83A through movement chamber 1A of the first power-generating apparatus A, thereby generates power in cycle. The apparatus in this embodiment simplifies the installation and improves the power generation amount.

Please refer to FIG. 20a to 20e that present the power-generating apparatus based on example 16 of this invention.

The power-generating apparatus based on example 16 of this invention is installed in sea liquid, comprises liquid chamber 1, shift device 2, discharge device 3, power-generating unit 4, power transportation device 5 and waterless pipeline 8. Since the power-generating apparatus in this example is installed in sea liquid, the sea liquid can form natural liquid chamber 1 used for ascending and descending movements of the movement body 41, for the purpose of saving material, there is no need to setup walls of movement chamber 1. However, in order to control movement body 41 to move along the set route, a guiding sliding track 45 is required and ring-shaped sliding hook 416 is set up at the side of movement body 41 to control movement body 41 to move along the set route. The structures of shift device 2 and power transportation device 5 are same as those in example 13. Discharge device 3 also includes sea liquid positive osmosis device (not shown). Same as that in example 14, the power generation in this embodiment is divided into two parts; those are the process of power generation by descending movement of movement body 41 in waterless pipeline 8 and the process of power generation by ascending movement of movement body 41 in liquid chamber 1. Correspondingly, the power-generating unit 4 includes descending power-generating unit and ascending power-generating unit. Thereinto, the structures of the ascending power-generating unit and the descending power-generating unit are same as those in example 10.

Since all components are installed in the sea liquid, specialized underwater fixing device 7 is needed to fix each component. The underwater fixing device in this embodiment comprises the anchorage pile 71 installed in the ground floor of the ocean, the steel cable 72 fixed in anchorage pile 71, the floater 73 fixed by steel cable 72, the float board support column 74 fixed on the floater 73, the float board 75 fixed on the top of float body support column 74. The underwater fixing device 7 also comprises supporting pole 76 installed on the ground floor of the ocean and protruded out of the ocean.

The fixing device 43 and the power-generating unit 44 are fixed on the float board 95; the upper delivery pipeline 82 and the delivery sliding board 84 are fixed on the float board 75, the top end of the supporting pole 76 supports the upper delivery pipeline 81. The shift device 2, discharge device 3, downward delivery pipeline 83 are installed in the ground floor of ocean and reinforcement is done at the underneath ocean floor. The orientation guiding sliding track 45 has one end fixed with the anchorage pole 71 and another end fixed on the float board 75. The ring-shaped sliding hook 416 is installed on the movement body 41 which buckle-grasps the orientation guiding sliding track 45 and slides along it up and down.

As shown in FIG. 20e, there can be two waterless pipelines 8 set in this embodiment, thereinto, the downlink pipeline 82 can be straight pipe.

The working process of this example is same as that in example 14.

Please refer to FIG. 21 which is the power-generating apparatus based on example 17 of this invention.

The power-generating apparatus based on example 17 of this invention is installed at river bank with appropriate amount of water, comprises the first power-generating apparatus A and the second power-generating apparatus B installed in sea liquid that are set in parallel which is same as that in example 16.

The structure and working process of the power-generating apparatus based on this embodiment are basically same as those in example 15 with the difference that: the power-generating apparatus based in the present embodiment includes underwater fixing device 76.

Figure 22A:
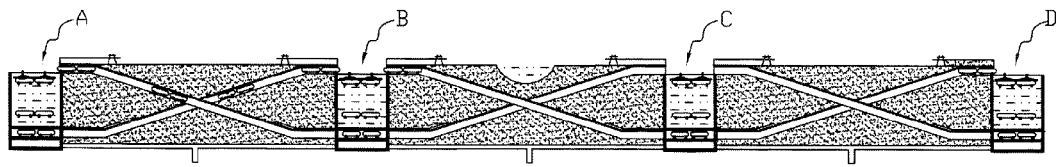
FIG. 22a is the longitudinal section view schematic diagram of the power-generating apparatus based on example 15 of this invention.
Figure 22B:
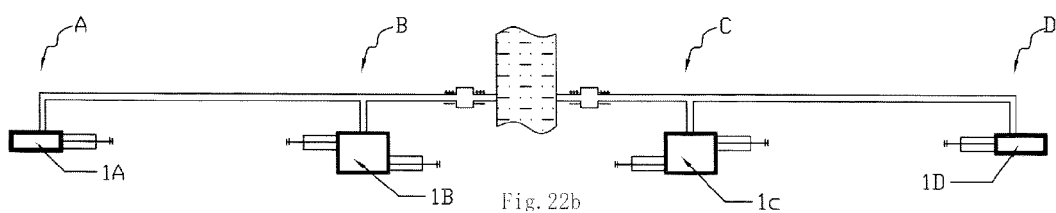
Figure 22C:
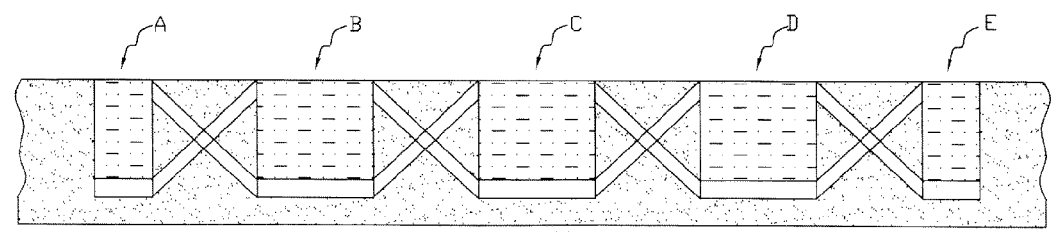

Please refer to FIG. 22a to 22c that present the power-generating apparatus based on example 18 of this invention.

The power-generating apparatus based on example 18 of this invention comprises several sets of power-generating apparatuses in example 15 that are set in parallel Thereinto, the first and last power-generating apparatus are equipped with one waterless pipeline, the other middle power-generating apparatuses are equipped with the first waterless pipeline and the second waterless pipeline, respectively; the end of waterless pipeline of the first power-generating apparatus connects to the shift device of the second power-generating apparatus, the end of the first waterless pipeline of the second power-generating apparatus connects to the shift device of the first power-generating apparatus; the end of the second waterless pipeline of the second power-generating apparatus connects to the shift device of the third power-generating apparatus, the end of the first waterless pipeline of the third power-generating apparatus connects to the waterless pipeline of the second power-generating apparatus; those connections are in order; the second waterless pipeline of the last second power-generating apparatus connects to the shift device of the last power-generating apparatus; the end of the waterless pipeline of the last power-generating apparatus connects to the shift device of the last second power-generating apparatus.

Figure 23A:
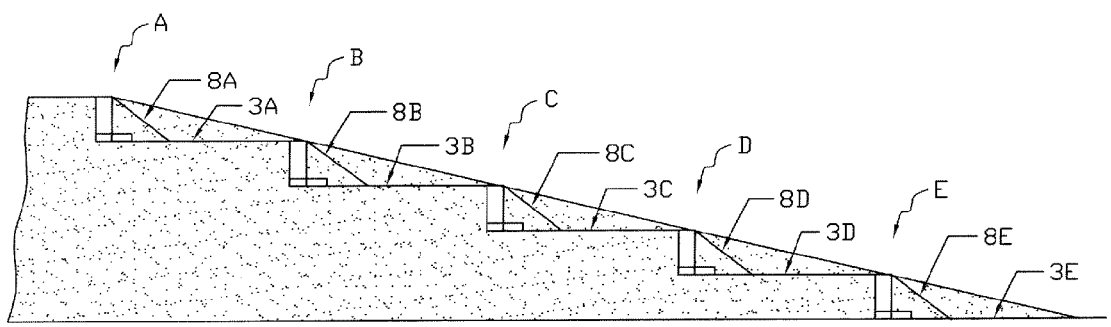
FIGS. 23a to 23b are the longitudinal section view schematic diagram of the power-generating apparatus based on example 16 of this invention.
Figure 23B:
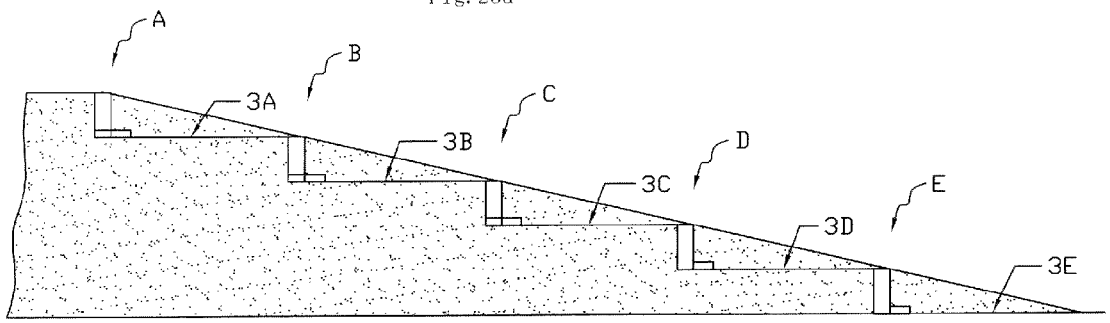

Please refer to FIG. 23a and FIG. 23b that present the power-generating apparatus based on example 19 of this invention.

As shown in FIG. 23a, the power-generating apparatus based on example 19 of this invention comprises several sets of power-generating apparatuses whose structures are same as those in example 10 that are set in parallel according to the terrain trend. As shown in FIG. 23b, the power-generating apparatus based on example 19 of this invention comprises several sets of power-generating apparatuses whose structures are same as those in example 14 that are set in series according to the terrain trend. Thereinto, the discharge pipeline of the first power-generating apparatus leads to top end of the movement chamber of the second power-generating apparatus, the discharge pipeline of the second power-generating apparatus leads to top end of the movement chamber of the third power-generating apparatus, arranging in order, the discharge pipeline of the last power-generating apparatus leads to downstream rivers or discharge pipeline.

Please refer to FIG. 24a to 24g that present the power-generating apparatus based on example 20 of this invention.

The power-generating apparatus based on example 20 of this invention is the combination of two power-generating apparatus described in example 8 and 14, thereinto, the structures of liquid chamber 1, shift device 2, discharge device 3 are all same as those in example 1. The structure of pipeline 8 is same as that in example 14.

The difference is that: movement body comprises movement body 41 and filling movement body 41'; there is a side trap door 419 installed on the movement body 41 that can be opened or closed; the beginning end of upward delivery pipeline 81 as well as the terminal end of downward delivery pipeline 83 protrude deeply into movement chamber 1 and are equipped with end openings 84 and 85 that can be opened or closed; both of the end opening 84 and 85 can connect to side trap door 419 of movement body 41. All the pipelines are equipped with duct track inside (not shown), the filling movement body 41' is solid oblate sphere moves along the track, when it reaches the end opening 84, the filling movement body 41' can enter inside the emptied movement body 41 and ascends with it.

The power generation in the present embodiment can be divided into three parts, those are the process of power generation by descending movement in waterless pipeline 8 of filling movement body 41', the process of power generation by descending movement in liquid chamber 1 of movement body 41 as well as the process of power generation by entering movement into movement body 41 and ascending movement with movement body 41 of filling movement body 41'

The working process of the power generation by descending movement of movement body 41 is same as that in example 8. The working process of the power generation by ascending movement of filling movement body 41' is same as that in example 14.

The working process of the power-generating apparatus based on this embodiment is as follows:

The movement body 41 is placed at the location of water surface in liquid chamber 1, the liquid in-out opening at its upper and lower part are opened by control, the liquid in liquid chamber 1 naturally flow into the hollow part of movement body 41; when the total weight of movement body 1 and liquid in it is heavier than the floatage of movement body 41 and reaches the weight set by power generation, the liquid in-out opening at its upper and lower part are closed by control. At this point, as the overall gravitation of the movement body is larger than its floatage, that is, the density of the movement body 41 is larger than that of liquid, movement body 41 descends to move downwards relative to the inner side of liquid chamber 1, that is, the relative movement of the magnet and coil produces power which is transported to public grid through the power transportation device 5 that is connected to the coil.

When the movement body 41 filled with liquid descends to the bottom of movement chamber and reaches shift device 2, the side upper door 419 of movement body 41 is tightly butt with end opening 84 by control, meanwhile the lower liquid in-out opening of movement body 41 connects to liquid inlet opening of shift device 2, the liquid in the movement body 41 are emptied through shift device 2 and discharge device 3.

At the same time, the filling movement body 41' is placed at top end of downlink pipeline 82, the filling movement body 41' slides downward along the track and does descending movement relative to the inner side of downlink pipeline 82 because of the function of gravitation, that is, the relative movements between coil and magnet produce power which is transported to public grid through the power-generating apparatus 5.

When the filling movement body 41' reaches the end opening 85, the liquid in movement body 41 are just emptied, at this point, end opening 84 and side trap door 419 are opened by control, the filling movement body 41' is driven to enter into the hollow part of movement body 41, the filling movement body 41' can ascends together with movement body 41 by setting the floatage of movement body 41, that is, the relative movements between coil and magnet produce power which is transported to public grid by the way same as that in example 8.

When the movement body 41 ascends to water surface, the side trap door 419 is tightly butt with and connected to end opening 84 by control, the filling movement body 41' is driven to move and leave the movement body 41 and delivered to the top end of downlink pipeline 82. When the filling movement body 41' moves and leaves the movement body 41, the upper and lower liquid in-out opening 413 are opened by control to fill liquid in it. The process is repeated in cycle which produces power continuously.

During the whole process, by shifting of shift device 2, the movement body 41 converts its state from descending to ascending, meanwhile, the movement body 41 converts the state of filling movement body 41' from descending to ascending that is synchrony with it to generate power.

Figure 25:
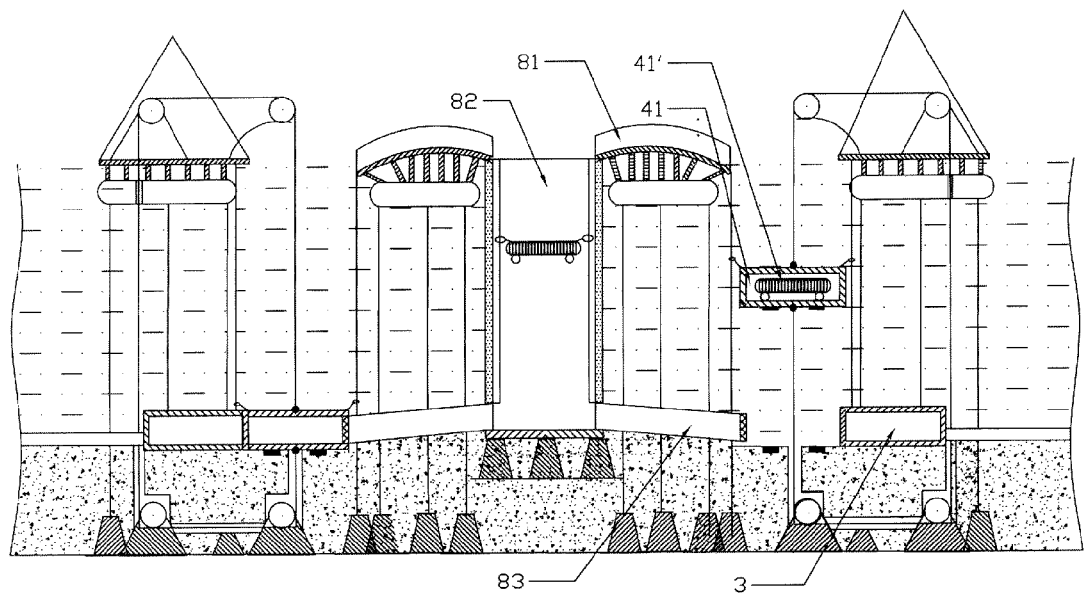
FIG. 25 is the section view schematic diagram of the power-generating apparatus based on example 18 of this invention.

Please refer to FIG. 25 that presents the power-generating apparatus based on example 21 of this invention.

The power-generating apparatus based on example 21 of this invention is the combination of two power-generating apparatus described in example 12 and 14 which is installed in sea liquid. The power-generating apparatus based on this embodiment comprises liquid chamber 1, shift device 2, discharge device 3, power-generating unit 4, power transportation device 5 as well as waterless pipeline 8. Thereinto, the structures of liquid chamber 1, shift device 2, discharge device 3 are same as those in example 8. The structure of waterless pipeline 8 is same as one of that in example 14. The difference is that: the movement body 41 is similarly ellipse-shaped with side trap door 419 set up there, when the side trap door 419 is placed at the location of bottom of liquid chamber 1, the side trap door is connected with end opening 84 of waterless pipeline 8.

The working process is as follows:

Controlling the movement body 41 to generate power by descending movement same as that in example 13. Meanwhile, controlling the filling movement body 41' to generate power by moving downward same as that in example 15.

When the movement body 41 and filling movement body 41' move and reach the end of descending power generation, the filling movement body 41' enters into the hollow part of movement body 41 by control and generates power by ascending movement same as that in example 20. The process repeats in cycle.

Figure 26:
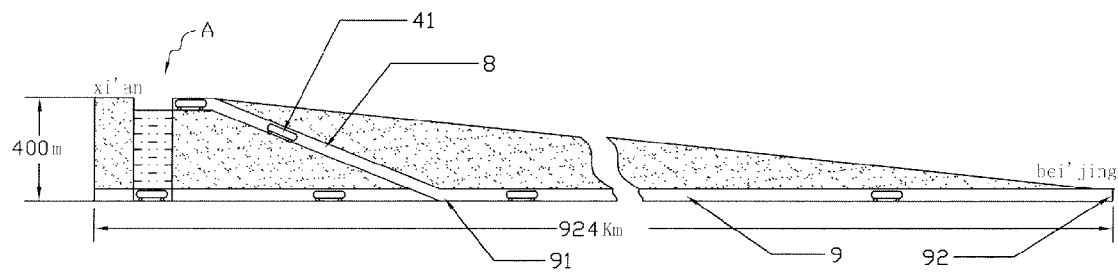
FIG. 26 is the section view schematic diagram of the transportation device based on example 19 of this invention.

Please refer to FIG. 26 that presents the transportation system based on example 22 of this invention.

The transportation system based on example 22 of this invention comprises the power-generating apparatus A and transportation pipeline 9 same as those in forth said example 14, there are air holes 91 set on the pipeline 9 with certain gap horizontally, the pipeline is equipped with duct track inside (not shown) which has a beginning end connected to the end of the said waterless pipeline 8 and a terminal end 92 leading to the ground floor whose terrain is lower relatively. The terminal end 92 of transportation pipeline also can be connected to the movement chamber (not shown) of power-generating apparatus installed at the location whose terrain is lower relatively. In addition, the terminal end 92 of transportation pipeline can be connected to the transfer station installed underground (not shown) for human and goods which can be lifted to the ground surface through lifting device based on other principles. The lifting device can be lifting liquid ladder set for transportation specially.

The working process of the transportation system is as follows: the movement body 41 that has been reached the end of downlink pipeline 82 is driven to move along flat pipe on the said track utilizing the power generated by power-generating apparatus A, the hollow part of the movement body 41 can be used for transporting human and goods. When the movement body 41 transports human or goods to set locations, the ascending device is used to transport human or goods in it to the ground floor.

Figure 27A:
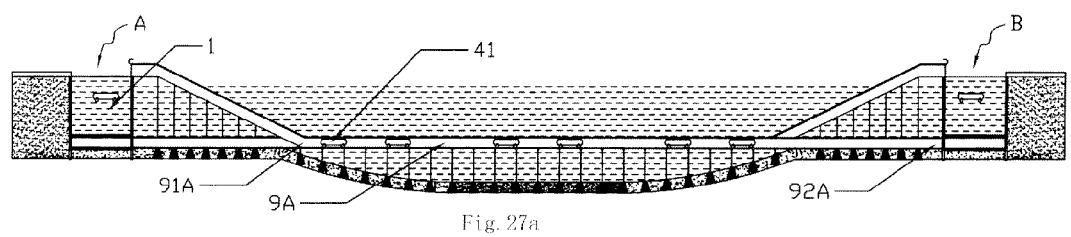
FIG. 27a is the longitudinal section view schematic diagram of the transportation device based on example 20 of this invention.
Figure 27B:
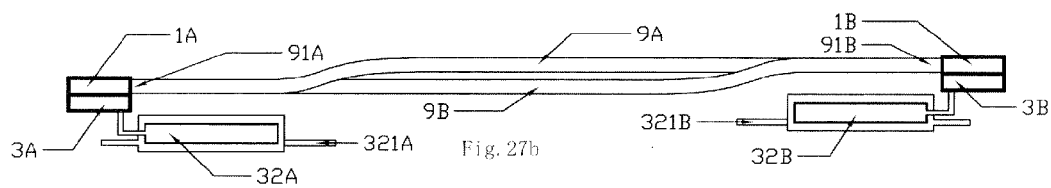
Figure 27C:
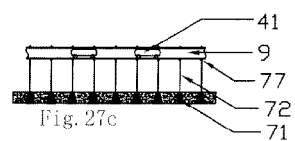

Please refer to FIG. 27 that presents the transportation system based on example 23 of this invention.

The transportation system based on this invention installed in sea liquid comprises the first and second power-generating apparatuses A,B and transportation pipeline 9 same as those in forth said example 15, the first and second power-generating apparatuses are installed at different locations close to ocean, the transportation pipeline 9 is installed in sea liquid with air holes (not shown) installed on it with certain gap, the pipeline is equipped with duct track inside (not shown) whose beginning end 91 leading to the end of waterless pipeline 8A of the power-generating apparatus A and terminal end 92 leading to the second shift device 2B of the second power-generating apparatus B installed at another location. For fixing the transportation 9 installed in sea liquid, the anchorage pile 71 installed in the ground floor of the ocean and the steel cable 72 fixed in anchorage pile 71 are required, there is stabilization brake fixed at the top end of the steel cable 72 to fix the transportation pipeline 9.

The working process of the transportation system is as follows: human or goods are loaded in the hollow part of movement body 41, the movement body 41 that is driven to move to the end of downlink pipeline 82A by power generated by the power-generating apparatus A moves along the flat pipe on the said track, the hollow part of the movement body 41 is used to transport human and goods. When the movement body 41 transports human or goods to the shift device 2B of the first power-generating apparatus B, the movement body 41 and contents in it are transported to the ground floor utilizing floatage of the movement chamber.

The flat-transportation pipeline is a pipeline transportation system that is adaptable for using in ocean and underground, because the flat pipe has a drag index that can be extremely small (0.03) and possesses advantages such as good stabilization, horizontally straight, smooth, excellent and low cost in transportation, it can be used as effective equipment for means of delivery running in high speed, super-high-speed and can provide effective safeguard for flat pipe transportation running in high speed, super-high-speed.

INDUSTRIAL PRACTICABILITY

This invention is a kind of power-generating apparatus that uses natural energy to generate power which loads the liquid at a higher location into hollow movement body, magnet and coil are installed in the inner side of and around the movement body, respectively, when the hollow movement body is filled with liquid, it goes down by the function of gravitation, at this point, the coil will cut magnetic line of force in the magnet to produce current in it which is transported to grid through power transportation device. There is another identical set of hollow movement body connected to above said set of hollow movement body through the pulley unit, when one set of movement body goes down, the other set goes up, the ascending hollow movement body also will cut magnetic line of force to produce current in the coil which will be transported to grid through the power transportation device. There are liquid in-out openings installed at both upper and lower part of the said hollow movement body, when the hollow movement body is placed at a higher location, the upper liquid inlet opening is opened by control to make the liquid at higher level flow into the hollow movement body, when the hollow movement body falls to a lower location, the lower liquid outlet opening is opened by control to make the liquid in it flow into the shift device, then the shift device discharges the liquid to the location at lower level through the discharge device. This power-generating apparatus possesses industrial practicability because it utilizes the naturally inherent potential energy and principle of electromagnetic with a relatively simple structure.

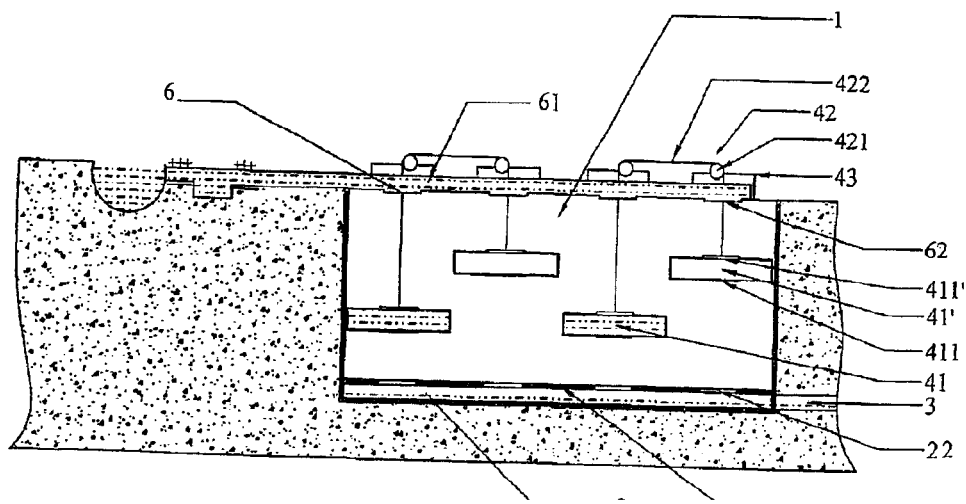

The invention claimed is:

1. A power-generating apparatus comprises:
   at least a pair of movement bodies;
   a power-generating unit including a generator coupled to at least a pair of interactive and coupled reverse-linked movement bodies, the movement bodies being hollow bodies equipped with liquid outlet openings;
   a movement chamber, the movement bodies positionable within the movement chamber;
   a liquid supply device configured to add liquid through the liquid outlet openings of the movement bodies when the movement bodies are positioned in an upper part of the movement chamber;
   a shift device, the shift device positioned under the movement chamber and configured to release liquid from the movement bodies when the movement body descends to a lower part of the movement chamber or liquid chamber;
   a discharging device enabling fluid to leave the shift device to the environment; and
   an electromechanical autocontrol unit for controlling automated movement of the movement bodies;
   wherein the power-generating unit comprises:
   one of a coil and a magnet installed in an inner wall of the movement chamber; the other of a coil and a magnet installed in a first movement body of the movement bodies;
   a wheel mounted to the movement body such that the wheel defines a gap between the first movement body and the inner wall of the movement chamber.

2. The apparatus of claim 1, wherein the movement bodies are linked to one another such that the movement bodies move vertically in opposite directions.

3. The power-generating apparatus of claim 1, wherein the liquid supply device is in fluid communication with a liquid source and comprises a liquid inlet opening positioned to direct liquid into the movement chamber such that when the movement bodies move to the upper part of the movement chamber, the liquid inlet opening connects to a upper liquid outlet opening of the liquid outlet openings of each movement body to add liquid to the movement body.

4. The power-generating apparatus of claim 1, wherein an upper trap door is installed at an upper part of the shift device having a liquid inlet opening installed thereon, the liquid inlet opening corresponding to a lower liquid outlet opening of the liquid outlet openings of the movement bodies; and wherein the liquid inlet opening of the shift device is positioned such that when the movement bodies move to the lower part of the movement chamber, the liquid inlet connects to the lower liquid outlet opening of each movement body to discharge liquid from the movement body to shift device.

5. The power-generating apparatus of claim 4 wherein the electromechanical control unit comprises a stabilization-retention device positioned between the movement bodies and the shift device, the stabilization-retention device configured to temporarily fix each movement body relative to the shift device during discharging of liquid from the movement body.

6. The power-generating apparatus of claim 1, wherein the power-generating unit comprises:
   a generator having a drive wheel fixed relative to the movement chamber;
   a toothed belt engaging the drive wheel and having a first end secured to a first of the movement bodies and a second end secured to a second of the movement bodies.

7. The power-generating apparatus of claim 1, wherein the discharge channel is installed under the shift device such that liquid is permitted to flow from the shift device to the discharge device.

8. The power-generating apparatus of claim 1, wherein a ring-shaped sliding hook is mounted to the movement body and a guiding cable is set up in the movement chamber to control the movement body, wherein the ring-shaped sliding hook grasps the guiding sliding rope to control movement of the movement body.

9. The power-generating apparatus of claim 1, wherein the power-generating apparatus is submerged in a body of water.

10. The power-generating apparatus of claim 9, wherein the power-generating apparatus is mounted to a fixing device comprising:
    anchors secured to a floor of the body of water;
    a cable having a lower end fixed to the anchors;
    a floating board connected with an upper end of the cable.

11. The power-generating apparatus of claim 1, wherein the power-generating apparatus further comprises:
    at least one pipeline extending outside the movement chamber and coupled to the movement chamber at a first opening proximate a top of the movement chamber and a second opening proximate a bottom of the movement chamber; and
    at least one filling body;
    wherein a first movement body of the pair of movement bodies is installed within the movement chamber adjacent the first and second openings, the first movement body having a side door selectively opened to permit the filling body to pass between the movement body and the pipeline.

12. The power-generating apparatus of claim 1, wherein the power-generating apparatus further comprises:
    at least one pipeline extending outside the movement chamber and coupled to the movement chamber at a first opening proximate a top of the movement chamber;
    wherein the shift device comprises an upper door and at least one side door, the movement chamber being connected to the shift device through the upper door and the pipeline being connected to the shift device through the side door;
    wherein the movement bodies move along a route defined by the pipeline, the shift device, and the movement chamber.

13. The power-generating apparatus of claim 12, wherein the pipeline comprises:
    an upward delivery pipeline;
    a descending downlink pipeline; and
    a downward delivery pipeline;
    wherein the upward delivery pipeline has a first end connected to the first opening of the movement chamber and a second end connected to a first end of the downlink pipeline, a second end of the downlink pipeline being connected to a first end of the downward delivery pipeline, a second end of the downward delivery pipeline being connected to the side door of the shift device.

14. The power-generating apparatus of claim 12, wherein the downlink pipeline has a sliding delivery device installed therein.

15. The power-generating apparatus of claim 13, wherein the pipeline is a straight pipe, standpipe or siphon; and
    wherein one of a coil and a magnet is installed in inner wall of the pipeline and the other of a coil and a magnet is installed in the filling body.

16. The power-generating apparatus of claim 13, wherein the pipeline comprises a track and the filling body comprises a rotating wheel engageable with the track; and wherein one of a magnet and a coil is installed on the rotating wheel, and the other of a magnet and a coil is installed in the axle of the rotating wheel.

17. The power-generating apparatus of claim 16, further comprising a power transportation device comprising:
    a cable installed close to an inner wall of the downlink pipeline;
    a wire connected with the coil in the rotating wheel; and
    and an elastic rod extending from the filler body having a wheel engaging the cable and electrically connected to the wire.

18. The power-generating apparatus of claim 15, wherein the filling body at least one of
    is a hollow body;
    is a solid body; and
    contains a brake power generating unit effective to reduce the filling body moving speed and generate power during the process of entering the movement body.

19. The power-generating apparatus of claim 1, wherein the shift device comprises a heat source effective to heat and vaporize liquid discharged from the movement bodies into the shift device; wherein the liquid supply device comprises a condensation compartment installed at the upper part of the movement chamber; and wherein the discharge device comprises a heat insulation pipeline having a first end are coupled to the shift device and a second end coupled to liquid supply device.

20. The power-generating apparatus of claim 19, wherein the heat source is heated by at least one of geothermal energy and solar energy.

21. The power-generating apparatus of claim 19, wherein the condensation compartment is cooled using an ambient temperature difference for condensation.

22. The power-generating apparatus of claim 19, wherein the condensation compartment comprises a refrigeration device.

23. The power-generating apparatus of claim 1, wherein the power-generating apparatus is located within a series of power-generating apparatus located on a slope such the discharge device of a previous power-generating apparatus discharges into the movement chamber of a following power-generating apparatus.

24. The power-generating apparatus of claim 23, wherein the power-generating apparatus is a first power-generating apparatus of a plurality of other power-generating apparatus; the plurality of power-generating apparatus coupled in parallel such that:
    a first pipeline couples an opening formed in the upper part of the movement chamber of a first power generating apparatus to the shift device of a second power-generating apparatus;
    a second pipeline couples a first opening formed in the upper part of the movement chamber of the second power generating apparatus to the shift device of the first power-generating apparatus;
    a third pipeline couples a second opening formed in the upper part of the movement chamber second power-generating apparatus to the shift device of a third power-generating apparatus; and
    a fourth pipeline couples an opening formed in the upper part of the movement chamber of the third power-generating apparatus to the shift device of the second power-generating apparatus.

25. A pipeline transportation system comprising:
    a first power-generating apparatus as in claim 10; and an underground transportation pipe, the underground transportation pipe having a first end connected to the pipeline of the first power-generating apparatus and a second end proximate the ground surface having an elevation lower than the first end;

wherein the filler body contains at least one of humans and goods.

26. The pipeline transportation system of claim 25, further comprising a second power-generating apparatus as in claim 10 having the movement chamber thereof coupled to the second end of the underground transportation pipe.

27. The power-generating apparatus of claim 19, wherein the liquid is at least one of water, liquid nitrogen, lithium bromide, and Freon.

* * * * *

UNITED STATES PATENT AND TRADEMARK OFFICE
CERTIFICATE OF CORRECTION

PATENT NO. : 8,146,361 B2  
APPLICATION NO. : 12/395454  
DATED : April 3, 2012  
INVENTOR(S) : Jin Page 1 of 15

It is certified that error appears in the above-identified patent and that said Letters Patent is hereby corrected as shown below:

The title page, showing an illustrative figure, should be deleted and substitute therefor the attached title page.

Drawings
Sheet 1, replace Figure 1a with the figure depicted below, wherein the uppermost instance of reference number "411" has been changed to "411'" and reference number "23" has been changed to "22" and reference number "42" was added

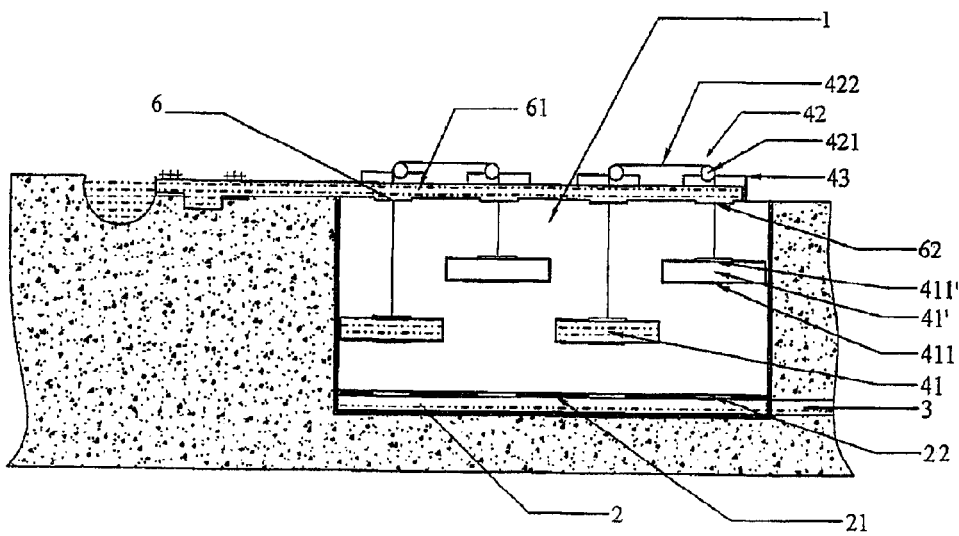

Fig. 1a

Signed and Sealed this  
Twenty-third Day of April, 2013

Teresa Stanek Rea  
*Acting Director of the United States Patent and Trademark Office*

CERTIFICATE OF CORRECTION (continued)
U.S. Pat. No. 8,146,361 B2

Page 2 of 15

Sheet 2, replace Figure 2a with the figure depicted below, wherein reference number "42" and "62" have both been added

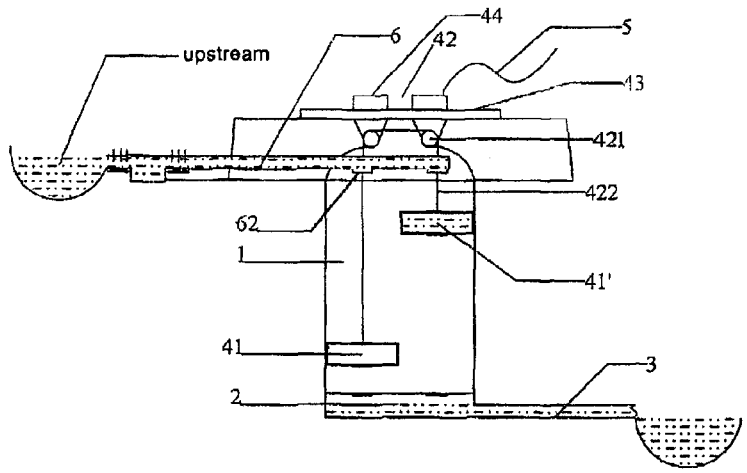

Fig. 2a

Sheet 4, replace Figure 4a with the figure depicted below, wherein reference number "7" has been replaced by "72"

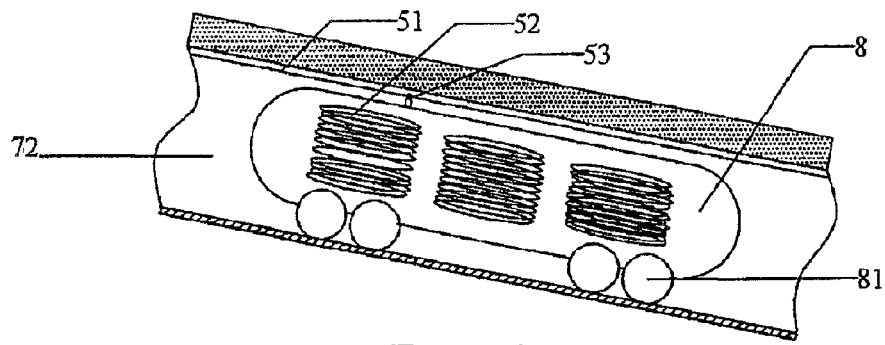

Fig. 4a

CERTIFICATE OF CORRECTION (continued)

U.S. Pat. No. 8,146,361 B2

Sheet 14, replace Figure 13a with the figure depicted below, wherein reference numbers "421" and "422" should be switched

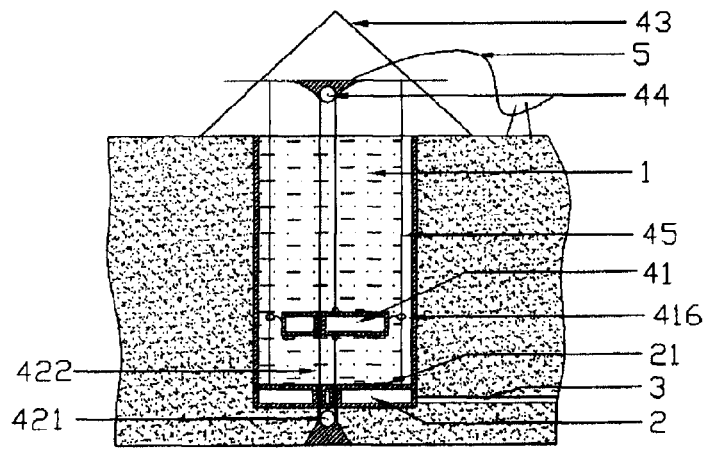

Fig. 13a

Sheet 15, replace Figure 14a with the figure depicted below, wherein reference numbers "421" and "422" should be switched

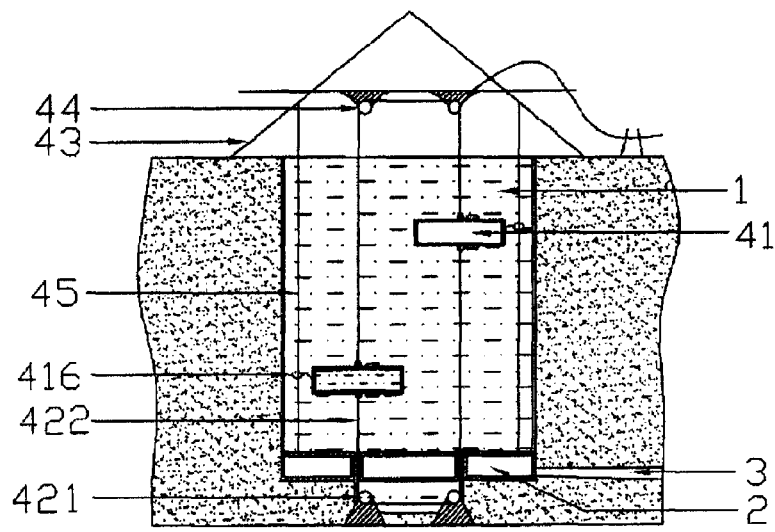

Fig. 14a

Sheet 18, replace Figure 16c with the figure depicted below, wherein reference numbers "421" and "422" should be switched

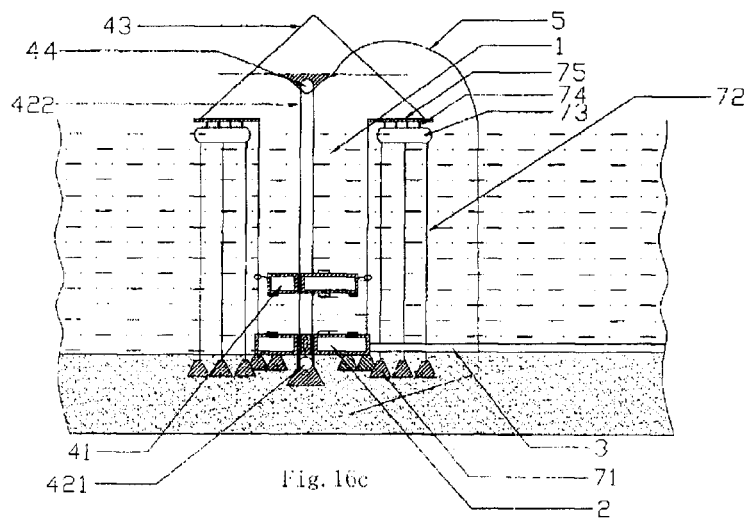

In the Specifications

Column 1
Line 66, change "of Nuclear" to --of a Nuclear--
Line 67, change "of thermal" to --of a thermal--

Column 2
Line 1, change "of liquid" to --of a liquid--

Column 3
Line 65, change "is pulley" to --is a pulley--

Column 4
Line 1, change "an" to --a--
Line 32, change "comprises" to --comprises the--
Line 35, change "is" to --is a--
Line 40, change "is" to --is a--
Line 63, change "installed at outside" to --installed outside--

Column 5
Line 3, change "that close" to --that is close--
Line 31, change "in inner" to --in the inner--

Column 6
Line 42, change "is movement" to --is the movement--
Line 45, change "is ascending" to --is the ascending--

Column 7
Line 53, change "it" to --it a--
Line 54, change "of liquid" to --of the liquid--
Line 59, change "it coil" to --it a coil--
Line 60, change "liquid chamber, magnet" to --the liquid chamber, a magnet--

Column 8
Line 35, change "it" to --it a--
Line 36, change "magnet" to --a magnet--
Line 40, change "magnet" to --a magnet--
Line 41, change "coil" to --a coil--
Line 44, change "derivation" to --a derivation--
Line 48, change "derivation" to --a derivation--
Line 49, change "power-generating" to --a power-generating--
Line 60, change "derivation" to --a derivation--
Line 61, change "power-generating" to --a power-generating--
Line 65, change "derivation" to --a derivation--
Line 66, change "power-generating" to --a power-generating--

Column 9
Line 54, change "FIG." to --FIGS.--

Column 10
Line 1, change "of coil" to --of the coil--
Line 49, change "has air" to --has an air--

Column 11
Line 8, change "energy" to --power--
Line 27, change "chamber" to --chamber 1--
Line 62, change "inlet" to --in-out--

Column 12
Line 17, change "diagram" to --diagrams--
Line 21, change "are" to --are the--
Line 23, change "movement chamber" to --the movement chamber--
Line 23, change "movement body" to --the movement body--
Line 28, change "space" to --chamber--
Line 34, change "same" to --the same--
Line 37, change "respectively" to --respectively,--
Line 38-39, change "that, toothed belt pulley" to --that toothed belt--
Line 47, change "in upper" to --in the upper--
Line 56, change "after" to --after being--
Line 60, change "control" to --controls--

CERTIFICATE OF CORRECTION (continued)
U.S. Pat. No. 8,146,361 B2

Column 13
Line 1, change "of motor" to --of the motor--
Line 8, change "22" to --62--
Line 14, change "inlet" to --in-out--
Line 16, change "inlet" to --in-out--
Line 18, change "22" to --62--
Line 25, change "22" to --62--

Column 14
Line 3, change "magnet is set up in inner" to --a magnet is set up in the inner--
Line 4, change "coil" to --a coil--
Line 9, change "coil" to --a coil--
Line 9, change "inner" to --the inner--
Line 10, change "magnet" to --a magnet--
Line 14, change "coil" to --a coil--
Line 15, change "magnet" to --a magnet--
Line 15, change "inner" to --the inner--
Line 16, change "coil" to --a coil--
Line 41, change "2. Via 31 with a valve is" to --2 via 31 with a valve that is--

Column 15
Line 2, change "apparatus" to --apparatuses--
Line 11, change "until into" to --until--
Line 14, change "move" to --moves--
Line 21, change "FIG." to --FIGS.--
Line 22, change "invention" to --invention.--
Line 24, change "liquid" to --movement--
Line 26, change "are" to --are the--
Line 31, change "liquid" to --movement--
Line 33, change "flow in the liquid" to --flows into the movement--
Line 34, change "liquid" to --movement--
Line 35, change "reach" to --reaches--
Line 37, change "pulley" to --pulleys--
Line 59, change "413" to --414--

Column 16
Line 9, change "of water" to --of the water--
Line 12, change "part" to --part 23--
Line 17, change "with" to --with a--
Line 21, change "flow" to --flows--
Line 22, change "body" to --chamber--
Line 27, change "than" to --than the--
Line 42, change "411" to --22--

CERTIFICATE OF CORRECTION (continued)
U.S. Pat. No. 8,146,361 B2

Line 52, change "411" to --422--
Line 59, change "FIG." to --FIGS.--
Line 67, change "liquid chamber" to --movement chamber 1--

Column 17
Line 9, change "body" to --body 41--
Line 10, change "concentration" to --a concentration--
Line 14, change "surround" to --surrounding--
Line 23, change "specialized" to --a specialized--
Line 30, change "process" to --process to--
Line 32, change "setup" to --set up--
Line 49, change "same" to --the same--
Line 53, change "ocean" to --the ocean--
Line 55, change "pole" to --pile--
Line 63, change "FIG." to --FIGS.--
Line 67, change "etc" to --etc.--

Column 18
Line 31, change "6" to --22--
Line 33, change "collecting room 6" to --cavity room 63--
Line 36, change "chamber" to --device--
Line 38, change "collecting" to --cavity--
Line 42, change "collecting" to --cavity--
Line 43, change "collecting" to --cavity--
Line 47, change "process is same" to --the process is the same--
Line 48, change "FIG." to --FIGS.--
Line 52, change "etc" to --etc.--
Line 55, change "second" to --the second--
Line 55, change "Difference" to --The difference--
Line 63, change "63" to --6--
Line 64, change "device" to --device 6--

Column 19
Line 1, change "energy" to --energy,--
Line 6, change "shift room 2" to --cavity room 63--
Line 8, change "cell" to --room--
Line 10, change "outlet" to --inlet--
Line 12, change "a" to --an--
Line 16, change "and" to --and the--
Line 25, change "high" to --a high--
Line 27, change "good" to --a good--
Line 31, change "cooling" to --a cooling--
Line 47, change "cell" to --room--
Line 51, change both instances of "cell" to --room--

CERTIFICATE OF CORRECTION (continued)
U.S. Pat. No. 8,146,361 B2

Line 54, change "being" to --is being--
Line 56, change "cause" to --causes--
Line 56, change "go" to --to go--
Line 61, change "verse vice" to --vice versa--
Line 65, change "large" to --a large--
Line 65-66, change "In term of power" to --Power--

Column 20
Line 6, change "FIG." to --FIGS.--
Line 9, change "liquid" to --movement--
Line 12, change "liquid" to --movement--
Line 12, change "river" to --a river--
Line 13, change "appropriate" to --the appropriate--
Line 15, change "is (not shown)" to --(not shown) is--
Line 16, change "liquid" to --movement--
Line 17, change "liquid" to --movement--
Line 19, change "liquid" to --movement--
Line 20, change "power" to --the power--
Line 21, change "liquid" to --movement--
Line 23, change "liquid" to --movement--
Line 35, change "air" to --an air--
Line 37, change "hollow" to --a hollow--
Line 41, change "flotage" to --floatage--
Line 44, change "doing descending" to --doing ascending--
Line 45, change "liquid" to --movement--
Line 62, change "rotating ball" to --rotating the ball--
Line 62, change "paired" to --pair--
Line 63, change "part" to --parts--
Line 66, change "connecting" to --the connecting--

Column 21
Line 3, change "liquid" to --movement--
Line 6, change "magnet" to --a magnet--
Line 6, change "liquid" to --movement--
Line 7, change "coil" to --a coil--
Line 11, change "coil" to --a coil--
Line 12, change "magnet" to --a magnet--
Line 24, change "water" to --the water--
Line 27, change "liquid" to --movement--
Line 27, change "flow" to --flows--
Line 36, change "liquid" to --movement--
Line 41, change "certain" to --a certain--
Line 45, change "223" to --222--
Line 48, change "certain" to --a certain--

Line 48, change "meanwhile" to --Meanwhile--
Line 60, change "loosen" to --loosened--
Line 64, change "liquid" to --movement--

Column 22
Line 2, change "liquid" to --movement--
Line 6, change "liquid" to --movement--
Line 7, change "device" to --device 2--
Line 13, change "verse vice" to --vice versa--
Line 17, change "In term of power" to --Power--
Line 25, change "FIG. 13*a* to 2*f*" to --FIGS. 13*a* to 13*f*--
Line 29, change "same" to --the same--
Line 31, change "FIG." to --FIGS.--
Line 36, change "FIG." to --FIGS.--
Line 39, change "liquid" to --movement--
Line 41, change "FIG." to --FIGS.--
Line 42, change "has" to --that has--
Line 42, change "same" to --the same--
Line 44, change "upper" to --the upper--
Line 49, change "same" to --the same--
Line 51, change "unit" to --block--
Line 52, change "unit" to --block--
Line 58, change "liquid" to --movement--
Line 61, change "422" to --421--
Line 61, change "liquid" to --movement--
Line 65, change "2*f*" to --13*a*--
Line 67, change "422" to --421--

Column 23
Line 6, change "water" to --the water--
Line 7, change "liquid chamber" to --movement chamber--
Line 9, change "flow" to --flows--
Line 18, change "421" to --422--
Line 22, change "FIG." to --FIGS.--
Line 25, change "liquid" to --movement--
Line 26, change "same" to --the same--
Line 28, change "same" to --the same--
Line 34, change "liquid" to --movement--
Line 40, change "move" to --movement--
Line 50, change "movement" to --the movement--
Line 50, change "in" to --which in--
Line 59, change "same" to --the same--
Line 60, change "river" to --a river--
Line 62, change "same" to --the same--
Line 66, change "liquid chamber" to --movement chamber--

Column 24
Line 1, change "same" to --the same--
Line 4, change "liquid chamber" to --movement chamber--
Line 8, change "same" to --that are the same--
Line 16, change "ensure" to --ensuring--
Line 21, change "coil" to --a coil--
Line 21, change "inner" to --the inner--
Line 21, change "liquid" to --movement--
Line 22, change "chamber, magnet" to --chamber 1, a magnet--
Line 22, change "body. When coil" to --body 41. When the coil--
Line 28, change "location" to --the location--
Line 29, change "water surface that close to the liquid" to --the water surface that is close to the movement--
Line 30, ref. number '7' should read in FIGS. 15a, 15b
Line 40, change "liquid chamber" to --movement chamber--
Line 43, change "flow" to --flows--
Line 47, change "of the" to --the--
Line 52, change "liquid" to --movement--
Line 55, change "way same" to --same way--
Line 56, change "way same" to --same way--
Line 59, change "are" to --is--
Line 62, change "dose" to --does--
Line 66, change "water" to --the water--
Line 67, change "liquid" to --movement--

Column 25
Line 5, change "FIG." to --FIGS.--
Line 8, change "same" to --the same--
Line 9, change "river" to --the river--
Line 10, change "liquid" to --movement--
Line 19, change "same" to --the same--
Line 28, change "of liquid" to --of movement--
Line 33, change "ocean and" to --the ocean and--
Line 35, change "pole" to --pile--
Line 35, change "ocean" to --the ocean--
Line 41, change "way same" to --same way--
Line 51, change "reverse" to --of reverse--
Line 62, change "same" to --the same--

Column 26
Line 10, change "way same" to --same way--
Line 11, change "liquid" to --movement--
Line 15, change "are" to --is--

CERTIFICATE OF CORRECTION (continued)
U.S. Pat. No. 8,146,361 B2

Line 15, change "way same" to --same way--
Line 23, change "FIG." to --FIGS.--
Line 28, change "liquid" to --movement--
Line 33, change "water" to --the water--
Line 36, change "FIG." to --FIGS.--
Line 39, change "same" to --the same--
Line 41, change "liquid chamber" to --movement chamber--
Line 50, change "same" to --the same--
Line 57, change "liquid" to --movement--

Column 27
Line 6, change "ocean and" to --the ocean and--
Line 8, change "pole" to --pile--
Line 20, change "ocean" to --the ocean--
Line 33, change "way same" to --same way--
Line 34, change "liquid" to --movement--
Line 36, change "are" to --is--
Line 37, change "way same" to --same way--
Line 38, change "are" to --is--
Line 38, change "way same" to --same way--
Line 41, change "dose" to --does--
Line 46, change "water" to --the water--
Line 46, change "liquid" to --movement--
Line 50, change "process is" to --the process is the--
Line 52, change "water" to --the water--
Line 57, change "FIG." to --FIGS.--
Line 61, change "liquid" to --movement--
Line 65, change "appropriate" to --the appropriate--
Line 67, change "liquid chamber" to --movement chamber--

Column 28
Line 1, change "liquid" to --movement--
Line 2, change "power" to --the power--
Line 4, change "liquid" to --movement--
Line 7, change "liquid" to --movement--
Line 12, change "device" to --device 2--
Line 22, change "above" to --the above--
Line 23, change "liquid" to --movement--
Line 27, change "liquid" to --movement--
Line 36, change "liquid" to --movement--
Line 40, change "liquid chamber" to --movement chamber 1--
Line 41, change "those" to --that--
Line 44, change "are" to --are,--

CERTIFICATE OF CORRECTION (continued)
U.S. Pat. No. 8,146,361 B2

Line 47, change "liquid" to --movement--
Line 50, change "that" to --which--
Line 52, change "hollow" to --a hollow--
Line 54, change "magnet is installed in" to --a magnet is installed in the--
Line 55, change "coil" to --a coil--
Line 63, change "inner" to --the inner--
Line 67, change "coil" to --a coil--

Column 29
Line 8, change "liquid" to --movement--
Line 10, change "the" to --The--
Line 11, change "liquid" to --movement--
Line 17, change "FIG." to --FIGS.--
Line 21, change "device are" to --device 2 is--
Line 22, change "in turn" to --which in turn flows--
Line 24, change "top" to --the top--
Line 26, change "pipe" to --the pipe--
Line 40, change "quicken" to --quickened--
Line 44, change "move" to --to move--
Line 52, change "protrude" to --protruding--
Line 65, change "FIG." to --FIGS.--

Column 30
Line 1, change "flow into liquid" to --flows into movement--
Line 4, change "are liquid" to --is liquid which--
Line 4, change "1" to --2--
Line 7, change "are" to --is--
Line 11, change "brake" to --a brake--
Line 22, change "floatage. Through" to --floatage through--
Line 30, change "FIG." to --FIGS.--
Line 34, change "an" to --a--
Line 45, change "river bank with" to --a river bank with the--
Line 50, change "liquid" to --movement--
Line 52, change "same" to --the same--
Line 57, change "1B" to --2A--
Line 59, change "2A" to --8A--
Line 59, change "2B" to --8B--
Line 66, change "2B" to --1B--

Column 31
Line 8, change "FIG." to --FIGS.--
Line 11, change "comprises liquid" to --comprises movement--
Line 16, change "liquid" to --movement--
Line 24, change "same" to --the same--

Line 28, change "are" to --are,--
Line 31, change "liquid" to --movement--
Line 43, change "body" to --board--
Line 47, change "95" to --75--
Line 60, ref. number '8' should read in FIG. 20e
Line 62, change "same" to --the same--
Line 67, change "river bank with" to --a river bank with the--

Column 32
Line 3, change "same" to --the same--
Line 6, change "same" to --the same--
Line 9, change "76" to --43--
Line 10, change "FIG." to --FIGS.--
Line 14, change "parallel" to --parallel.--
Line 39, change "same" to --the same--
Line 44, change "same" to --the same--
Line 46, change "top" to --the top--
Line 49, change "top" to --the top--
Line 53, change "FIG." to --FIGS.--
Line 57, change "example" to --examples--
Line 58, change "liquid" to --movement--
Line 59, change "same" to --the same--
Line 60, change "same" to --the same--

Column 33
Line 1, change "opening" to --openings--
Line 4, change "solid oblate sphere moves" to --a solid oblate sphere that moves--
Line 9, change "are" to --are,--
Line 12, change "liquid" to --movement--
Line 17, change "same" to --the same--
Line 19, change "same" to --the same--
Line 23, change "water" to --the water--
Line 24, change "liquid chamber" to --movement chamber--
Line 26, change "liquid" to --movement--
Line 26, change "flow" to --flows--
Line 35, change "liquid" to --movement--
Line 40, change "chamber" to --chamber 1--
Line 41, change "upper" to --trap--
Line 47, change "top" to --the top--
Line 55, change "are" to --is--
Line 62, change "way same" to --same way--

Column 34
Line 16, change "apparatus described in example" to --apparatuses described in examples--
Line 18, change "liquid" to --movement--
Line 21, change "liquid" to --movement--
Line 22, change "same" to --the same--
Line 23, change "same" to --the same--
Line 26, change "bottom of liquid" to --the bottom of movement--
Line 31, change "same" to --the same--
Line 33, change "same" to --the same--
Line 38, change "same" to --the same--
Line 44, change "same" to --the same--
Line 45, change "certain" to --a certain--
Line 50, change "pipeline" to --pipeline 9--
Line 54, change "pipeline" to --pipeline 9--

Column 35
Line 8, change "ocean" to --the ocean--
Line 15, change "transportation" to --transportation pipeline--
Line 28, change "first" to --second--
Line 66, change "lower" to --the lower--

Column 36
Line 42, change "a" to --an--

Column 37
Line 29, change "the first and" to --to the first and--
Line 63, change "inner" to --the inner--

Column 38
Line 10, change "and an" to --an--
Line 41, change "such" to --such that--

CERTIFICATE OF CORRECTION (continued)

(12) United States Patent
Jin

(10) Patent No.: US 8,146,361 B2
(45) Date of Patent: Apr. 3, 2012

(54) POWER GENERATING APPARATUS

(75) Inventor: Jifan Jin, Lanzhou (CN)

(73) Assignees: Lanzhou Jinfule Biotechnology Co., Ltd., Lanzhou (CN); Kin Star International Limited, Road Town (VG); Spring Power Limited, Road Town (VG); Jin Jin Pacifique Compagnie, Antony (FR)

(*) Notice: Subject to any disclaimer, the term of this patent is extended or adjusted under 35 U.S.C. 154(b) by 449 days.

(21) Appl. No.: 12/395,454

(22) Filed: Feb. 27, 2009

(65) Prior Publication Data
US 2009/0236856 A1    Sep. 24, 2009

Related U.S. Application Data

(63) Continuation-in-part of application No. PCT/CN2007/002622, filed on Aug. 31, 2007, and a continuation-in-part of application No. PCT/CN2006/002239, filed on Aug. 31, 2006.

(51) Int. Cl.
 *F03B 7/00* (2006.01)
 *F03B 17/06* (2006.01)
 *F03G 3/04* (2006.01)
 *F02B 63/04* (2006.01)
 *H02K 7/18* (2006.01)

(52) U.S. Cl. ............ 60/639; 60/640; 290/1 R; 417/329
(58) Field of Classification Search ............ 60/639, 60/640, 495, 496, 675; 290/1 R, 43, 54; 417/329
See application file for complete search history.

(56) References Cited

U.S. PATENT DOCUMENTS

| | | | | |
|---|---|---|---|---|
| 459,280 A * | 9/1891 | Garrett, Jr. | | 417/329 |
| 547,318 A * | 10/1895 | Baily | | 60/639 |
| 2,129,292 A * | 9/1938 | Vinson | | 417/329 |
| 2,499,715 A * | 3/1950 | Blevins | | 60/640 |
| 4,163,905 A * | 8/1979 | Davison | | 290/54 |
| 4,391,100 A * | 7/1983 | Smith | | 60/641.11 |
| 4,583,368 A * | 4/1986 | Neuenschwander | | 60/639 |
| 4,720,976 A * | 1/1988 | Kim et al. | | 60/495 |
| 5,488,828 A * | 2/1996 | Brossard | | 60/675 |
| 6,445,078 B1 * | 9/2002 | Cieslak, Jr. | | 290/1 R |
| 6,534,881 B1 * | 3/2003 | Slavchev | | 290/54 |
| 6,734,574 B2 | 5/2004 | Shin | | |

(Continued)

FOREIGN PATENT DOCUMENTS
CN    2191293    3/1995
(Continued)

*Primary Examiner* — Thomas Denion
*Assistant Examiner* — Christopher Jetton
(74) *Attorney, Agent, or Firm* — Workman Nydegger

(57) ABSTRACT

A power-generating apparatus including an autocontrol electronic mechanical unit, a power-generating unit, a power transportation device, a liquid supply device, a shift device, and a discharge device. The power-generating unit includes a pair of interactive and coupled reverse-linked, hollow movement bodies. The relationship between the two movement bodies can be changed through filling liquid to one movement body or discharging liquid from the other. The movement body filled with liquid goes down and brings the other movement body without liquid up to generate power in cycle continuously utilizing lifting and drop movements of the two movement bodies. The power-generating apparatus can utilize objects' gravitational potential energy to generate power in cycle uninterruptedly so as to ensure the continuity and stability of power generation. The power-generating apparatus completely uses the ambient natural energy during its entire power generation process.

27 Claims, 28 Drawing Sheets